US010888789B2

(12) United States Patent
Pierce et al.

(10) Patent No.: US 10,888,789 B2
(45) Date of Patent: Jan. 12, 2021

(54) SYSTEMS AND METHODS FOR CREATING AND MAINTAINING REAL MONEY TOURNAMENTS FOR VIDEO GAMES

(71) Applicant: Versus LLC, Las Vegas, NV (US)

(72) Inventors: Matthew Dalton Pierce, Los Angeles, CA (US); Jon Alexander Peachey, Las Vegas, NV (US); Scott Sebelius, Aliso Viejo, CA (US); John Michael O'Connell, Los Angeles, CA (US)

(73) Assignee: Versus LLC, Los Angeles, CA (US)

( * ) Notice: Subject to any disclaimer, the term of this patent is extended or adjusted under 35 U.S.C. 154(b) by 20 days.

(21) Appl. No.: 15/334,725

(22) Filed: Oct. 26, 2016

(65) Prior Publication Data

US 2017/0106290 A1 Apr. 20, 2017

Related U.S. Application Data

(63) Continuation-in-part of application No. 14/796,966, filed on Jul. 10, 2015, now Pat. No. 10,242,538.

(51) Int. Cl.
*A63F 13/35* (2014.01)
*A63F 13/792* (2014.01)
*A63F 13/795* (2014.01)
*A63F 13/798* (2014.01)
(Continued)

(52) U.S. Cl.
CPC ............ *A63F 13/792* (2014.09); *A63F 13/35* (2014.09); *A63F 13/46* (2014.09); *A63F 13/795* (2014.09); *A63F 13/798* (2014.09); *G07F 17/3276* (2013.01); *G07F 17/3295* (2013.01)

(58) Field of Classification Search
CPC ........ A63F 13/792; A63F 13/35; A63F 13/46; A63F 13/795; A63F 13/798; G07F 17/3276; G07F 17/3295
See application file for complete search history.

(56) References Cited

U.S. PATENT DOCUMENTS

| 6,206,782 B1 | 3/2001 | Walker et al. |
| 6,425,828 B2 | 7/2002 | Walker et al. |
| 6,837,793 B2 | 1/2005 | McClintic |

(Continued)

OTHER PUBLICATIONS

Extended European Search Report, dated Nov. 28, 2017, 9 pages.
(Continued)

*Primary Examiner* — Corbett B Coburn
(74) *Attorney, Agent, or Firm* — Fenwick & West LLP

(57) ABSTRACT

A system and method of awarding a participant with a real or virtual prize over a network, the system and method comprising present one or more details of a match in the session application to the participant over the network to the remote participant computer for selection of the match, wherein the match is associated with at least one prize type, receive a request from the participant to join the match, the request including a participation type associated with the participant and participant characteristics, determine participant eligibility to participate in the match and receive the at least one prize type associated with the match by comparing the prize type, participation type, and the participant characteristics with a set of eligibility requirements for the match, if the participant is eligible and achieves a win condition then award the participant the prize associated with the match and the prize type.

21 Claims, 34 Drawing Sheets

(51) Int. Cl.
*A63F 13/46* (2014.01)
*G07F 17/32* (2006.01)

(56) References Cited

U.S. PATENT DOCUMENTS

| | | | |
|---|---|---|---|
| 8,548,610 B1 * | 10/2013 | Howell | G06Q 10/0639 |
| | | | 273/317.4 |
| 8,789,752 B1 | 7/2014 | McGhie et al. | |
| 8,827,799 B1 | 9/2014 | Brown et al. | |
| 8,944,320 B1 | 2/2015 | McGhie et al. | |
| 2005/0261062 A1 | 11/2005 | Lewin et al. | |
| 2007/0167210 A1 | 7/2007 | Kelly et al. | |
| 2009/0069093 A1 * | 3/2009 | Kelly | G07F 17/32 |
| | | | 463/42 |
| 2009/0115133 A1 * | 5/2009 | Kelly | G07F 17/32 |
| | | | 273/274 |
| 2011/0117982 A1 * | 5/2011 | Nguyen | G07F 17/32 |
| | | | 463/16 |
| 2012/0150695 A1 * | 6/2012 | Fan | G06Q 30/0641 |
| | | | 705/27.1 |
| 2013/0109456 A1 | 5/2013 | Wilkinson et al. | |
| 2013/0122999 A1 * | 5/2013 | Gagner | G07F 17/3244 |
| | | | 463/25 |
| 2013/0262188 A1 * | 10/2013 | Leibner | G06Q 30/02 |
| | | | 705/7.36 |
| 2014/0171182 A1 | 6/2014 | Versaci | |
| 2016/0136526 A1 * | 5/2016 | Mansfield | A63F 13/79 |
| | | | 463/31 |

OTHER PUBLICATIONS http://alphadraft.com, downloaded Oct. 16. 2015, 6 pgs.
http://battlefy.com, downloaded Oct. 16, 2015, 5 pgs.
http://gamblitgaming.com, downloaded Nov. 3, 2015, 4 pgs.
http://skillz.com, downloaded Nov. 3, 2015, 2 pgs.
http://worldgaming.com, downloaded Nov. 3, 2015, 7 pgs.
http://www.bspot.com, downloaded Oct. 16, 2015, 3 pgs.
http://www.draftkings.com, downloaded Oct. 16, 2015, 5 pgs.
http://www.fanduel.com, downloaded Oct. 16, 2015, 6 pgs.
http://www.gamiker.com, downloaded Nov. 5, 2015, 4 pgs.
http://www.vg247.com, downloaded Nov. 3, 2015, 7 pgs.
http://www.xfire.com, downloaded Oct. 16, 2015, 5 pgs.
PCT International Search Report and Written Opinion, PCT Application No. PCT/US2015/040060, dated Oct. 1, 2015, 9 pages.
United States Office Action, U.S. Appl. No. 14/796,966, dated Jan. 20, 2017, 12 pages.
United States Office Action, U.S. Appl. No. 14/796,966, dated Sep. 13, 2017, 9 pages.
United States Office Action, U.S. Appl. No. 14/796,966, dated May 3, 2018, 9 pages.

* cited by examiner

The lifecycle of a match

FIG. 3B

Game Name ▾

User Name

Prizes

| Total $ Won | <Prize Name> | <Prize Name> |
|---|---|---|
| 4500 VC | 60 Won / 40 Left | 60 Won / 40 Left |

All Matches

| Match ID | State | Last Updated Date |
|---|---|---|
| 1234-567 | Closed | June 1 2016 |
| 1234-567 | Closed | June 1 2016 |
| 1234-567 | Open | July 22 2016 |
| 1234-567 | Closed | June 1 2016 |
| 1234-567 | Running | July 22 2016 |
| 1234-567 | Open | July 22 2016 |
| 1234-567 | Open | July 22 2016 |
| 1234-567 | Open | July 22 2016 |
| 1234-567 | Open | July 22 2016 |
| 1234-567 | Open | July 22 2016 |

View Results

☐ Matches

A Web Page

Platform

User Name
email@example.com
Company Name
Status: Enabled
Last Login: 9:15PM

Disable User

User Roles

Game Admin          Game Name
Tournament          Game Name

Add Role

Login History
July 22, 2016 7:15pm PDT
July 22, 2016 7:15pm PDT
July 22, 2016 7:15pm PDT
July 22, 2016 7:15pm PDT Activity Log
Action Name      July 22, 2016 7:15pm PDT
Action Name      July 22, 2016 7:15pm PDT
Action Name      July 22, 2016 7:15pm PDT
Action Name      July 22, 2016 7:15pm PDT
Action Name      July 22, 2016 7:15pm PDT User Name

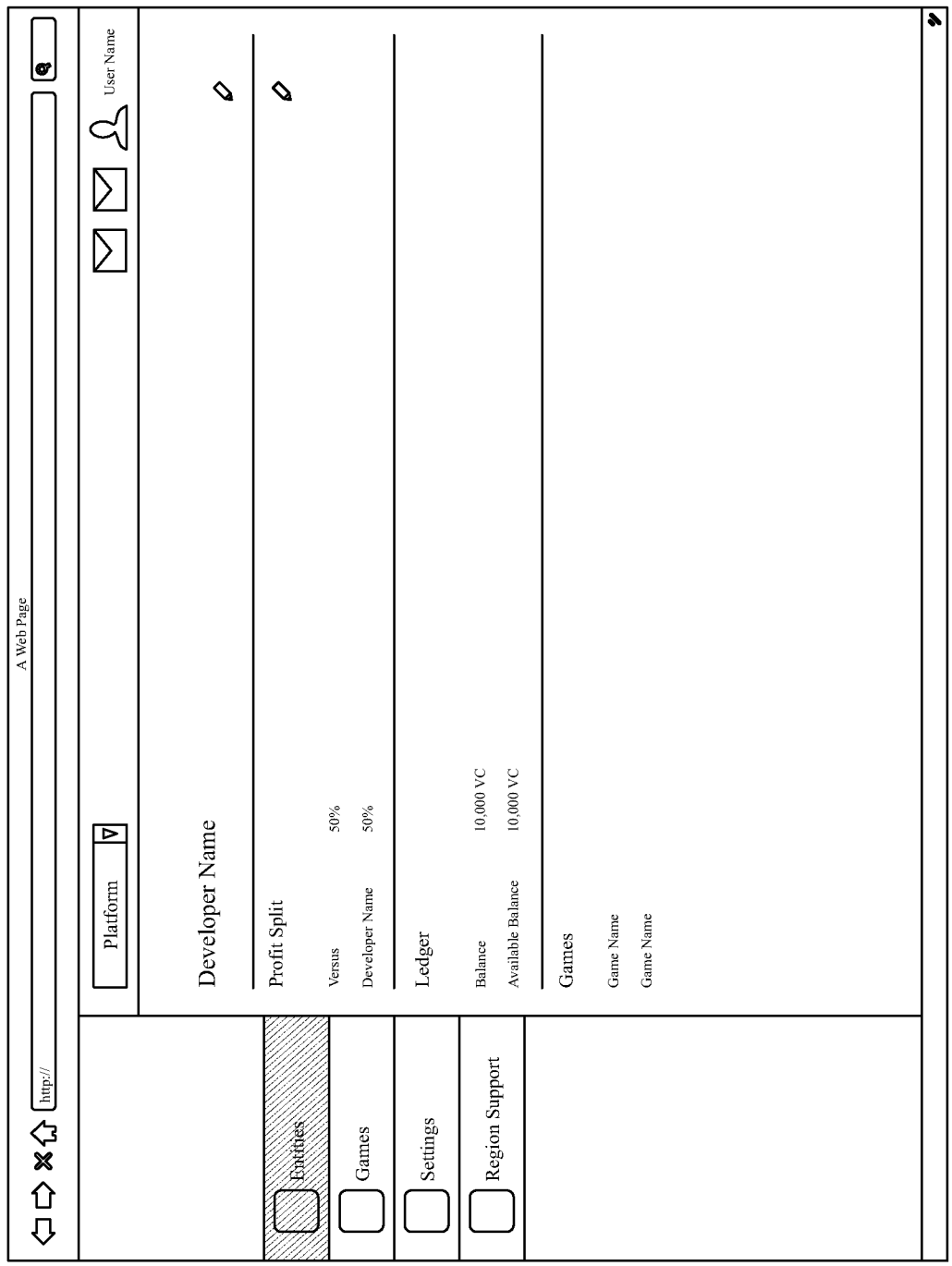
FIG. 11B2

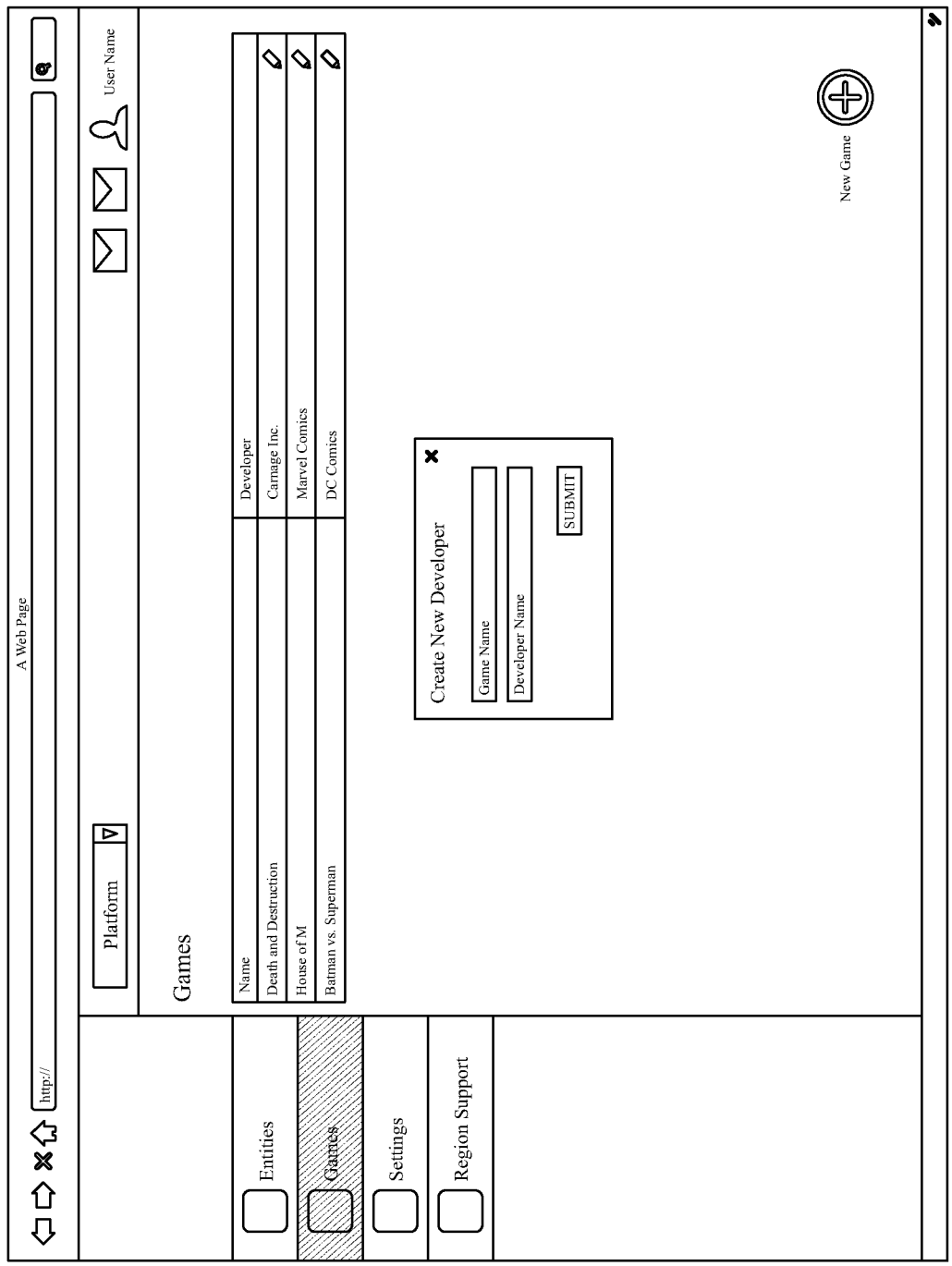
FIG. 11C1

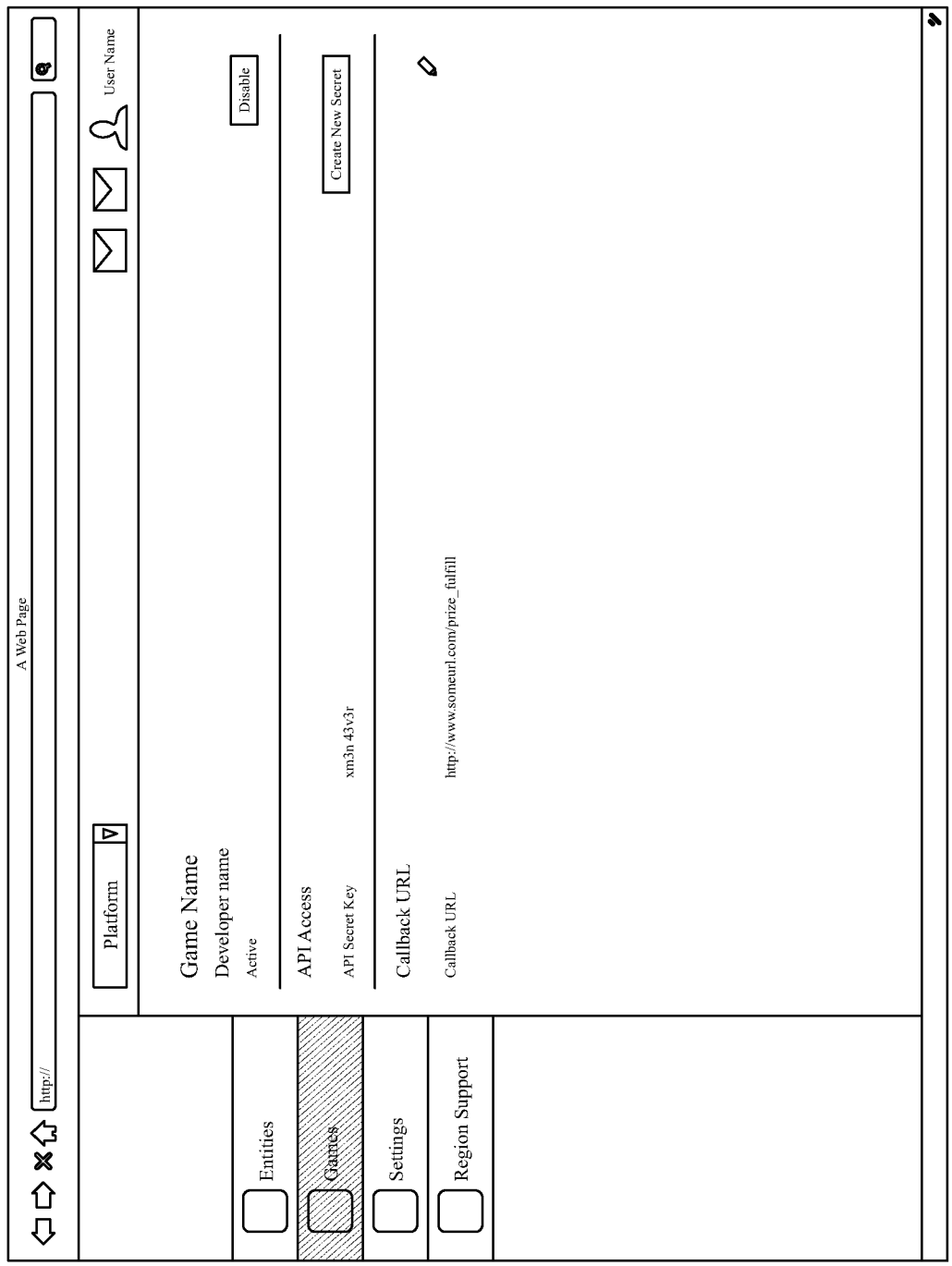
FIG. 11C2

Create New Prize

| | |
|---|---|
| Type | Digital Good ▽ |
| | Physical Good |
| Name | |
| Description | |
| Prize Cost | |
| Prize Value | |
| Prize ID | |
| SKU | |
| Max Fulfillments | |
| Metadata | json required |

Submit

FIG. 11D

SYSTEMS AND METHODS FOR CREATING AND MAINTAINING REAL MONEY TOURNAMENTS FOR VIDEO GAMES

RELATED APPLICATION

This application is a Continuation-In-Part of U.S. patent application Ser. No. 14/796,966 filed Jul. 10, 2015, which is incorporated by reference herein in its entirety.

FIELD OF THE INVENTION

This disclosure generally relates to online gaming and more specifically relates to legal online gaming matches.

BACKGROUND

An online game is a video game played over some form of computer network, typically on the internet. Online games may range from simple text based environments to games incorporating complex graphics and virtual worlds populated by one or many players simultaneously, which may themselves be watched by one or more spectators. A single player or multiplayer online game may be played via a game server over the internet, with other players or spectators around the world. Many online games have associated online communities, making online games a form of social activity beyond single player games. A wide variety of online games are available for all type of game players and spectators.

BRIEF DESCRIPTION OF THE DRAWINGS

FIGS. 3A-3B illustrate example GUIs for managing match instances.

FIG. 8B-1 illustrates an example method of accounting for prizes.

Figure 11A:
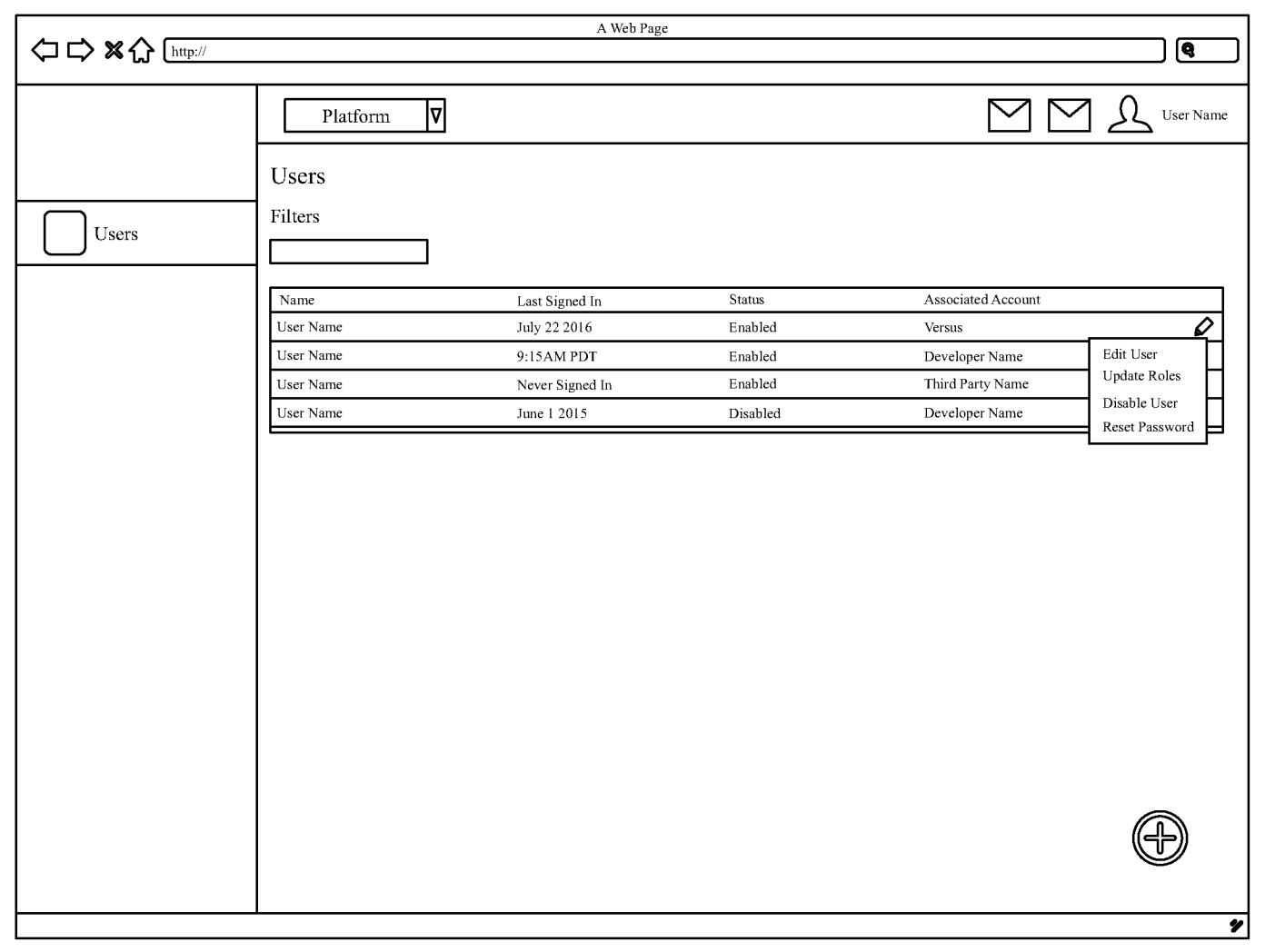
Figure 11A1:
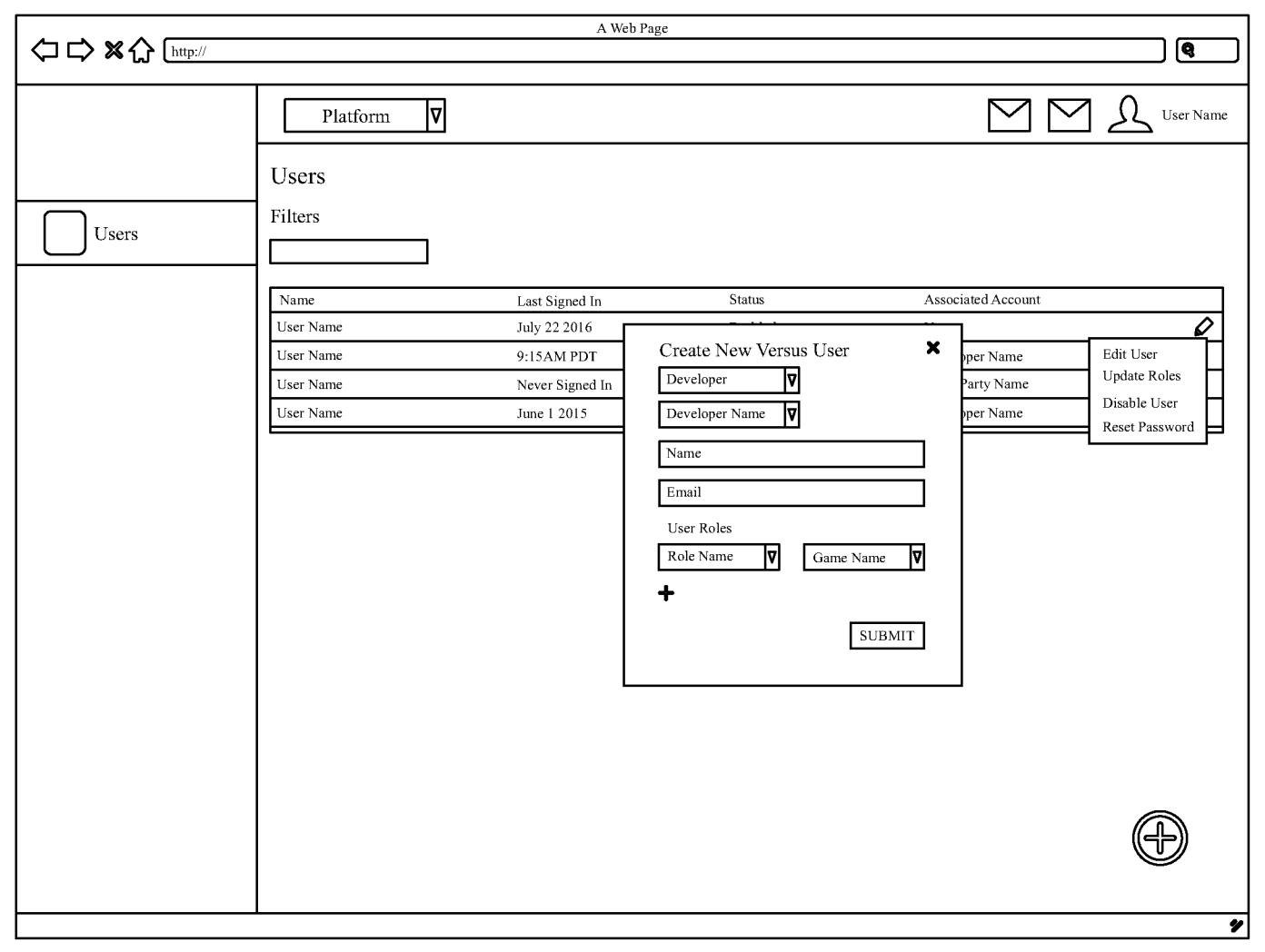

FIGS. 11A-11D illustrate example UXs for example systems described herein.

DESCRIPTION OF EXAMPLE EMBODIMENTS

Figure 1:
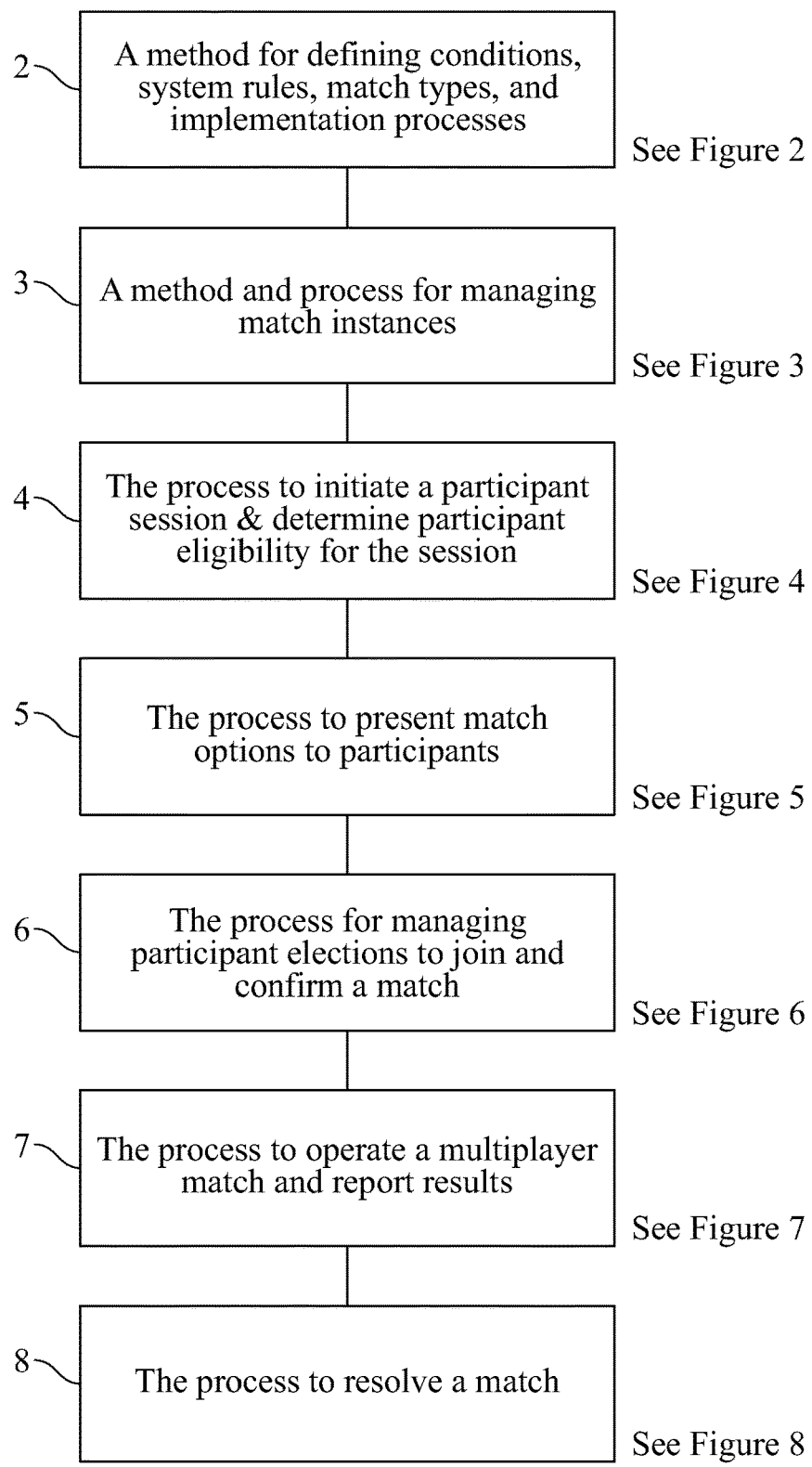
FIG. 1 illustrates an example method of creating and managing conditional payment sessions.

Described herein is a process for managing conditional prizing in video game and other competitions based on temporary and persistent characteristics of the participants. This disclosure describes systems and methods for creating and maintaining online sessions, matches, tournaments, and competitions of video games and other experiences where players, spectators, and other participants compete for various prizes including real-money, physical goods, and/or downloadable content.

This disclosure describes hardware, software, and business methods that enable operators to: identify participant, player, and spectator characteristics; create and manage video game matches or even single-player entertainment experiences, including the broadcasting of said matches/experiences; and distribute prizes to players, spectators, and other participants based on their age, location, and other eligibility criteria. This disclosure also describes how participants such as players and spectators may be able to receive prizes for wagering on match outcomes, and how sponsors and prize providers may include their products as eligible prize types for players, spectators, and other participants. It also describes certain dashboards or interfaces that may make the creation and management of this platform possible for a match operator. One skilled in the art will see how these approaches, both software and business processes, are unique to the creation and management of online, prize-based video game matches through a unique process of conditional prizing.

One skilled in the art of financial technology and online, networked video games will see multiple new approaches in pay-to-play gaming, prize-based gaming, match creation and maintenance, participant identification, and conditional prize distribution, including surprise-and-delight prizing based on participants meeting certain conditions. One skilled in the art will also see multiple new approaches to spectator involvement in match play, including spectator wagering and spectator prizing.

Achievements are specified points within a participant session where participant characteristics can be collected, assessed, and compared to conditions to determine if a prize or an operator consideration may be distributed. Achievements may exist independent of the concept of matches or tournaments. That is, they may happen during ordinary game play, or within a broader, open-ended session. Achievements may be considered as characteristics that can accrue to a participant, and in this way, they may, along with other persistent and temporary characteristics, provide operators and facilitators with important data about the participant such that an operator may want to instruct the system to distribute prizes to any participant who completes one or more specific achievements or combinations of achievements. If, for example, in a single player game, a participant chooses to attempt an unusually risky behavior, some prize provider may want to reward that behavior with a digital good, or a physical good, or even with real money. Or, if a participant completes a level of the game, a sponsor may choose to send a code or a coupon for a physical good to a participant's account based on their accomplishment. The system will programmatically distribute goods to all participants who achieve certain accomplishments. In this way, one skilled in the art will see a unique system for matching prize providers with participants via automated promotions for achievements in play.

Available Regions are all of those geographical regions that the system administrator has determined are acceptable locations for participants to participate in a given match or tournament. Available regions may only be specified by the system administrator and cannot be changed by an operator. Regions may be considered "available" for certain participants and for certain conditions, certain characteristics, prize types, certain ages, certain participation types, or other characteristics based on, among other factors, including federal, state, and local laws.

For example, the state of California may be considered an available region for all player-participants over 18 years of age, for certain prize types including real money, and consumer packaged goods (CPG). California may also be an available region for both spectator and player participation types, for all ages, in those matches where the prize is downloadable content (DLC). Such distinctions may be made clear on a region-by-region basis in tables in the system database.

Operators may create more stringent rules over and above the rules created by the system administrator with regard to which regions are available and which are restricted, but operators may not make the rules more lax than what is allowed under federal, state, and local laws. For example, operators may not determine that a region that the system administrator has determined is restricted, is available.

Awarded is a stage in prize fulfillment where the system has determined that a participant has earned a given prize. It may be that, at this stage, the prize has not yet been fulfilled, which is another stage in prize fulfillment where a participant has full ownership of the physical good, digital good, virtual currency, or virtual good. But, in the awarded stage a participant may have a code or some other indicator created by the system and assigned to their participant identity that indicates that the prize has been awarded. The process for moving from awarded to fulfilled may be executed through any number of methods that are well known in the art.

Blacklist is a method for determining and managing conditions that are unique to a region for the purpose of clarifying participant eligibility or prize eligibility for those participants who are participating in a match while located in that region—similar to a whitelist with the difference being that a blacklist describes conditions that may prevent participants from being eligible for certain matches or prize types because of federal, state, or local laws or other conditions. For example, the state of Tennessee may be on a blacklist for the real money prize type regardless of any other characteristics that a participant may have. In this way, no participants may be eligible for the real money prize type when playing from Tennessee regardless of any other characteristics that participant may have. A blacklist may also be a specific carve out from a larger region that has been whitelisted.

Characteristics are qualities of a participant that are specific to that participant. The system seeks to know certain characteristics of a participant so that it may determine that participant's eligibility for certain matches, and certain prize types. Some characteristics may be considered persistent such as a participant's birthdate or social security number, which are fixed and associated permanently with the participant's identity in the system. Other characteristics, such as a participant's location, their status of good standing, or their password, may change from match to match or session to session. In some embodiments of the system, the system may determine one or more of these characteristics, combining both temporary and persistent characteristics in order for the participant to be deemed eligible for participation, or eligible for particular prize types, in a given match or in a given session. An operator or system administrator may require any number or combination of participant characteristics to determine eligibility, including but not limited to: age/birthdate; current location (IP address, GPS position, cell phone tower location, etc); status in good standing; social security number or equivalent identifier or tax ID; current wallet balance; phone number; player ID number or gamer tag; verification code or codes from a third party verification service; biometric identifiers (facial recognition, fingerprints, or others); achievement history (player record, player behavior, choices of avatar, choices made by avatars); session history (how long a participant has been playing, match history within a session, player choices in-game); and participant reputation.

These characteristics may be verified using any one or more of a number of systems, including the one described below. The system may then use these characteristics to determine eligibility, distribute prizes, distribute coupons, distribute surprise-and-delight promotions and prizes, distribute tax forms, collect tax and other revenues, and meet regional regulatory requirements. Characteristics may also be used to provide operators and system administrators with additional data that may help to improve system performance and to make product improvements. A combination of persistent and temporary characteristics related to a specific session may be called participant session characteristics.

In particular embodiments, a portion of the participant verification may be performed through the use of a mobile application. In particular embodiments, a participant may be required to download an application to their smartphone, tablet, wearable, or mobile device. Such a mobile device may, through an application, be able to interact with both the participant, where the participant may be required to provide a password, thumbprint or other biometric element, or location verification; and also the game or the operator of the match, through a photograph of a QR code or through some other similar identifier that is placed on the screen of the game. In this way, an operator may perform a multi-factor player authentication including, a location verification, through the use of a mobile device application. An example of such an embodiment may occur as follows: once a participant has registered for the game and makes an election to play for prizing, they may be prompted to download an application to their mobile device. The operator may design the game such that in order to participate in certain kinds of prize based matches, participants must use this mobile application to verify their identity. In one embodiment, the operator may do this by requiring participants to use the app to take a picture or scan a QR code, bar code, or similar, that is displayed on the screen by the game. In this way, the participant's device may be registered with a certain operator or a certain game. This method, along with, the participant's explicit permission, may allow the operator to gather certain characteristics of the device, and of the participant who scanned the code displayed by the game. In particular embodiments, through the use of a mobile application, an operator may either actively or passively track participant location as well as certain behaviors with or without requiring the participant to regularly elect to transmit this information at the start of every session. In particular embodiments, an operator may use mobile applications to collect and record certain participant characteristics through the use of a mobile application.

Conditions are the established rules for gameplay within matches on the system. An operator and system administrator may, for example, create conditions that govern individual, pay-to-play matches of a given skill-based video game. In one embodiment, all participants will be made aware of the conditions prior to joining the match. Conditions may be set by the operator of the match or tournament, or may be prescribed by local or federal law enforcement or other governing body. For example, in one embodiment, participants may have to meet certain age, location, and/or other eligibility conditions to be eligible to receive a real money prize payout, they may also have to accomplish certain win conditions for a given match type, while participants meeting alternate conditions may instead be eligible to be paid out in physical goods or virtual goods. In this way, conditions are the broad term for prize eligibility terms, match eligibility terms, and game eligibility terms.

Condition-characteristic matching is the process of determining the characteristics of a participant including, in some embodiments, their persistent characteristics such as birthdate, and participant ID number; as well as their temporary characteristics including, in some embodiments, their location, their recent achievements, and their participant behavior in the current session; and comparing those characteristics to a known set of conditions for a participant to receive a given prize.

One of skill in the art will see that matching participant characteristics to pre-established conditions for prize distribution, in an automated way, across a wide range of conditions and characteristics, is the center of a unique and novel process. If for example, a system establishes that a participant is over 18 years of age, in California, having paid the participant consideration, or participating in a sponsored match, and may, upon winning a given match or completing a certain combination of achievements under certain conditions, be eligible for certain prizes while being ineligible for others; and that system were to then distribute or cause to be distributed the prizes that the participant had earned automatically, then that system would be a novel combination and application of several complex and unique processes combined in a novel manner with some processes that are well-known in the art.

Conditional payment system is the process of identifying individual participants, assessing their characteristics such as location, age, participant identity, and others; comparing those characteristics with a known set of conditions established by an operator (conditions of match eligibility and prize eligibility in particular); and then paying out specific types of operator consideration and prizing conditioned on those participant characteristics. One skilled in the art will recognize this as the novel combination of participant identification technologies, dynamic rules engines, and prize distribution across multiple prize types throughout networked online video game systems. In particular embodiments, this may also be called a conditional prizing system, or conditional prize matching.

Continuously monitored sessions or matches In particular embodiments, an operator may choose to create a session or match type with more than one potential win condition, or multiple win conditions, or an operator may elect to use the system as a mechanic to manage a surprise and delight promotion, then such a session or match may be continuously monitored. Continuously monitored matches or sessions are those where the system periodically collects information on participant activity, updating characteristics and in-game behaviors to measure them against the conditions for prizes on a periodic or continuous basis rather than, for example, at a predetermined resolution point. In this way, an operator may be able to reward a participant for certain in-game behaviors without the participant paying a specific participant consideration for a specific match. Or, in this way, an operator may be able to surprise and delight selected participants whose characteristics match the conditions that an operator chooses. Continuously monitored matches provide the operators with the ability to use condition-characteristic matching and conditional prizing in single player matches, or in other sessions where the conditions are in-game achievements. Such matches and sessions may also be applied in sandbox games, role playing games, mobile games, and transmedia experiences where an operator may want to automate a prizing mechanic to encourage participants to engage in certain in-game, or in-world activities. Continuously monitored sessions allow the system to periodically evaluate and record characteristics and compare them against one or more sets of prize conditions throughout a single session or across multiple sessions.

Credit Value. In some embodiments of the system, a participant does not win money or prizes directly upon match resolution—instead they are awarded a virtual currency that is a stand-in for the prize amount. The value of their virtual currency may be called the credit value—the amount, in credits, that the participant has won, or is holding. A similar example is when a player in a casino is holding that casino's chips, which are worth a certain amount. Their chips may be said to have a certain value despite the fact that they are only proxies for actual currency or real money.

Designation is a characteristic that is given to a participant by the operator or facilitator within the game or on the platform. These designations may be temporary "winner of game #1006", or "platinum-level player" and may be used by the operator or facilitator to facilitate match creation, tournament seeding, participant matching, prize payouts, tournament invitations, couponing, participation prizing, bonus prizing to surprise and delight regular or consistent participants, and other features. In one particular example embodiment, the designation of "winner of game #X" may function in place of the pseudo currency transaction described herein. Designations may change as circumstances change or as characteristics are collected throughout or across sessions.

An eligible participant is a participant, whether player, spectator, or other is deemed eligible to participate in a given match when their characteristics (age, location, status of "good-standing" etc.) are consistent with regional restrictions and system rules such as prize eligibility requirements for a given match. For example, a player-participant who has been determined to be of good standing who is 25 years of age, playing from a console in California, may be an eligible participant for a match whose prize eligibility requirements require a player-participant to be a player of good standing who is at least 18 years of age in the state of California. Any participant who is not an eligible participant for a given match or prize type is deemed ineligible for that match or prize type. It may be that, because of a participant's characteristics, a given participant would be eligible for certain prizes and ineligible for others, even within the same match.

In particular embodiments, a participant or other operator may act as an operator, creating a match instance or series of match instances where the prize or operator consideration is a physical good, virtual good, virtual currency or, in some embodiments, a promise to perform a service. In particular embodiments, the operator may create conditions such that certain participants engaged in a match, or certain players involved in in-game activities, may win the prize when their characteristics match the conditions established by the operator. In particular example embodiments, a third-party individual operator, acting through a website, may use the platform to create a match where the winner of the match may win a physical good owned by the operator: play this game, win my signed helmet; or play this match, the winner gets this physical trophy, sponsored by a third-party operator who may be an individual or group of individuals independent of the operator that created the game, or the system administrator that created and manages the platform.

A facilitator is a company, platform, or entity that exists to manage, or assist in the management of sessions, matches, or tournaments, including real-money sessions, matches, or tournaments. In certain embodiments of the system, an operator may also be a facilitator, but the facilitator of a given match or tournament may be a separate entity that does not develop or publish games, but only manages sessions, matches, or tournaments and the associated distributions of prizes based on participant conditions. For certain purposes within this description, facilitator and operator may be the same entity.

Facilitating Service is any party, company, group, or individual providing services or support for a session, match, or tournament that is required to be paid for such services. The fees to be paid for facilitating services can be defined globally in the system—for example, as a fixed-fee on a per-match, per-tournament, or on a per-participant basis. In an example embodiment of the system the fees for facilitating services will be paid out of the operator margin during the session, match, or tournament resolution process. Such facilitating services may include third party companies like those who may assist in location verification, payment processing, or age verification in a particular region.

Fulfilled is a stage in the prize fulfillment process where the participant has possession and control of a prize—it is seen as the final stage of prize fulfillment.

Good Standing Status. The status of "good standing" is a participant characteristic that may be used separately, or in concert with other characteristics, to help determine that participant's eligibility for a given match or prize type. In particular embodiments, a given participant may have a history with the game, the operator, or with the system administrator (repeated instances of cheating or abusing other players, for example) that would cause a participant to lose their good standing. Certain operators and system administrators may, when revoking good standing status from some participants, cause those participants to be ineligible for certain matches or prize types even if other of that participant's characteristics would allow them to be eligible participants according to the prize eligibility requirements.

Honor is a prize type that may be used in the system to allow participants to participate in matches that have no participant consideration. In one embodiment of the system, the honor prize would not require or trigger the same level of evaluation of a participant's characteristics as would a participant electing to participate for real money or physical goods prizes, but would still allow that participant to engage in certain matches. In such embodiments, the honor prize type, or its equivalents—which one skilled in the art will understand as a variation on free-to-play with no prizing—may be valid prize types for every participant in every region since no consideration is taken and no prizes of value are awarded.

In particular embodiments, a participant's age and location characteristics may not be determining factors for eligibility in matches where honor is the only prize type. The honor prize type may be used by an operator in their calculations to assess the skill level of a given participant such that the operator may more effectively match the participant with other, comparably skilled players in later matches. As a result, a participant's performance in honor-prize matches may be associated with their participant identity for future use (in ELO matching, for example).

Match is a single instance of a video game competition that, for the purposes of this disclosure, results in an operator's consideration, or prize being distributed at the resolution of the match. Matches may be of any type: single player; player vs. player; team vs. team; player vs. team; player vs. everyone, spectator-participants supporting one player vs. spectator participants supporting another player, and the like. Matches may include synchronous or asynchronous competitions where individual or multiple participants play the game and have their performances compared against one another for the purposes of ranking to aid in the distribution of prizes. For example, a player vs player match may involve two player-participants playing simultaneously in a match where the winner receives the operator consideration. A match may also be architected as a high-score-of-the-period match, which may include any number of participants competing in a contest, whether simultaneously not, that ends at a specific designated time (one day, one hour, when 100 participants have joined) at which point, all participant's scores are tallied, participants are ranked, and any number of the participants may receive some kind of operator consideration (in some embodiments, the winner may receive a greater share than other participants.) Matches may also resolve with the distribution of any prize type including real money, physical goods, downloadable content, honor, or any other.

Open-ended play or open-ended session is a type of gameplay where participants engage with a game or entertainment experience that does not necessarily lend itself to discrete match lengths or pre-established win conditions. While open-ended play may include mini-games or matches within the overall experience, the game encompasses more than the closed-ended match that resolves with the completion of a win condition. One skilled in the art may refer to such experiences as "open-world" or "sandbox" games or any games with persistent sessions. Open-ended play may exist in single player games or experiences, or it may exist in any one of a number of multiplayer environments, and massive multiplayer online games including massive multiplayer online roleplaying games. In these games, the platform may still use conditional payments and conditional prizing to award participants with prizes for their behavior, including the completion of quests, achievements, activities, or combinations thereof. Examples of games that may use the open-ended play conditional payment and conditional reward system include PC, console, mobile, AR/VR, and transmedia entertainment experiences including Minecraft, Sims, Grand Theft Auto, Fallout, Elder Scrolls, The Witcher, Pokemon Go, Dungeons & Dragons, Assassins Creed, Elite, Eve, and other games and entertainment experiences. In open-ended play, participants may be awarded many times, with many different prize-types in a single session based on their play or their behavior. The accrual of participant characteristics may be compared to conditions for the purpose of prize distribution at any point during the session, at many points during the session, or consistently throughout the session.

An operator is a party, company, group, or individual that creates and manages matches and tournaments. In one embodiment of the system, this operator is a game developer, publisher, or first party equipment manufacturer such as Activision, Riot, Wargaming, EA, Ubisoft, GameStop, Microsoft, Sony, or other similar organization. In another embodiment of the system, the Operator may be Versus LLC, Versus Gaming Network, Versus Systems, or other similar third party session, match, or tournament operators that may be operating sessions, matches, or tournaments in concert with, or wholly separate from the game developers and publishers. In another embodiment of the system, the operator could be a hotel, resort, arena, or casino like Madison Square Garden or the MGM Grand. In another embodiment, the operator is an individual or other company using the system to operate matches or tournaments independently. In another embodiment of the system, the operator is a participant who wants to use the system to create and operate sessions, matches, or tournaments for themselves, their friends, colleagues, or other participants.

Operator consideration is the prize offered to the participants by the operator or by a sponsor using the operator's platform. The operator consideration may take the form of a real-money prize amount, a virtual good prize, or a physical good, honor, or any combination of these. This consideration may be clearly posted and known to all participants prior to entering the match or tournament or, as in the surprise-and-delight prizing embodiment, may become known to the participants only after their characteristics have matched the conditions that trigger the system to award the operator consideration to the participant.

Participation awards are any prize type that is distributed to participants regardless of their order of finish in a given match. In particular embodiments, every participant in a given match may receive coupons or some digital good, simply for participating in a given match. These awards are distributed not on the basis of the participant's performance in the match, but simply as a function of participation. For example, a losing participant in a given match may receive a coupon code for 20% off at a merchant's store or at the operator's website. These awards may be distributed by the system to any number of participants, independent of the participant's performance in a given match.

A Participant or participants are any person(s) who are playing in, broadcasting, or spectating, or watching a game, match, or tournament. Participants may include any persons who are engaging in or with a match or game, including those who have paid a participant consideration, as well as those who have joined a sponsored match, or those who are playing or spectating for honor without having paid a participant consideration. A participant may include those who have an intention or goal of winning some type of prize, payout, or consideration, including participation awards. In particular example embodiments, participant may also refer those who are engaging with an entertainment experience who may be eligible for surprise-and-delight prizing without having made a specific election to join a particular match.

Player-participants are those individuals playing in a game while spectator-participants may, in some embodiments, be watching and wagering on the outcome while not playing in the match itself. For the purposes of this disclosure, both spectators and players may be considered participants. There may also be additional participant types (broadcaster-participants, for example) who may also be considered to be participants who may, in certain circumstances, be required to meet certain requirements in order to interact with the system.

Participant consideration is the money, virtual currency, virtual good, or code that is paid by a participant, player, spectator, team, or sponsor as a condition of entering a session, match, or tournament. The participant consideration may be referred to as an entrance fee or buy-in. This consideration may be paid, provided, or exchanged by a participant through any means including virtual currency, real money, or through a code, coupon, or item that grants the participant entrance to play or wager on a match or tournament.

In some embodiments of the system, a sponsor may pay the participant consideration on behalf of participants. For example, a 100-person tournament may be free to all 100 player-participants with the participant consideration paid for by the Coca-cola Company.

Participant identity is a unique set of data and markers, characteristics established by the operator to monitor and track each participant on the system. A participant identity may be a combination of verified identity characteristics and information that exists outside of the platform (phone number, social security number, and birthdate, biometric information), and, in particular embodiments, in-game history, identity, and performance, including username, match record, tournament record, purchase history, or similar characteristics. Participant identity may also be determined or confirmed by validating factors such as passwords, ip addresses, phone numbers, or keycards. Participant identity may be made up of any or all of the following pieces of information: name, age, username, phone number, social security number, tax ID number, biometric information (fingerprints, facial recognition), password, keycard ID, credit card number, user ID, location, email address, birthdate, time on site, time in-game, registration date and time, match history, tournament record, in-game player behavior, purchase history, or any other identifying data that an operator could use.

Participant profile is a participant-facing interface, displaying information unique to each participant, that the participant may use to access any number of things including their wallet and ledger, their match or tournament history, their username, their invitation list (accepted, declined, and pending, and the like), their friend list, certain data about their gameplay, and certain identification data. Participant profile is distinct from the participant identity insofar as the identity is accessible by operators for the purposes of identifying or confirming a participant while the player profile is meant to be a participant-facing interface that improves user experience.

Participation type is a characteristic or set of characteristics that the system uses to assess, track, and manage different participants who engage with a given match in different ways. For example, if a participant has the characteristic of being a player-participant, their participation type may be called "player" and the system will assess their eligibility to be involved directly in the outcome of a match. They may be listed as a player-participant under participation type. If another participant has the characteristics of a spectator—someone watching the match and potentially wagering on the outcome rather than directly impacting the result as a player might, then that participant may be described as a spectator-participant and they may have their eligibility assessed to engage with the match according to different conditions and prize eligibility requirements from a player. The characterization of a participant by type may subject the participant to different conditions as it relates to prize distribution. For example, some spectator participants may not be allowed to receive certain prize types in certain regions while player participants would be.

Payout is the process of awarding the operator consideration to the one or more participants who are deemed by the operator to have fulfilled the win condition. This disclosure deals in large part with the mechanics of the payout process.

Physical goods are a potential operator consideration type that may be offered by the operator as a prize for fulfilling the win condition. They are not a currency, and may not include real money or its equivalents, but may include such things as t-shirts, games, hats, physical games, tickets to events and other physical goods. Physical goods may also be referred to as Consumer Packaged Goods ("CPG").

A player is any participant that is playing in a game, match, or tournament.

Prize provider is any party, company, group, or individual providing a prize as part of the operator consideration of a session, match, or tournament. In one embodiment of the system the prize provider may be Versus Gaming Network, Versus LLC, Versus Systems, or a similar third party provider. In another embodiment of the system the prize provider may be a game developer or publisher or other third party operator of a session, match, or tournament. In another embodiment of the system, the prize provider is any third party company providing physical or digital goods to be awarded and fulfilled as part of the operator consideration of the session, match, or tournament. In some example embodiments of the system the prize providers will be paid for those prizes as agreed to when the prize has been made available for consideration and the fee will be paid out alongside of match or tournament resolution and prize awarding. Prize providers may be, but are not necessarily, sponsors and may be, but are not necessarily, operators.

Prize cost is the real-money cost of any prize to the operator. If, for example, a prize is a physical good or digital good, the prize may have a wholesale cost that the operator pays to the prize provider in exchange for the opportunity to use the prize as a prize, or payout, or operator consideration for a given match. As a part of the system's financial resolution process, the system will assess which prizes have been won and will determine the amount to pay to the prize provider based on the prize cost which may also be called prize provider fee.

Prize eligibility requirements are the rules associated with a given prize type that are created by the system administrator or operator. Such eligibility requirements may be used to determine whether a participant is an eligible participant or an ineligible participant for a given prize type in a given match. For example, it may be that one of the prize eligibility requirements for a physical goods prize may be that the participant is older than 21 when playing from certain regions. Any participant over that age when playing from those regions would be considered an eligible participant for the physical goods prize type. In particular embodiments, prize eligibility requirements may be among the conditions that must be met for the system to award a particular prize to a particular participant. In other embodiments, prize eligibility requirements may be used by the system to prevent certain participants from participating in a given match, while allowing other participants to participate.

Prize type is the category of any individual prize that is awarded as part of the operator consideration. In particular embodiments, a prize type may be one of the following: real money, digital good, downloadable content (DLC), physical good, or consumer packaged good (CPG). The real-money prize type may include any number of currencies, including dollars, euros, or bitcoin; the physical good prize type may include t-shirts, figurines, or concert tickets; and the digital good prize type may include any downloadable content that can be used in-game.

Pseudo-currency is a special type of virtual currency that exists only within the platform or system described herein. Pseudo-currency is a digital currency that can be exchanged either for virtual currency, virtual goods, or real money with a distinction that only the operator, facilitator, or system administrator may ever hold pseudo currency. Pseudo-currency may not be held in a participant wallet or in a bank. In one embodiment of the system, pseudo currency may be used as a mechanism to facilitate or record conditional payments transactions, enabling operators to maintain ledgers or to account for payments or inventory adjustments as one might do in certain accounting practices. In some embodiments of the system the goals of a pseudo-currency, including certain types of double book accounting, may be achieved through a different application of the rules of the system as indicated by the figures below.

Operator margin is the commission or service fee for operating a session, match, or tournament. The operator margin is sometimes used to pay for the services associated with operating a session, match, or tournament. The operator margin may be used by the operator or system administrator to pay for fees associated with facilitating services, or other 3rd party service companies such as PayPal®, Stripe, Amazon, LocationSmart®, or others. This margin may be split between the operator of a match or tournament, the system administrator, or some facilitating services. In some embodiments of the system this could also be referred to as margin, fee, or rake.

Rank is the organization and ordering of participants and prizes in certain types of matches or tournaments. Rank matches are those that have been structured to allow prizes to be awarded to more than one participant. Rank matches are matches where multiple winners may receive prizes as part of the win condition. Rank refers to the order that the participants finish in, which may then be associated with a given prize to be awarded to each rank. In one embodiment of the system, there may be a rank match or tournament that rewards the top-3 finishers. In this embodiment, the 3 best scoring participants or teams in a given match may receive a portion of the total prize. For example, the first place finisher may receive 50% of the available prize pool, the second place finisher may receive 30% of the available prize pool, and the third place finisher may receive 20% of the available prize pool. In some embodiments of the system, the mechanism for distributing prizes in a rank match may allow one or more of the available prize types to be distributed to each participant that has achieved the win condition based on their characteristics and the conditions of the match. One skilled in the art will understand that it is a unique aspect of this system that it may be able to identify and distribute different prizes, and different prize types, to different participants based on the way that the individual participant characteristics match with the conditions for distribution for each prize. In a particular example embodiment, the system may determine that the first place rank may receive real money, and the participant in the second place rank may receive digital goods, and the participant in the third place rank may receive physical goods. In particular embodiments, all ranks in a given match may have multiple prize types available at every rank. In some embodiments of the system, a single winner match, or winner take all style match may be considered a ranked match where there is only a single rank and the winner is awarded the first rank and they may be awarded up to 100% of the available prize.

Real money is any currency that can be exchanged for goods and services outside of the game or the game platform. Examples of real money may include dollars, euros, pesos, yuan, and bitcoin. Bitcoin is an unusual example in that it is both a virtual currency and, for the purposes of this disclosure, a real currency—the key distinction in this paper is that real money currencies exist and can be spent, earned, won, or lost, outside of the game platform while virtual currencies are created by the operator(s) primarily for use in-game or within the platform.

Regional restrictions are participant and prize eligibility restrictions established by an operator or system administrator. In some cases, regional restrictions can be concatenates or combinations of participant and or game characteristics that determine the basis for whether participants may participate in certain matches, or whether participants are eligible for certain prizes. For example, a region (Region X) might be restricted such that no participants of any type below 18 years of age may play for real money, but player-participants (and not spectator participants) as young as 13 years of age may be eligible for downloadable content as a prize type. In this case Region X could be said to have regional restrictions on age, participant type, and prize type. Regional restrictions may appear in some versions of the platform as a list of thresholds or a simple concatenate of terms that represent minimum eligibility requirements for participation in matches or minimum thresholds for the receipt of certain prizes. Regional restrictions may be a large part of the calculus for how the system determines whether a region is restricted or available.

Restricted regions are all of those geographical regions where participants currently in those regions may not participate in a match or tournament. Not available regions are defined by the System Administrator and cannot be changed by an operator. System administrators may use federal, state, or local laws as part of their calculus for determining a restricted region. In particular example embodiments, an operator may determine that the state of Tennessee should be considered a restricted region for any participant type, match type, prize type, or for any age of participant. In this example, no participant, once it is determined that they are currently located in Tennessee, may participate in any match. Participants may be notified of the region's status, but that notification may then not allow them to participate. In the event that the system administrator has determined a region to be restricted, the operator will not have the ability to make the region available.

Session is a length of time during which a player or other participant is determined by an operator to be engaged in participating in a game. In some embodiments, it may be that a session is determined by the operator to be the period of time where a participant is logged into, and actively engaging with the platform. In particular embodiments, an operator may determine that a session may extend across a single match, across multiple consecutive matches, or across several separate matches, which may comprise a laddered tournament. It may also be that, in some open-play or open session environments that a session is defined as the period of time that the participant is logged in to, and playing on, or engaging with, the platform. In one embodiment of the system, a session is the period of time between when a participant logs into and logs out of their PC, console (playstation, xbox or similar), or mobile device (iphone, android phone, smartphone, tablet, wearable device, and the like).

A session length may consist of several matches over the course of two to three hours, for example. At the operator's discretion, there may be artificial "check-in" prompts periodically to prove that a participant is actively engaging with the platform, or an operator may put a cap on session length (sessions may not last for more than 8 hours, for example, or a prompt may appear every two hours, or two days, to encourage participants to re-submit certain location or other data to confirm active engagement). In particular embodiments, over the course of a session, a participant's participation type (changing from player to spectator, for example) may prompt the system to ask the participant to enter new characteristics or for the system determine additional characteristics that would help the system to determine participant eligibility status for the remainder of the session.

In one embodiment of the system, a participant's location may be verified by the system at the beginning of their session and any prize types that said participant may be eligible for based on their location, age, and participant identity characteristics, may be determined for that active session at that time. In some embodiments, a participant may not materially change locations (such as from one state to another) during their session or they may risk breaching their terms of service. Additional in-session location checks may be performed during a session to ensure compliance. Any participant whose location is deemed undetermined by the system may be ruled ineligible for certain matches and prizes for the duration of the session, or until their position-location can be determined.

Spectator or spectator-participant is any participant in the system who is watching and potentially wagering on the outcome of a game, session, match, or tournament where they are not also participating as a player.

Sponsor is a party that is not the participant who promotes a session, a portion of a session, a match, or a tournament. For example, in one embodiment of the system, a sponsor may pay the participant consideration for a match or a set of matches for a certain number of participants. In another embodiment, sponsors may provide the prize for the match. In another embodiment, the sponsor may provide advertising to promote a match. Sponsors may be individuals or companies. Sponsors may provide prizing for a given match or set of matches. For example, a sponsor may work with an operator to create a promotion where the top score of the day wins tickets to an event, brought to you, for example, by sponsor Live Nation, or the winner of a given match or tournament wins a Tesla Model S car, brought to you by sponsor Tesla. Sponsors may enter into agreements with operators such that certain matches have no participant consideration—instead, that consideration may be said to have been paid by the sponsor and in such an example, the entry into that match may be free for participants to enter. Sponsors may also advertise the platform, the system, or a given match online or through any type of media to promote the matches and bring awareness of their goods or services to the participants in those matches.

Surprise and delight is a particular type of prizing that may exist in some embodiments of the system where the participant may, through their behavior in-game or as a part of their entertainment experience, or even as a part of their daily activities, trigger a prize distribution. Surprise and delight prizing may be distributed without the participant having specifically elected to join a specific match or tournament, or without the participant having paid a participant consideration. In such an instance, the system may determine that a participant's characteristics match with certain conditions created by an operator and that as such, the system may determine that the participant has earned a prize. In particular embodiments, the participant may be unaware of their participation in the promotion, game, or activity; it is even possible that such a participant may not have paid a participant consideration, but nevertheless, the condition-characteristic matching performed by the system may result in a prize being distributed to such a participant. In particular example embodiments, an operator may create a sponsored, open-ended play condition where any player participant who achieves a certain goal or performs a certain task (killing a level boss, or base-jumping off a certain skyscraper, or completing a difficult puzzle) will be rewarded automatically by the system. In this embodiment, the system would reward that participant automatically by sending them a QR code, bar code, coupon, or similar, to receive a particular sponsored physical good. In cases like this, a prize provider and an operator will have created a unique and novel mechanic to automatically reward, surprise, and delight, particular participants through the conditional prizing system through a process of condition-characteristic matching. One skilled in the art will understand that programmatic awarding and distributing of surprise and delight prizing within interactive entertainment, such as video games, is a novel advertising network technology.

System Administrator is any group, organization, or company that is operating the systems and platforms described in this disclosure.

A team is any group of participants who make an election to a match together or any group of participants who the system has determined must work together to achieve a common win condition. In particular embodiments, teams will work together in-game in an effort to win prizes in a given match. In some embodiments of the system a team is defined by the operator prior to entering a match. A team may comprise one or more participants. For example, in one embodiment of the system a single participant joining a match may be considered an individual team with the participant as the sole member of a team of one. In particular embodiments, the participant may also act as the captain for the team making certain elections on behalf of the team, just as in some embodiments, the system may designate, or participants may choose, a team captain who is responsible for certain activities, including in some embodiments, providing the participant consideration, choosing the match, the map, the team colors, and the like.

Tournament Consideration is the full amount of the prize pool which may in some embodiments be calculated by taking the total number of participants in a given match and multiplying by the individual participant considerations that have been paid. The aggregate tournament consideration is sometimes referred to as total buy-in or prize pool.

Transaction is any event in the system that represents an exchange through ledgers in the system. A transaction can be of three states: pending—during which the transaction has been initiated and is not yet complete, failed—when the transaction has failed for any reason, and succeeded—wherein a transaction has been completed and funds, currencies, or pseudo currencies have been transferred to the wallets or ledgers in reference. In some embodiments of the system a failed transaction will not exchange funds and the effective balances for both wallets or ledgers will remain the same.

Virtual currency is any digital money that can be exchanged for something of value. It is set apart from real money for the purposes of this system because virtual currency is issued by a match or tournament operator and in most cases will have no physical analog and will be primarily used in-game, in-match, in-tournament, or within the platform while real money may be earned or spent outside the system. For the purposes of this system, participants may exchange real money for virtual currency which can be spent, won, or lost in-game or within the platform. In many cases, the virtual currencies described herein will come in the form of coins, or credits, or tokens that a participant may win, lose, use, spend as consideration, or exchange in-game or on-platform. The key distinction between virtual currency and virtual goods is that virtual currency can be exchanged for real money whereas virtual goods cannot. This is an important distinction which someone skilled in the art will recognize as a meaningful component of a larger, novel approach.

In particular embodiments, a participant may use real money to purchase either virtual currency (as a type of currency exchange), or virtual goods (as a transaction) but while virtual currency can be exchanged back into any type of real money including dollars, euros, pesos, etc. virtual goods cannot be exchanged for real money. In some embodiments, operators may take additional steps to safeguard virtual goods from being exchanged for real money. For example, an operator may eliminate stores or exchanges where participants may exchange goods, or operators may code the virtual goods in such a way that they may only be used by particular participants, and are not transferable. In some embodiments of the system, only participants who have the specified characteristics that qualify them to receive an operator consideration of real money may receive virtual currency (as opposed to virtual goods) because virtual currency can, in some instances, be converted into real money. Virtual currency may, from time to time, have an exchange rate with any real currency that may be adjusted according to a type of monetary policy administered by an operator or system administrator.

Virtual good is any digital item that can be purchased, earned, won, used, or lost, in-game, on the platform, or within a virtual world. Virtual goods may include digital gifts, for example, clothing, armor, or weapons for avatars, or unlockable in-game characters. Virtual goods may also include services, or bonuses available to participants or their in-game avatars or in-game characters, teams, or worlds. These virtual goods are a separate prize type in that they may be considered to be only valuable inside the game or inside the platform. Virtual goods may not be exchanged for any type of real-money, such as dollars, euros, or yuan. One skilled in the art will recognize a virtual good as a particular type of downloadable content, sometimes referred to as DLC. One skilled in the art will note that certain aspects of virtual goods, including the fact that in some regulatory environments, virtual goods do not have any real-world value, may make this prize type an important component of a larger, novel system for addressing conditional prizing and prize-based gaming.

Virtual players or virtual participants may include bots or non-human software programs that may be designed to mimic the actions of a player or other participant in a given game. In one embodiment of the system, virtual players may be used to assess a participant's skill level so that they may be matched with other real participants of similar skill. In another embodiment of the system, participants may play against any number of virtual players in a given match or tournament. In another embodiment of the system, all of the player-participants in a given match or tournament may be virtual players, for example, in a contest of who can write the best bots for a given game. A match made up of all virtual players may also help to determine the outcome for some types of games where the participants manage virtual players or groups of virtual players rather than compete directly with another live participant. Virtual players may also be used by an operator as a part of a quality control or fraud-detection system.

Wallet or ledger is a database associated with each participant, operator, or facilitator where the participant, or operator or facilitator's real money, virtual currency, or awarded-prize-receipts or codes are stored or tracked. In some embodiments of the system the wallet or ledger will contain the list of all transactions, including where and when those transactions took place, for accounting and other purposes. Wallet owners may access their wallet or ledger in any number of ways that are well known to those skilled in the art, whether on their own local computer, their own computer, server, machine, or device, or on an operator's computer, server, machine, or device, or via a cloud-based computer, server, machine, device, or on a third-party computer, server, machine, or device—for example, those owned and operated by a bank.

Whitelist is a method for determining conditions that are unique to a region for the purpose of clarifying participant eligibility or prize eligibility for those participants who are participating in a match while located in that region—similar to a blacklist with the difference that a whitelist may describe conditions that may allow participants in a given region to be eligible for certain matches or prize types, while a blacklist may make it such that a participant may be ineligible for certain prizes while participating from a given blacklisted region.

Win condition is a condition or set of conditions that, having been met, trigger a prize distribution by the system. A win condition may also describe a game state that must be reached to establish the order of finish in a particular match or tournament such that prizes may be distributed. In particular embodiments, a win condition may be reached by multiple participants that may then be sorted by the system or by the operator into ranks. For example, a first, second, third, fourth place finisher through to X place may achieve the win condition and each participant may be awarded a prize consistent with their rank. In particular embodiments, there may be a winning participant or team and a losing participant or team. In particular embodiments, the winning participant or team of participants may be the only participants that the system determines to have met the win condition. In particular embodiments, the win condition may be established by the operator and is known to all participants prior to acceptance of their consideration for entry into the match or tournament. In other embodiments, the win condition may be met by a single participant, playing alone and achieving certain achievements. In other embodiments, especially those that have surprise and delight prizing, the participant may not be aware that they are participating with a prize as the goal. In this case, it may still be possible for such a participant to be determined by the system to have achieved the win condition. Regardless, the achievement of the win condition by a participant or multiple participants may be seen as the catalyst for prize distribution and fulfillment.

Operators, and in particular embodiments, participants, players, or teams, may establish and agree, in advance of the match or tournament, upon the win condition that will be used to determine the order of finish. This win condition may be an in-game goal, such as most points, most kills, checkmate, capturing a flag, controlling an area, scoring a certain number of points, collecting victory points, or completing a mission. The win condition may also be a loss avoidance or piece elimination condition, such as being checkmated, running out of cards, running out of hitpoints, being tagged, or it may be a puzzle-guessing condition, such as successfully solving a puzzle or a riddle, or it may be a race to advance beyond a certain position, or amount of points, or it may be a condition that requires participants or players to acquire or assemble a set of resources into a defined winning structure or into a structure that is determined to be better than the structures of other participants. A win condition may also be the completion of certain achievements or sets of achievements while in-game. For spectator-participants, their win condition may be that the team or player that they support or wager on has achieved their own win condition. The win condition may also be any combination of achievements or loss-avoidance that has been established by an operator. In particular embodiments, the win condition may be such that multiple participants may achieve the state, or it may be that in some matches that only one participant may achieve the state. In particular embodiments, achievement of the win condition may confer the operator's consideration on the winner(s) according to the conditions of the session, match, or tournament.

FIG. 1 illustrates the methods and processes for creating and managing conditional payment matches and sessions. FIG. 1 describes the methods and processes involved in one embodiment of the system to create and manage conditional payment games and interactive experiences. Before a participant ever elects to participate in a given match, an operator must first define the conditions for prize fulfillment step 2, which will be described later.

In step 2 of FIG. 1, an operator may use the system to create any number of conditions including, not limited to, the following: the necessary participant characteristics appropriate to trigger the awarding and distribution of which prize types; what win conditions are appropriate for each match; how many matches will exist; where those matches will be displayed; and what other conditions must be met by a participant to trigger prize fulfillment. This process may take place in an operator-facing dashboard with a graphical user interface like those described in the FIGS. 11A-D.

In step 3 of FIG. 1, match instances are managed. In particular embodiments, an operator may then use the system to replicate individual match instances or manage the implementation of such condition-characteristic matching as may exist in either an open-ended or a close-ended session, or in individual matches, or in groups of matches such as those that may exist in a match or tournament. Such management may include, but is not limited to: tracking and analyzing participant demographics and behaviors; recording and evaluating match completion characteristics; and monitoring and confirming prize distribution information.

In step 3 of FIG. 1, managing match and session instances also may include mechanics where an operator may use certain techniques to prevent fraudulent or abusive behavior by participants, as well as mechanics to improve fairness and balance within sessions, across matches, and across multiple online participants. Match replication and management may also include, in some embodiments, technologies and methods that enable operators to easily adjust to shifting legal and regulatory standards by, among other things, monitoring regional rules, laws, and regulations for states, countries, and territories such that certain match conditions may be adjusted either in an automated fashion or through a graphical user interface that enables operators to offer and then replicate new match and session conditions that are consistent with changing legal, regulatory, and business needs. For example, in this step the system may have a dashboard element that allows operators to remove certain prize possibilities from any participant who is determined to be playing from a given location. In that way, the system allows the operator to change playing conditions for future matches such that certain state or local laws may be adhered to. The system's ability to manage dynamic regulatory compliance in this way would be recognized as novel by anyone skilled in the art. This process may take place in a dashboard with a graphical user interface like those described in FIGS. 3A-3B.

In step 4 of FIG. 1, a participant session may be initiated and participant eligibility determined for that session. In particular embodiments, once the operator has established conditions, created mechanics for condition-characteristic matching, and used the system to replicate and automate the management of sessions and matches, the operator may, in some embodiments, choose to architect the system such that the next step is to allow an individual participant to elect to begin a session which may initiate a process that determines that participant's eligibility. To be clear, the operator may also choose to establish participant eligibility at some alternate time. For example, in some cases and in some embodiments, an operator may choose to establish participant eligibility at the moment that a participant registers with the system, or instead just prior to a match initiation, or even at the completion of a match or session. In any case, while an operator may choose to evaluate participant eligibility at any or all of these points, or at any other point in time in the session, the system does require this eligibility evaluation to take place, at least once, at some point during the participant's time engaging with the system. Conditional payments, conditional prizing, and condition-characteristic matching require, at some point, the evaluation and assessment of at least some of a participant's characteristics to determine their eligibility for certain prizes within the context of certain match and/or session conditions. This characteristic assessment may even be ongoing, and in real-time, but in every case, the assessment will take place at some point in the course of the participant's engagement with the system. One skilled in the art will note that this step is a key element of the novel system of conditional prize matching. In the particular embodiment described in FIG. 1, the participant's eligibility is evaluated and established at the session-level, at the creation of each session. Alternately, in particular embodiments, eligibility and characteristic assessments may take place before or after each match or prior to prize distribution. The process of characteristic assessment and other processes will be described in greater detail in FIGS. 4A-4C.

In step 5 of FIG. 1, match options are presented to participants. In particular embodiments, once it has been determined by the system that a participant has initiated a session, and that they have been deemed eligible by the system for certain prizes, then in this embodiment, the system may then execute the process to present match and session options to a participant. One skilled in the art would understand this as a lobby or as a series of sortable match options that the participant may choose to participate in. In some embodiments, participants would be able to sort through the match options, in other embodiments, the system will sort based on criteria such as prize availability, prize promotion, new match-type promotion, participant characteristics, elections, or history such as the participant's favorites, etc. In still other embodiments, such as the surprise and delight sessions, there may be no separate lobby beyond the normal participant elections to begin a session. The participants in such instances would simply elect to participate in the session or match by electing to play in the game. This process of match election, selection, and display is described later in FIG. 5, and may include any one of several well-known match display and sorting systems.

Figure 6:
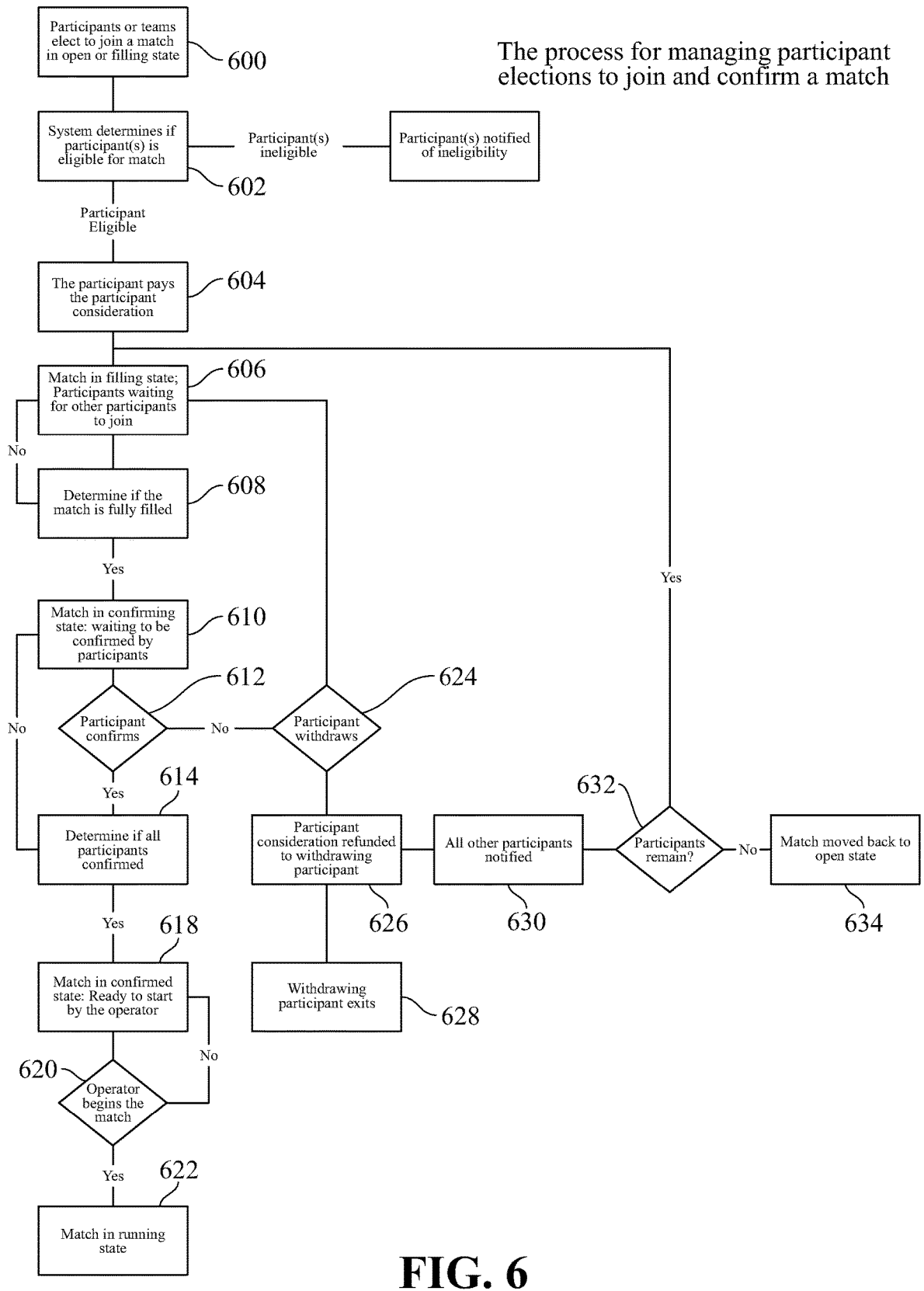
FIG. 6 illustrates an example method for managing a session.
Figure 6A:
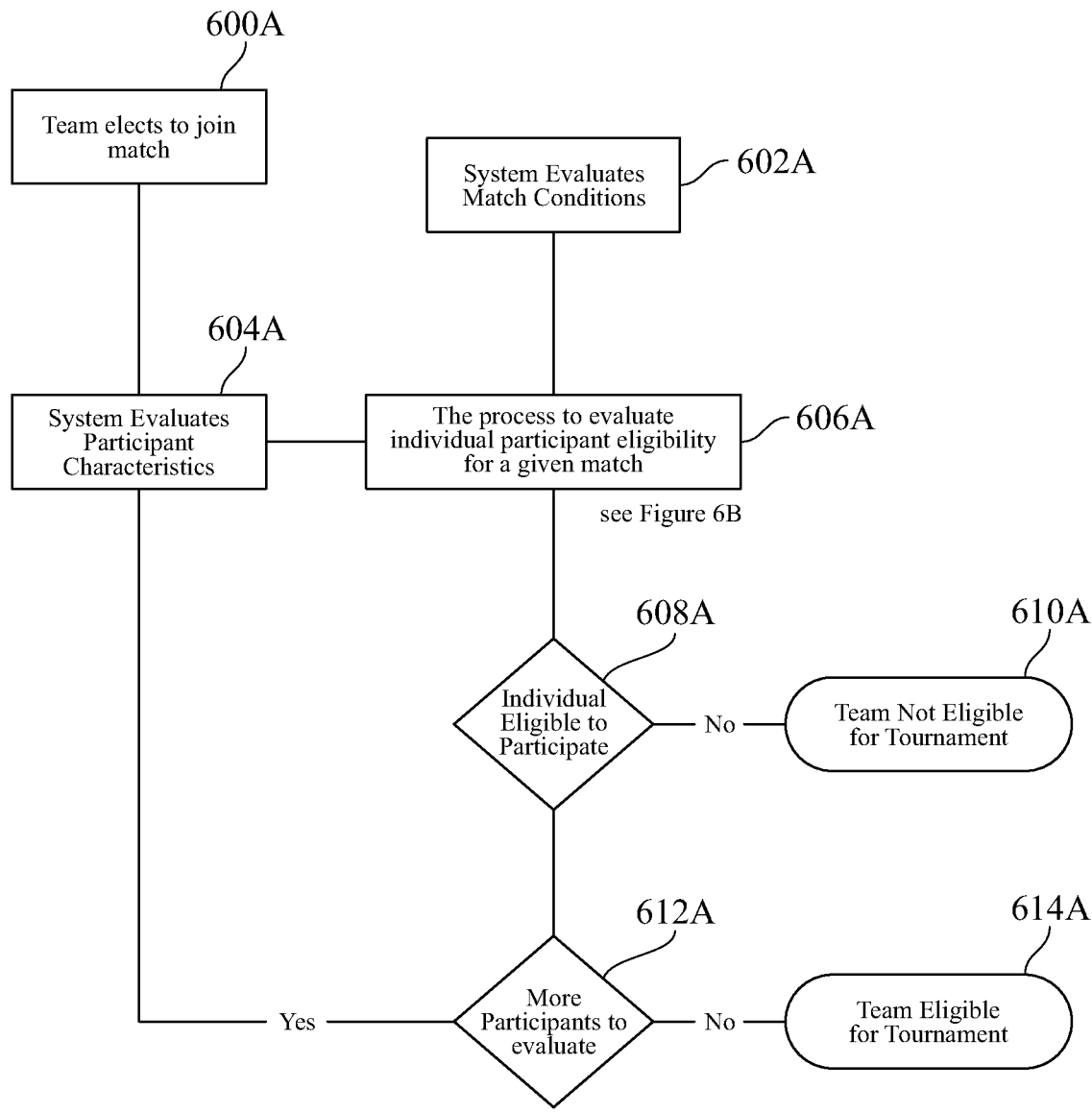
FIG. 6A illustrates an example method for evaluating team eligibility.
Figure 6B:
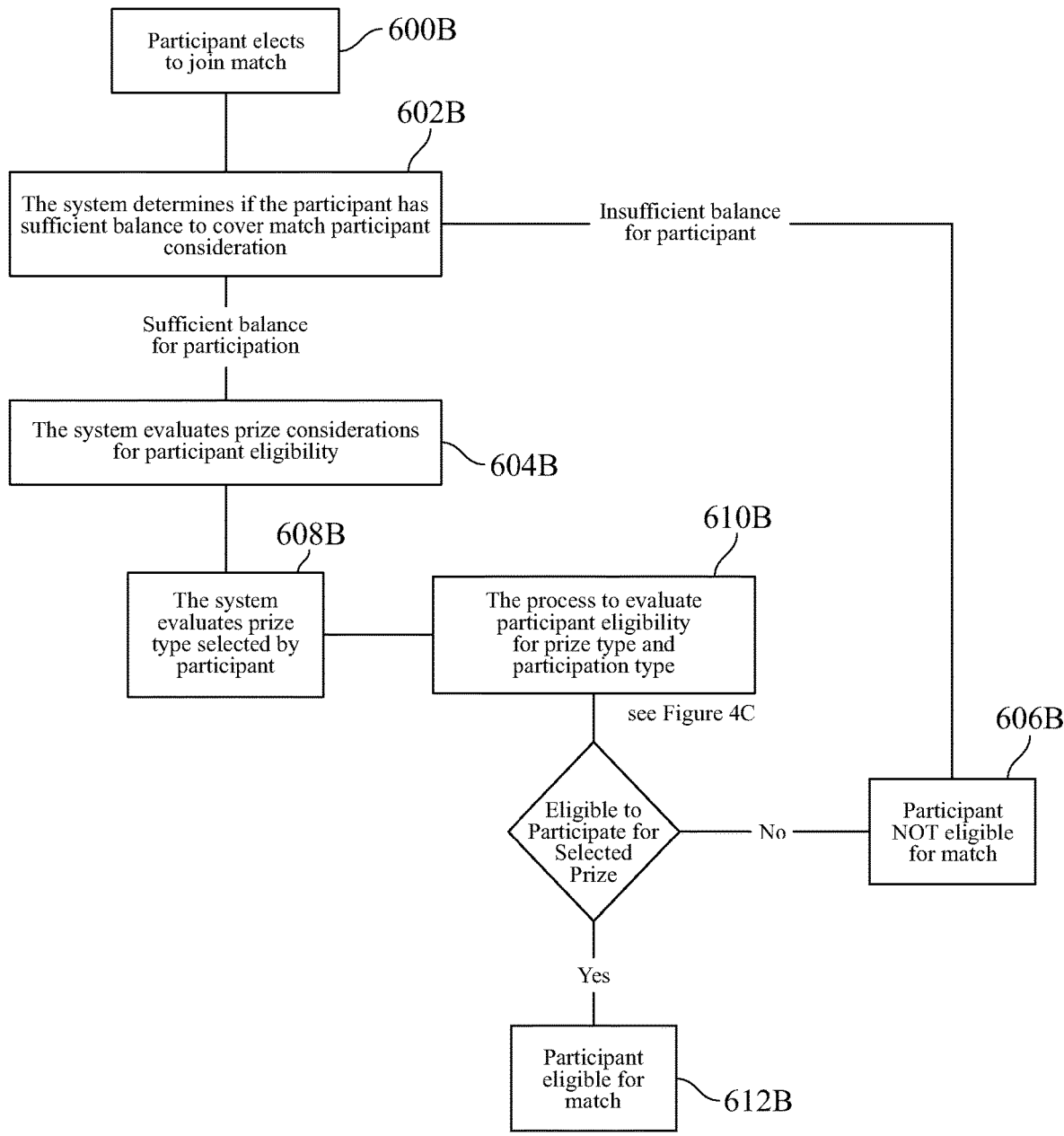
FIG. 6B illustrates an example method for evaluating individual eligibility.

In step 6 of FIG. 1, participant elections to join and confirm a match are managed. Once the system has displayed the available matches to the participant, the participant may, in some embodiments, elect to join a match. In this case, the system would trigger the process for managing participant elections to join and confirm a match. This stage, described in FIGS. 6, 6A, and 6B, is the point in the process where the platform moves a match from the filling state through the confirming state to the confirmed state to the running state. As discussed, the process to initiate participant session and determine participant eligibility for the session may be initiated at this moment, or even later in the session, prior to the prize being distributed, but in this embodiment, the participant's match election and confirmation process is described in FIGS. 6, 6A, and 6B wherein a participant, or team of participants, or a participant acting on behalf of a group of participants, elects to join a given match. In this case, their eligibility for a given match and a given prize type, as well as their ability to pay the participant consideration, and the successful payment of that consideration, will each play a role in allowing the participant to fill a slot in the selected match. Once all the slots in a given match are filled by eligible participants who have either paid the participant consideration, or have had that consideration paid on their behalf as in some types of sponsored match, then a match may be confirmed and move to a running state.

In particular embodiments, there will be a fixed number of participant slots that, once filled, will trigger the system to move the match to the running state. However, in some cases there may be matches, tournaments, or sessions, including surprise and delight sessions, that do not have a fixed number of slots that must be filled for a match to move to the running state. For example, in a match with a fixed number of player-participants, but an unlimited possible number of spectator-participants, then in some embodiments, such a match may be deemed filled at the point at which the requisite number of player-participants have confirmed and met certain thresholds defined by the operator, regardless of how many spectator participants are watching or wagering on said match when the operator and the system have triggered a transition of the match to the running state. It may be that the system, in some embodiments, allows spectator-participants to watch or wager throughout any point of the match. In this case, the controlling issue for the match to move from the filling state, through the confirming state, to the confirmed state, to the running state, will be the presence or absence of the requisite number of qualified player-participants and not the number of spectator participants. FIGS. 6, 6A, and 6B describe this process of managing participant elections to engage in a match in greater detail.

Figure 7:
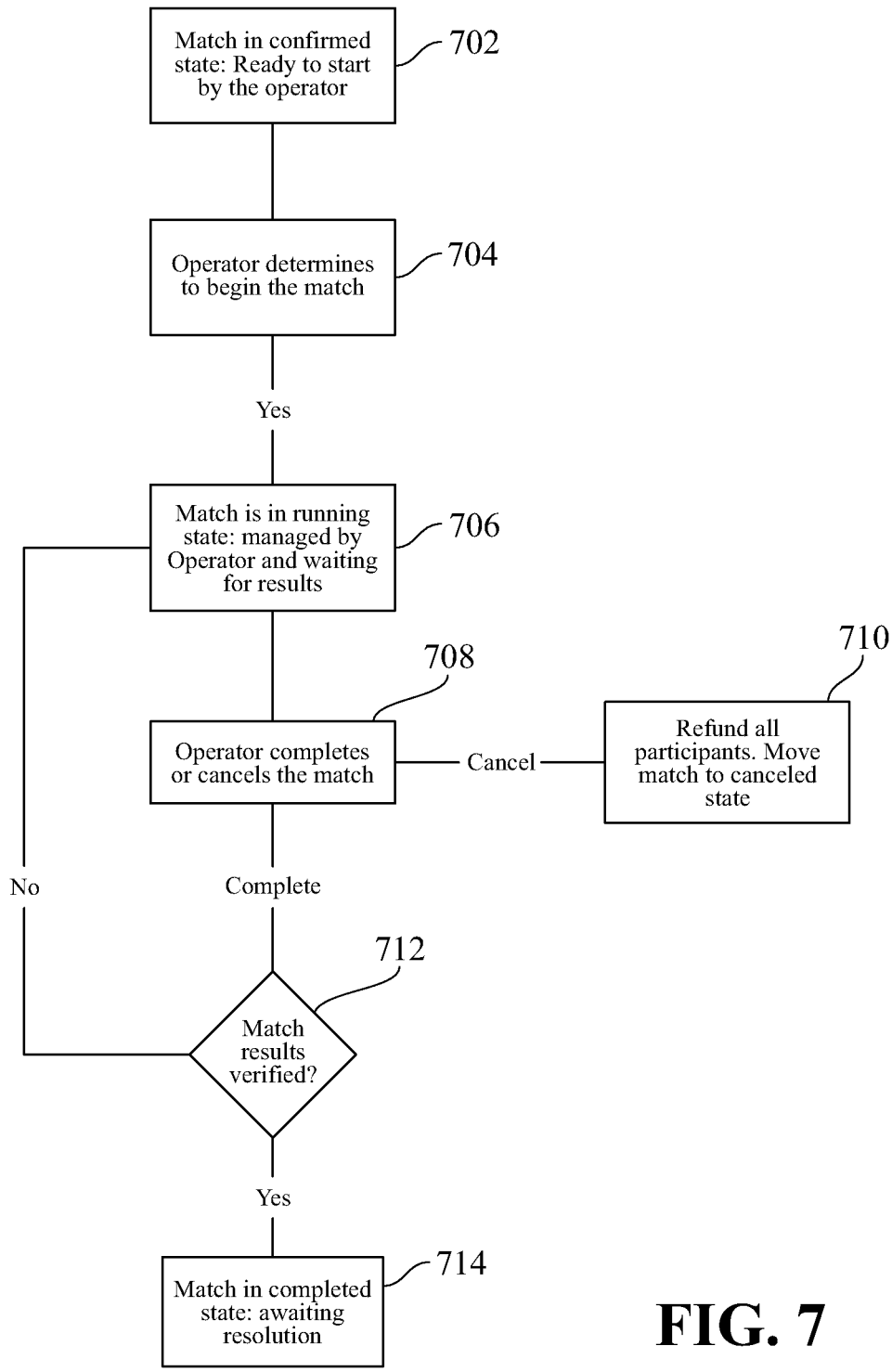
FIG. 7 illustrates an example operation of a multiplayer match.

In step 7 of FIG. 1, a multiplayer match is operated and the results are reported. In particular embodiments, once the match has moved to the running state with a full complement of participants, then the operator can run the match using methods that are well known in the art. A match may be hosted by an operator, a system administrator, or some other facilitator, but the results of the match will be returned to the system. The match itself will resolve through the process of participants engaging with the game until the match has been completed, and/or the win condition has been achieved, and/or the achievement has been completed, and/or the conditions have been met—or until the match has been cancelled. In any of these cases, the operator may then use any one of a number of well-known techniques, including an API call, to report verified results and outcomes of the match to the system. In the event that the match has resolved and results have been verified by the operator, the operator may make an API call or similar transmission to the system to inform the system of the outcome of the match, triggering a transition of the match to the completed state awaiting resolution and prize distribution—a state that will be described later. In the event that the match has been cancelled for whatever reason by the operator, by a participant, group of participants, or by another actor, the operator may make an API call or similar transmission to the system, triggering a change of state of the match to the cancelled state where the system may refund all participants their participant consideration, or place those monies into escrow for future matches, or distribute those monies in other ways. FIG. 7 describes in greater detail a process where the operator manages a match and reports results.

Figure 8:
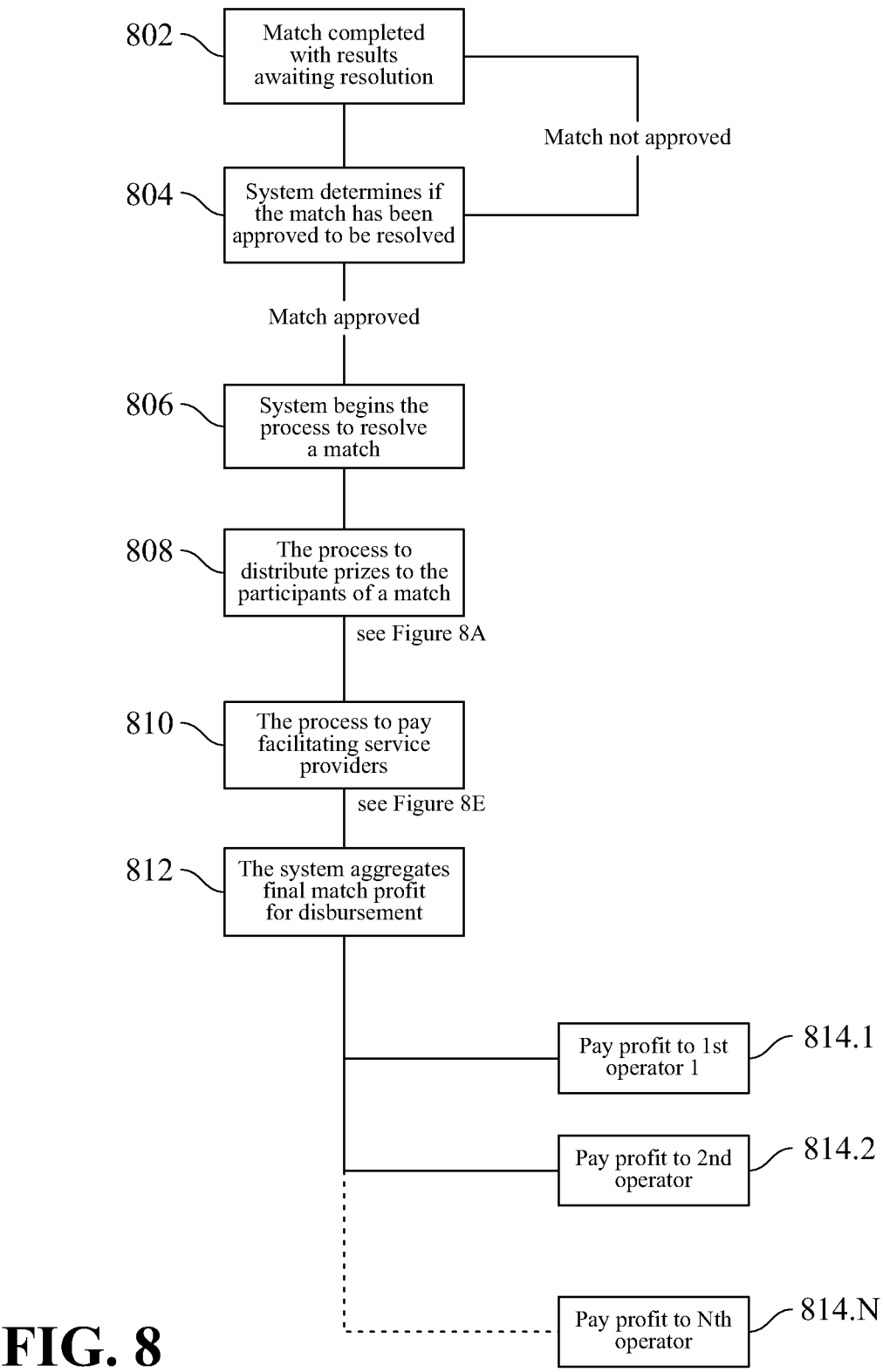
FIG. 8 illustrates an example method of resolving a match.

In step 8 of FIG. 1, a match is resolved. In particular embodiments, once a match has been resolved, the system may then use the process of conditional prizing with condition-characteristic matching, to resolve the match and award the relevant prizes to participants. The system may also, at this stage, distribute some or all of the total tournament consideration to qualified participants, operators, facilitators, service providers, and other parties. FIGS. 8, 8A, 8B, 8C, 8D, and 8E provide greater detail on how the system resolves a match, and then takes the information from that match and, in some embodiments of the system, includes additional participant characteristics, to acquire prizes and award them to participants. These figures also show how the system automatically distributes funds to the accounts of service providers, facilitators and operators. The system may, in FIG. 8, make determinations that a participant, or any number of participants, are eligible for one or more of the following prize types: digital goods, virtual currency, honor, physical goods, or real money—all based on the manner in which the match has been resolved, with respect to winners, ranks, etc. as well as the individual or team participant's characteristics. In the processes described in FIG. 8, a match may be resolved, prizes may be awarded, facilitators may be paid, and operators may be given their portion of the profit. The unique and novel element of FIG. 8, is the process that allows different participants to receive different prizes based on their individual characteristics— including participants who are on the same team and have achieved the same in-game objective, win condition, or achievement.

Figure 9:
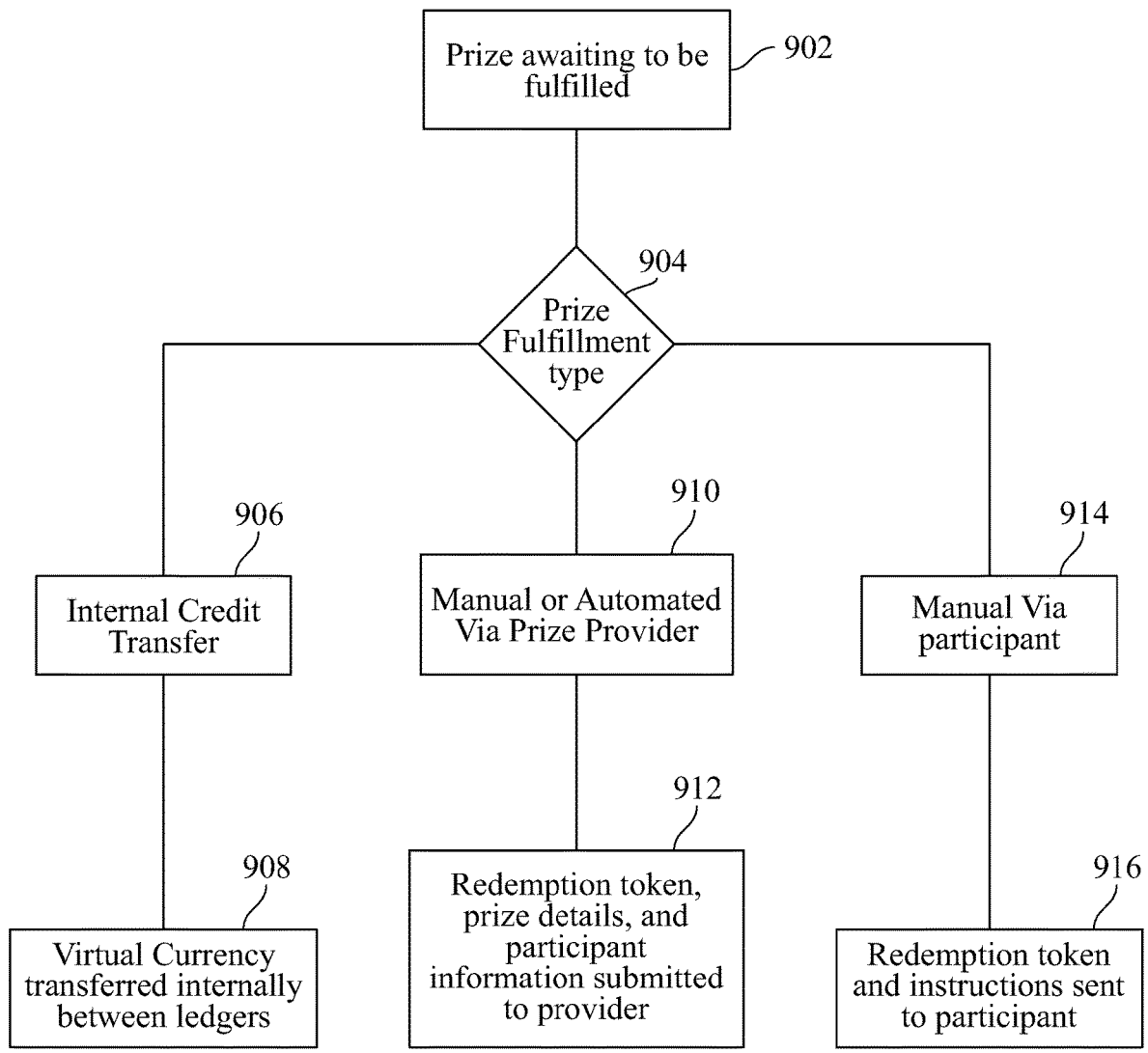
FIG. 9 illustrates an example method of prize fulfillment.

In particular embodiments, once a match has been resolved and participant's prizes have been awarded, then participants may go forward in having their prizes fulfilled. People skilled in the art will see that many well-known methods may be used to convert an awarded prize, which may be in the form of a code, a coupon, a physical or electronic certificate, or any other demonstration of the earned award—into a physical good, digital good, virtual currency, or real money award. Each participant will be able to convert their awarded prizes into fully fulfilled prizes by means of credit transfer, ACH, redemption tokens, coupons, QR codes, shipping confirmation, invoices, or any other method for the fulfillment of goods and services. FIG. 9 describes this prize fulfillment in greater detail.

Figure 1A:
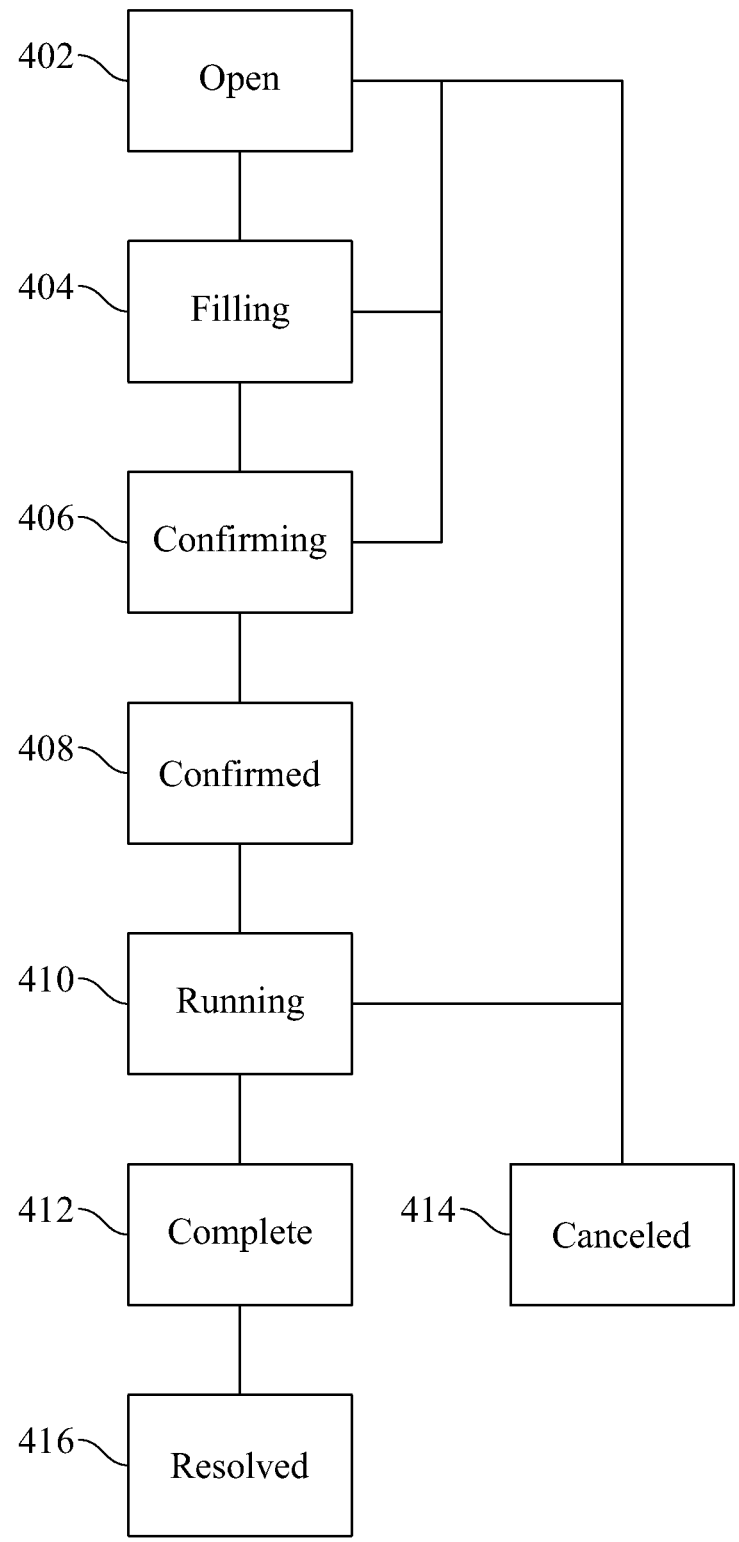
FIG. 1A illustrates an example match lifecycle.

FIG. 1A illustrates a lifecycle of a match. All matches begin in the open state 402. A match in the open state is empty and any teams or participants can attempt to join. When participants, player participants, or teams begin to join a match their characteristics are evaluated against the conditions of the match as defined in FIG. 6. When the first player, participant, or team successfully joins the match the match transitions to the filling state 404. A match in the filling state 404 means that more players or teams are able to join if there are open slots available. Participants can withdraw, or leave, the match and as long as other participants are present in the match the match is still in the filling state 404. As soon as all participants have withdrawn and the match is empty the match transitions back to the open state 402. As soon participants have joined and there are no more open slots to be filled the match transitions to the confirming state 406. In the confirming state 406, all participants are required to confirm their slot. Participants confirm their slot to agree that they would like to participant in the selected match with the current conditions against the other participants who reside in the other slots. The act of the additional confirmation allows participants an additional opportunity to withdraw from the match before it begins and a refund of the consideration is allowed. While the match is in the confirming state 406, a participant is still allowed to withdraw. When the first participant withdraws from a match in the confirming state the match transitions back to the filling state 404. Once all participants in a match have confirmed the match transitions to the confirmed state 408. In the confirmed state 408 the operator of the match begins the match and the match transitions to the running state 410. A match in the running state 410 has no additional interaction from the system until an operator takes action. A running match in running state 410 may either be completed or cancelled. If the operator determines that the match cannot resolve or that the match was not completed correctly a match can be cancelled and the match will be transitioned to the cancelled state 414. A match can also be completed with the results of the match and will be transitioned to the complete state 412. A match in the complete state 412 has been verified that the match can be resolved. Once a match is in the complete state 4122 the system can continue to resolve the match and the match will be moved to the resolved state 416.

FIGS. 11A-D illustrate example graphical user interfaces (GUIs) or user experience (UX) for an operator or system administrator. FIGS. 11A-D describe the system interface and dashboard as they are seen by an operator or system administrator. The novel elements of this portion of the system include processes that allow an operator to add, manage, and replicate matches, as well as adjust conditions automatically so that, for example, they may be consistent with federal, state, or local laws—a type of dynamic regulatory compliance, which is unique to this approach. For example, the dashboards described in FIGS. 11A-D may allow an operator to make it such that no participant who is playing or spectating from a given state or jurisdiction, may be eligible for certain prize types, including real money. The system may then adjust those conditions and propagate them throughout any number of matches going forward.

FIG. 2A illustrates an example method for determining participant session characteristics.

Figure 3A:
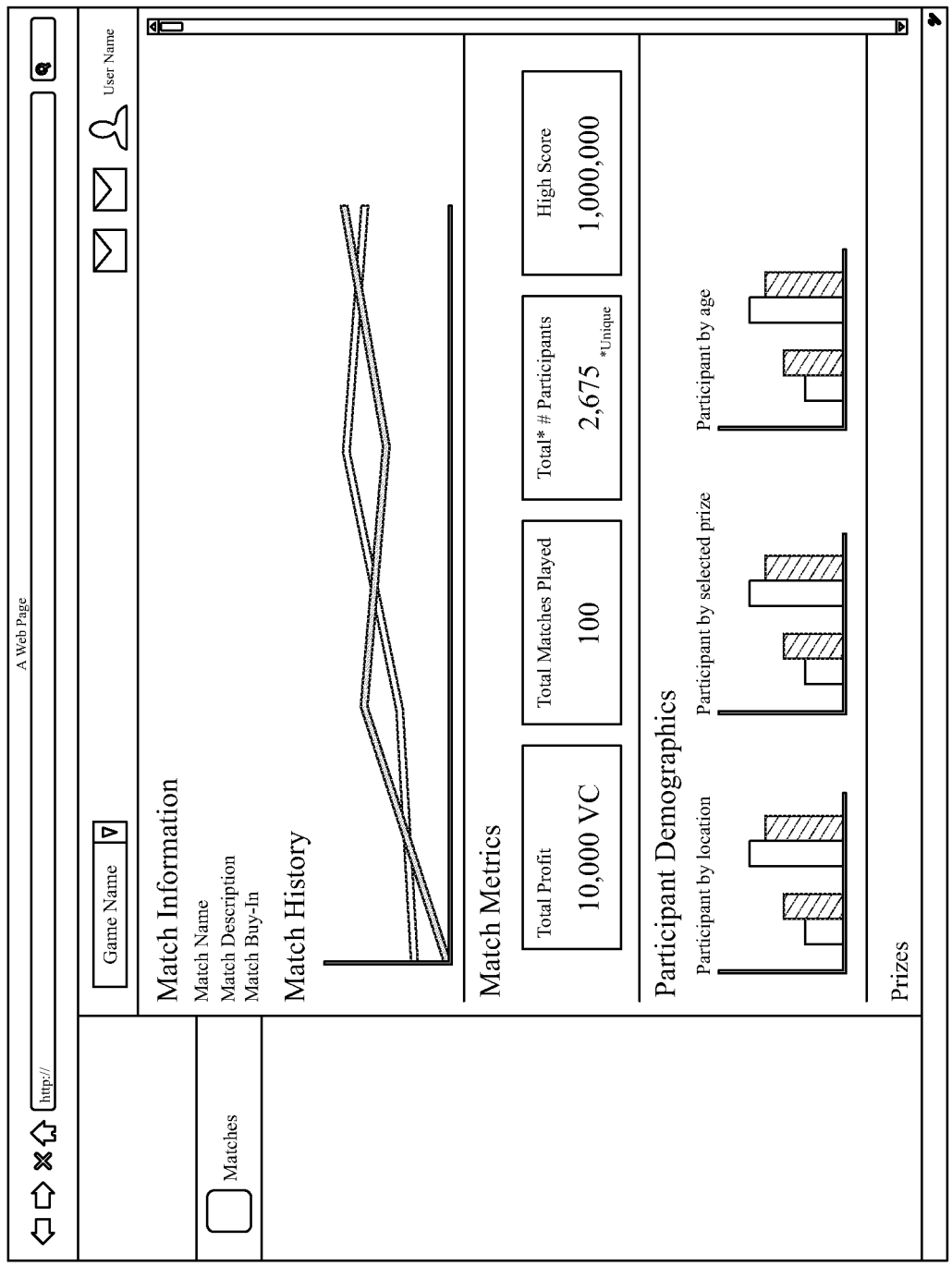

FIGS. 3A-3B illustrate example GUIs for managing match instances. In particular embodiments, the GUIs shown in FIGS. 3A-3B represent methods and processes for managing match instances, including, in some embodiments, mechanics for tracking and recording participant characteristics and behaviors.

Figure 4:
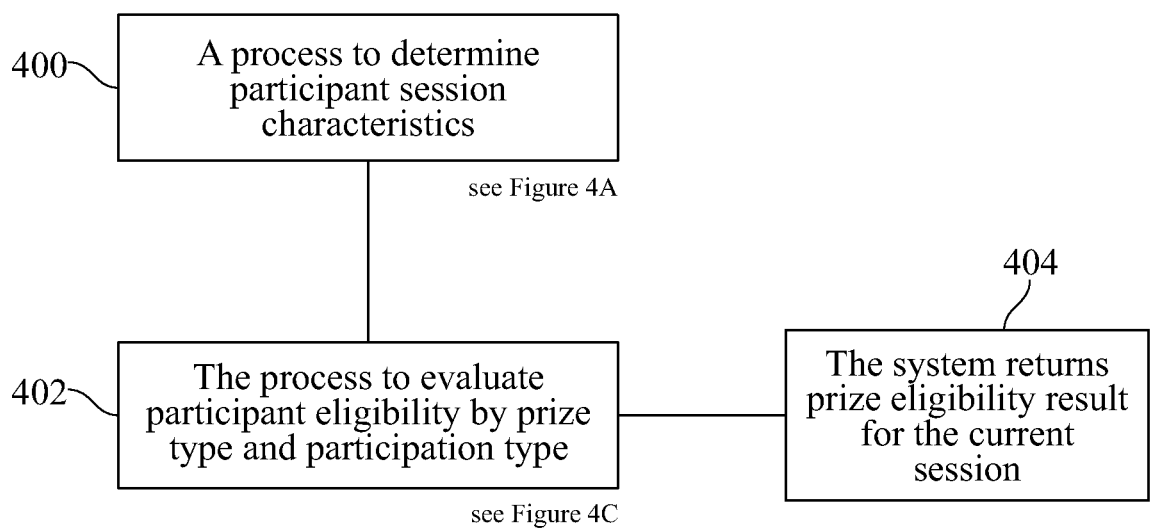
FIG. 4 illustrates example method of initiating a session and determining participant eligibility.

FIG. 4 illustrates a process of initiating a participant session and determining participant eligibility for the session. In step 400, a system determines session characteristics for a participant, which is further described in FIG. 4A. In step 402, the system uses the current participant session characteristics to determine their match eligibility based on prize type and consideration type, which is further described in FIG. 4C. Once the system has determined the eligibility the system stores and returns that information for the length of the participant's active session, in step 404.

Figure 4A:
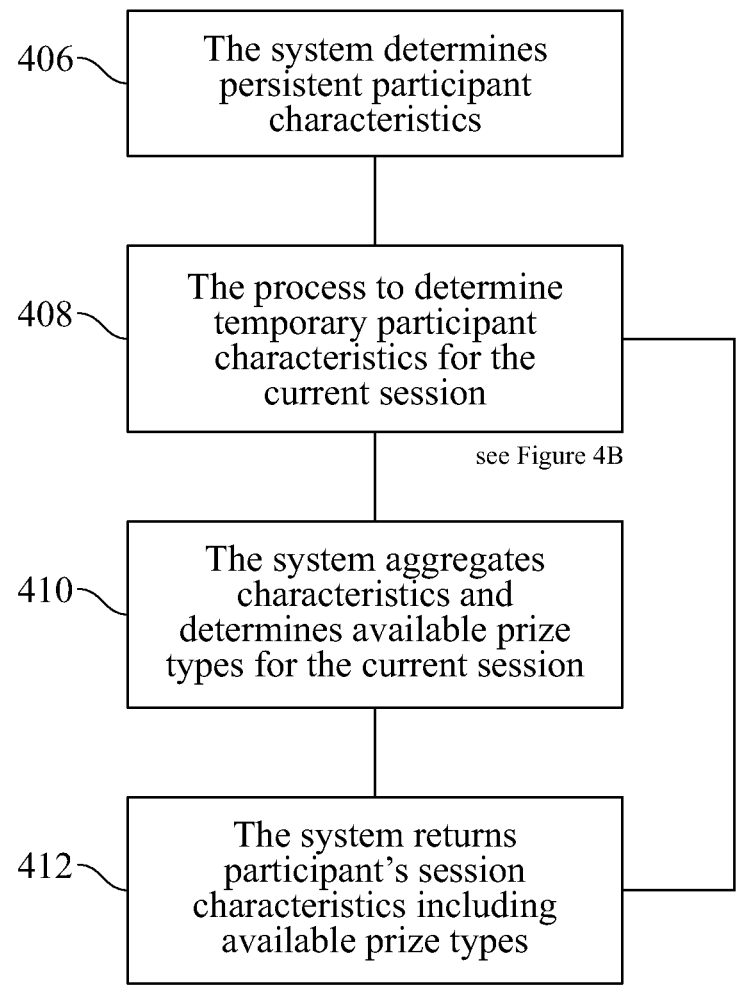
FIG. 4A illustrates an example method of determining participant session characteristics.
Figure 4B:
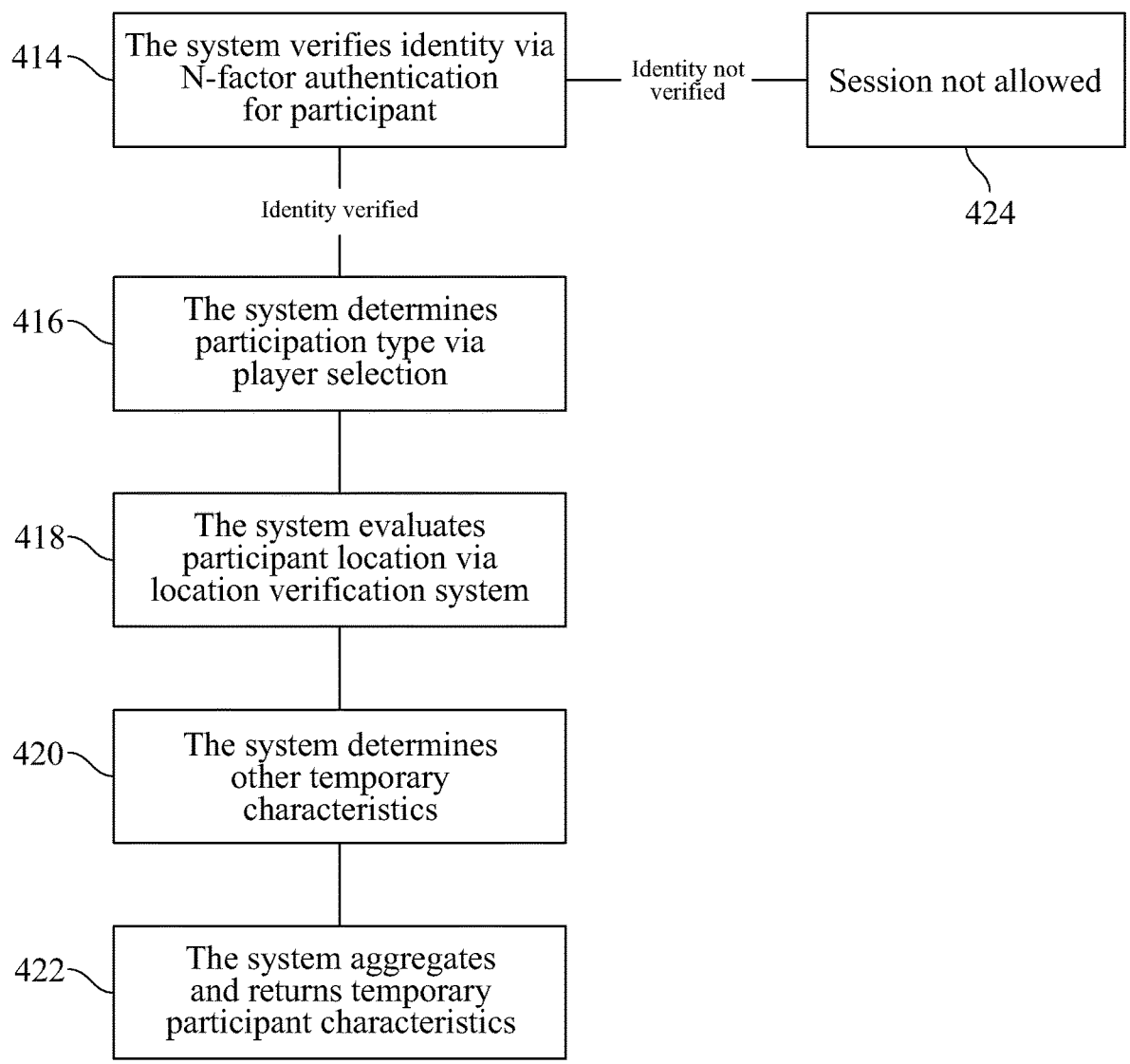
FIG. 4B illustrates an example method of determining temporary participant session characteristics for a current session.
Figure 4C:
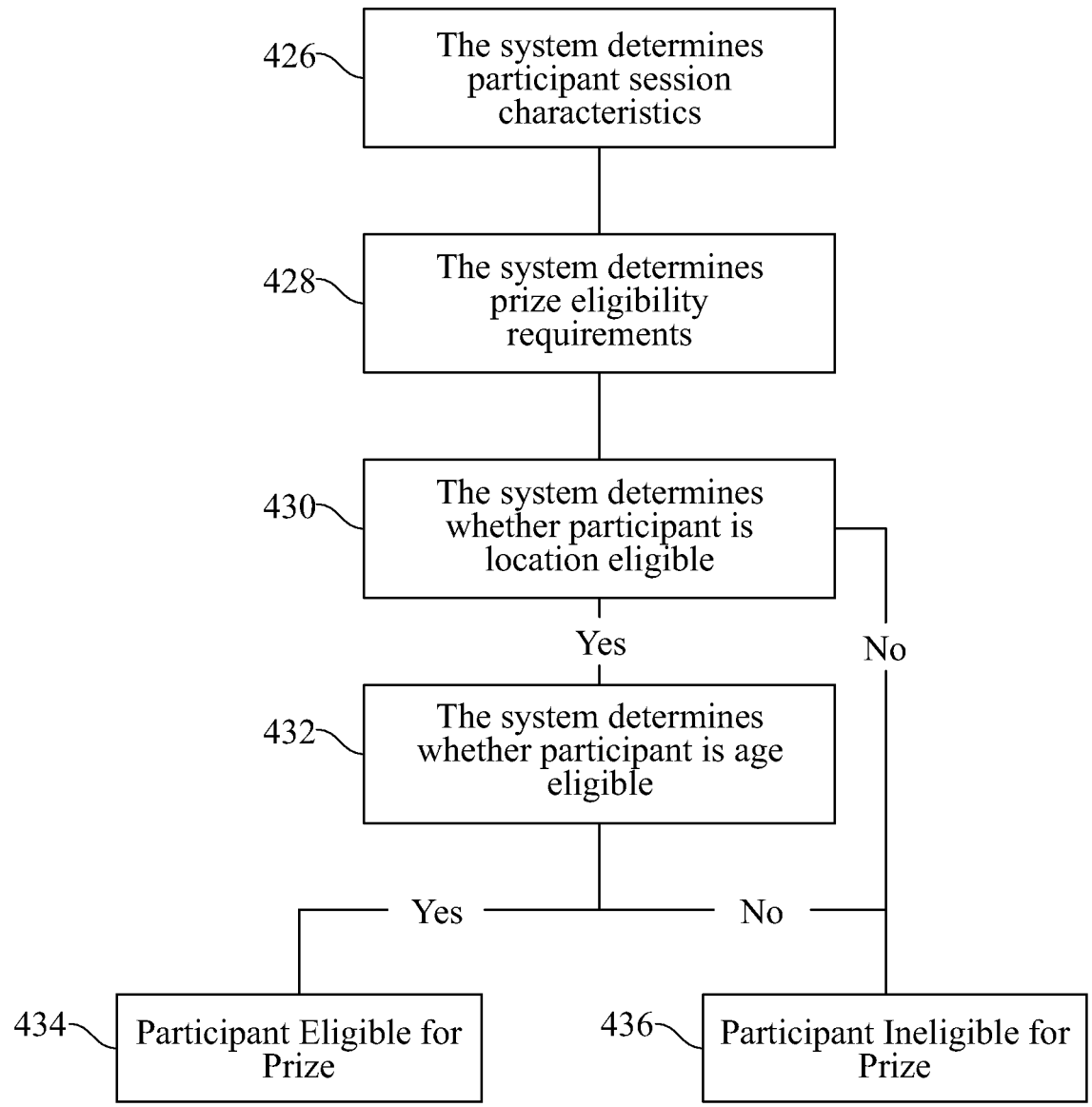
FIG. 4C illustrates an example method for determining participant eligibility for prize and participation types.

FIG. 4A illustrates a process to evaluate, determine, and combine, potentially through multiple sources, persistent and temporary participant session characteristics that comprise a set of session characteristics. One skilled in the art will know that while many of the constituent parts of this process are well known, such as multi-factor authentication, and location verification, such as that described in FIG. 4B, the combination of these elements as well as the application of their product, the session characteristics, are novel, particularly for the use of an in-game advertising network or for the type of condition-characteristic matching system described herein. In FIG. 4A and FIG. 4B, the system may use a multi-factor authentication system to determine, for example, a participant's identity which is considered a persistent characteristic. It may also use that persistent characteristic of ID or ID number or other to establish other participant characteristics such as birthdate or age from their participant profile. In step 406, the system determines the persistent characteristics for the participant. Some persistent characteristics include age or birthday, as well as, in some embodiments, identification number. In particular embodiments, participant record and performance, including wins and losses may also be seen as persistent even as record changes over time, the participant record that the new developments accrue to may be considered persistent. In step 408, once the system has determined the persistent characteristics the system evaluates the participant characteristics for the current session, as described by FIG. 4B to create a set of temporary participant characteristics. Temporary characteristics may include current participant location, which may be verified through one or more of IP address, GPS, cellular tower location, triangulation, mobile app, or other method, including in-game participant behaviors, such as whether a participant has won a given match or achieved a given in-game achievement, how long a participant has been playing, or many other in-game participant behaviors. In step 410, the system aggregates the persistent and temporary characteristics to create the session characteristics for the participant and returns the characteristics to be used to determine the overall session capabilities for the participant, in step 412. As indicated in FIG. 4A, temporary characteristics may be established for each session or re-evaluated and re-established repeatedly throughout a session or across sessions. Once these persistent and temporary characteristics have been established, they are aggregated as a set of session characteristics which are central to the novel process of conditional prizing. A participant's session characteristics may be evaluated against a set of known conditions established by an operator to determine those points in a session where a participant becomes eligible for a particular prize. This characteristic-condition matching is a central feature of this disclosure.

FIG. 4B illustrates a method for determining temporary participant characteristics for the current session. During the process to determine the participant session characteristics the system needs to verify and evaluate the participant for the current session and create the set of temporary characteristics for use during the current active participant session. In step 414, the system verifies the identity of the user via N-Factor authentication. In some examples of the system a single factor about the identity of the participant from the operator is used. In another example a mobile application with 2-or-more-factor authentication may be used in concert with a known operator identity to ensure that the participant can be verified. In step 424, if the system determines that the participant identity cannot be verified an active session with the system cannot be made and the participant should not be allowed to participate. If a participant's identity has been verified the system evaluates the participant type and participant election to determine additional temporary characteristics, including location to be gathered for the participant, in step 416. An example of the participant election is that a participant has chosen to participate for free or in sponsored matches only. In particular embodiments, location verification may not be a characteristic required for participant eligibility for certain prize types and certain player elections. In step 418, if a location is required for the participant type and participant election then the system evaluates the participant location via a proprietary location verification system. The system can use any number of methods to determine a participant location. Some example methods may be mobile phone geolocation services, IP based location, and participant elected or participant-reported location. In step 420, the system determines other temporary characteristics to be used to aggregate and return the temporary participant characteristics in step 422.

FIG. 4A illustrates a method for evaluating participant eligibility by prize type and participation type. In step 426, the system has already determined the session characteristics for the participant as described by FIG. 4A. In step 428, using the participant session characteristics the system determines prize eligibility requirements by looking up in the known system database the rules for the each prize and participation type. For example, in the beginning of a session the digital good prize has a known set of rules defined by the system administrator. An operator may choose to extend those rules and make the eligibility rules more strict for a given prize type or region, including digital good or other prize types. An operator may also choose to extend and make the rules more strict for the digital good prize for any given match. Once the rules have been determined for the prize type and participation type, then the system compares certain characteristics to determine eligibility. In step 430, the system evaluates the prize rules and the participant's location to determine if the participant is eligible for the selected prize. In step 436, if the participant is determine to be ineligible based on their current location, then the participant may be deemed ineligible and may not be allowed to participate for that prize. At that point, the participant may be prompted to choose another prize or another match. In step 432, if the participant's location is eligible for the prize the system compares the participants age against the rules to determine age eligibility. In step 436, if the system determines that the participant is ineligible based on their age the participant may not be allowed to participate for that prize and may be prompted to choose another prize or another match. Alternatively, in step 434, if the participant is above the required minimum age the participant may be deemed by the system to be eligible to participate for that prize and participation type.

Figure 5:
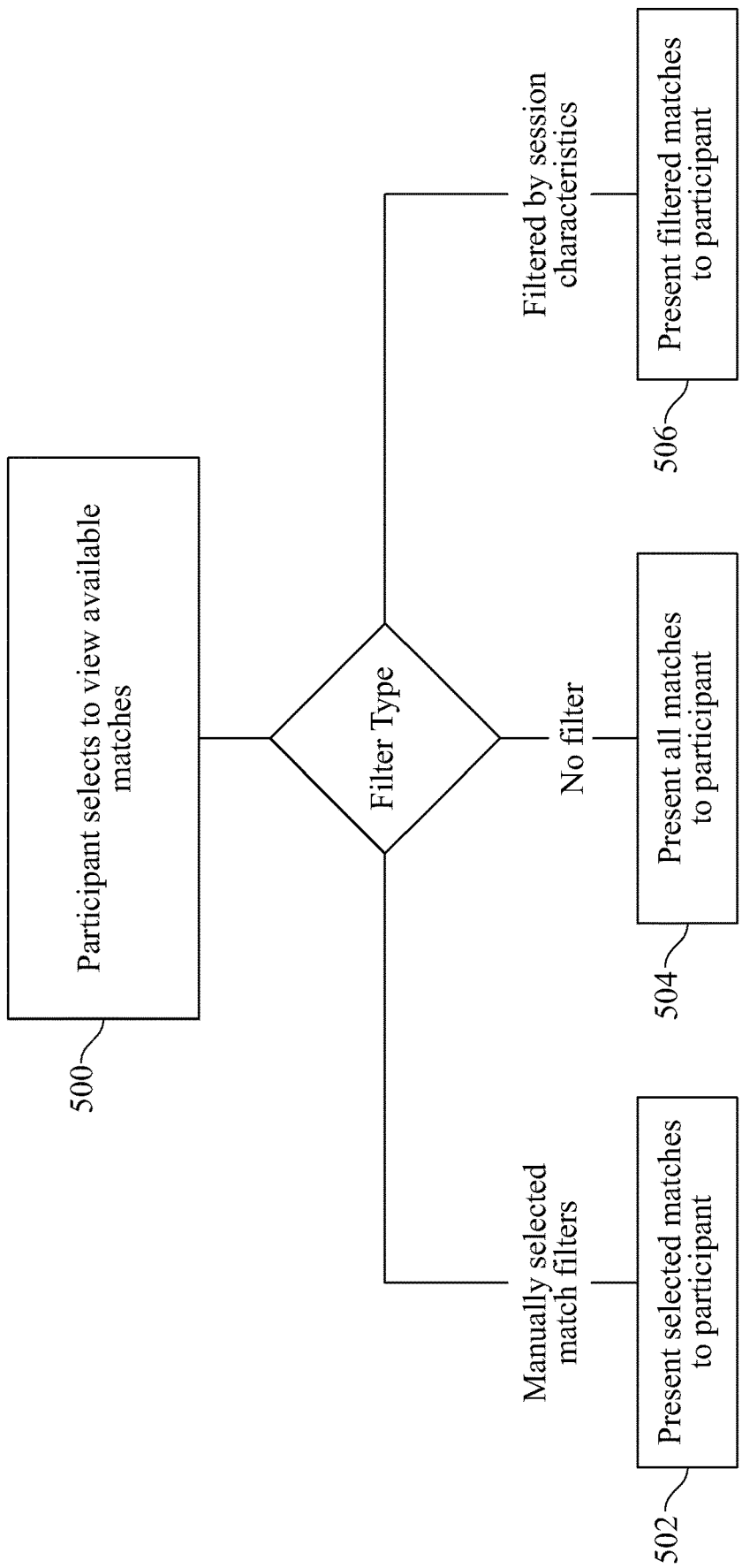
FIG. 5 illustrates an example method for presenting match options to a participant.

FIG. 5 illustrates an example method for presenting match options to participants. An operator while using the system will need to display matches for the participant to be able to select, filter, and join so that they may begin to participate for prizes. The operator can choose to allow for multiple filtering options for the participant to ensure that the right matches are being displayed. In step 500, when a participant determines they would like to participate in a match and selects to see which matches to participate in, the operator can ask for a list of matches based one filter. In step 502, when selecting to view a match if the participant chooses specific filters the system will return the selected matches that meet the filtering criteria. An example of some filters would could be—number of participants, number of teams, prize type(s), consideration amount, or win condition. In step 504, if there are no other operator filters and the participant chooses no filters the system will return all available matches for the participant. The matches can be displayed to the participant in any form including a lobby, a grid, or a list. In step 506, if the operator chooses to filter by the participant characteristics then the system will return matches that the participant is eligible for given their session characteristics. An example of this would be if the system determines that a participant is ineligible for physical good prizes the system will not return any match where the only eligible prize is physical goods. In another example, if the system determines that the participant is only eligible for free matches the system will return only matches where the participant consideration is zero.

FIG. 6 illustrates an example method for managing participant elections to join and confirm a match. In step 602, a participant or team first elects to join a match in the open 402 or filling 404 state, as previously described in FIG. 1A. A participant may not join a match that has been filled or is in any other state. In step 602, when a participant elects to join a match the system may determine if the participant is eligible to join the match. In particular embodiments, a participant may be required, at this stage, to select an available prize type as a prize in a given match in which they would elect to participate. The selected prize type may be used as a part of the system's calculus to determine individual eligibility for a participant given the conditions. In particular embodiments, certain prize types may have different eligibility requirements either because of operator conditions or because of legal or regulatory compliance in a given jurisdiction. The process to determine eligibility is described in more detail in FIGS. 6A and 6B, where one of the distinctions for determining eligibility may be that eligibility needs to be determined for a team of one participant or a team comprised of many participants. If a team attempts to join a match, in particular embodiments, each individual participant of the team may be evaluated separately to determine their individual eligibility as described by FIG. 6A. In some examples of the system an individual participant may be considered as a team of size one with a single participant as its only team member. If an individual participant who is a member of a team is deemed by the system to be ineligible for a given match, then the system may not allow the participant to join the match. Or they may be prompted by the system to select another prize type if they want to continue. And while in particular embodiments, multiple participants from the same team may be eligible for and may play for multiple prize types simultaneously, ineligible participants may be notified of their ineligibility and prompted to find an alternate match. One skilled in the art will recognize this functionality of selecting and deselecting eligible and ineligible team members as novel. In step 604, if the system determines that the participant(s) is or are eligible for the given match, then the participant(s) may pay the participant consideration. The match escrow may contain the transaction for the consideration, and the participant will be allowed to join the match. In step 606, if the match is in the open state the match may then transition to the filling state, such as filling state 404 described in FIG. 1A, awaiting other teams or participants to join. In step 608, as more participants and teams join the match, then the system may evaluate the number of open slots, and in step 610, if the system determines that no additional slots are open, then the match may transition from the filling to a confirmed state, such as the confirmed state described in confirmed 408 described in FIG. 1A. In step 614, once all slots in a given match have been filled, then the match may then await confirmation from all active participants before it can continue. In step 612 all participants may be required to confirm their position, or in step 624, a participant may withdraw. In particular embodiments, participants may not be required to confirm their position for particular prize types, and the verification step may altogether be avoided. In particular embodiments, during the filling or confirming state, participants may be eligible to withdraw at any point during those states. In step 626, if a participant decides to withdraw then the system may refund that participant's consideration, all other participants may be notified in step 630, and the match may return to, or transition to, or remain in, the filling state waiting for new participants. In step 628, the withdrawing participant may exit the match and they may no longer be a participant in the match unless they elect to begin the election process again. In step 632, the system may determine if any participants remain. In step 634, if all participants withdraw, then the match may move back to the open state. In step 618, once all participants have joined and confirmed the match, then the match may transition to the confirmed state, wherein particular embodiments, participants may no longer be able to withdraw without penalties, which may include a loss of their participant consideration or buy-in. In step 620, when an operator elects to begin the match, then the match may transition to the running state in step 622. In particular embodiments, an individual or team may elect to not participate at this point, but the system may not refund the whole participant consideration. In the confirmed state, as described by confirmed state 408 in FIG. 1A, the match is ready to be started by an operator.

In particular embodiments, a participant may be a spectator. The methods described in FIGS. 6A, 1A, and 7 may be used to describe the processes for a spectator, in addition to a participant. In particular embodiments, there may be versions of, or examples of a session, match, or tournament, where the participant is a spectator-participant. In particular embodiments, a spectator match is a special case where the total number of participants may be 1. It may be that any number of spectators watch, or even wager on, a given match, but for purposes of certain types of matches in the system, a particular spectator participant may be considered by the system to be a participant in a match of one participant where the participant agrees to the conditions of the match and elects to join. With no other participants waiting to join the match, the match may transition directly to the confirming state and the operator may choose to present an option, or prompt the participant, to confirm the spectator, or in particular embodiments, the operator may instruct the system to auto-confirm upon the spectator election. In another example embodiment, the system may determine that in the special case of the match of one, no additional confirmations step may be required. In particular embodiments, any participant, including a spectator participant, may automatically transition the match to the confirmed state upon their election to join the match—the system may transition to the confirmed state awaiting the operator to run the match. If the participant is a spectator participant, for example, it may be that the match the operator instructs the system to automatically move the match to the running state. In particular embodiments, the spectating match may immediately move to the running state, and in this way, the spectator match would move in parallel with, and concurrent with, the currently-running match of player-participants that the spectator-participants are watching. A match of spectator-participants need not be watching or wagering on player participants. It may be that the spectator participants are watching non-participating players, virtual players, player-participants, or any other participants who may be engaged in a game or entertainment experience that a spectator participant elects to observe. When the spectator match of one has been deemed by the system to be complete, then the operator or the system may determine what information to send the system and the system will determine how to validate and handle the results, in some instances by using characteristic-condition matching to provide each winning spectator with a prize that is conditioned on their characteristics. In a match of player-participants, the operator may decide if they want to attempt to cancel or complete the match with results. The act of cancelling a match may refund the participant consideration and the match may then be unable to resolve. In a spectator match the opportunity to cancel may still be present. In the event of a spectator match the system may not require the same type of participant validation to distribute prizes. It may be that the conditions of the match and the results of the match may be such that there may not need to be a score or a winner who is present to receive their prize. In the event that the spectator loses the match; i.e. they do not meet the win conditions, then the spectator may be deemed the loser of the match and their participant consideration may not be returned to them, even in part of some cases, in the form of a prize or in any other form. The match may then resolve as normal and given that, in this example embodiment, there are no participants in a winning rank, then no prize would be paid out. The system may continue to pay any facilitating service providers and split the profit as is normal on a player participant match.

FIG. 6A illustrates an example method for evaluating team eligibility for a match. In FIG. 6A when a team elects to join a match the system may evaluate all participants of a team to determine team eligibility. In step 600A, a team may elect to join a match. In step 602A, the process may begin with the system determining the match conditions. The conditions of the match may include the prizes being offered, the win conditions, and the regional restrictions determined as part of the setup by the system administrator and operator for the game and specific match. In step 604A, the system evaluates participant characteristics. In particular embodiments, the system may choose a participant on the team to evaluate their individual participant characteristics. In step 606A, using the individual participant characteristics the system may evaluate the individual participant eligibility as defined in FIG. 6B. Once the results from the process as referred to in FIG. 6B finishes the system may review the results in steps 608A and 612A. If the participant is deemed ineligible and not allowed to participate the entire team may be deemed to be ineligible and not allowed to progress further. It may also be that certain members of a given team may be prompted to play for alternate prize types or join in alternate matches, in step 610A. It is possible that, at this point, the system may not continue to evaluate the eligibility of the other participants of the team. If the participant is deemed to be eligible, the system may then continue to assess the eligibility for all of the rest of the members of the team until all members have been checked. If all members of the team are considered eligible, then it may be that the team is eligible, and it may be determined that there are no more participants to evaluate, in step 612A, at that point, then the team may be considered eligible, and will be allowed to join in step 614A.

FIG. 6B illustrates an example method of evaluating individual participant eligibility for a match. Depending on the match conditions and prize types, the system may need to evaluate each individual participant against the match conditions to determine eligibility and either determine if a participant is eligible or ineligible for every match. In step 600B a participant elects to join a match. In step 602B, when a participant elects the join a match the system first determines if the participant has sufficient balance to cover the match consideration. In particular embodiments, the consideration may be made by a sponsor or a prize provider or an operator who has determined that the participant consideration for a given match should be discounted up to and including zero cost to the participant. In particular embodiments, any participant consideration may be changed to zero while still retaining the operator consideration or prize. In step 606B, if the participant does not have sufficient balance, then no additional checks are required and the participant may be deemed ineligible for the match and may not be allowed to join. In particular embodiments, at that point the participant may be prompted to join another match or to make whatever adjustments are necessary for their verification to be completed. In step 604B, if the participant has sufficient balance, then in step 608B, the system may then evaluate the participant characteristics against the conditions of the match and for the selected prize. In step 610 the system may determine that the selected prize is available for the match and then the system may evaluate participant eligibility for the prize type and participation type as described in FIG. 4C. In some embodiments of the system, an operator may change or add settings and match rules, adjusting conditions of a given match or set of matches that may extend or add to the rules and conditions that the system administrator defined for the platform. Based on the results from the process described in FIG. 4C, the system may return the eligibility results for the individual participant. In step 612B, if the participant has been determined to be eligible to participate for a particular selected prize, then the participant may be deemed by the system to be eligible for the match.

FIG. 7 illustrates a method of operating a multiplayer match and reporting results to the system. In step 702, and as described in FIG. 6, once a match has been filled and confirmed, the match may be ready to be started by the operator. In particular embodiments, the match may require no additional interaction from the participants at this step. In step 704, the operator determines whether to begin the match. In step 706, the match is in the running state and is now awaiting results. In step 708, a match may either be canceled or completed by the operator. In step 710, if the operator chooses to cancel the match for any reason, then all participants may be refunded their portion of the participant consideration and the match may be moved to the canceled state. A match may be canceled for any reason, including an error in a multiplayer game session or another error where the results of the match could not be determined. In step 712, if the operator does not cancel the match, then the operator may choose to complete the match. To complete the match, the operator may send a request to the system with a report of scores. The system may then evaluate the results sent by the operator and decide if the results of the match can be verified. An example of valid results is the list of all participants in ranked order. An example of this is in the case where a match is winner-take-all with two participants, Participant A and Participant B. If the operator returns the results with Participant A in rank order 1 and Participant B in rank order 2, then the results may be determined to be valid and Participant A may be determined to be the winner. In the same example, if the results from the operator only have Participant A or B present then the system, without the information that either participant has achieved the win condition, or without the rank order that will conclude the match, then the system may not be able to determine a winner at that time. The results at that point may be considered invalid. If such an instance were to occur, then the system may return an error to the operator, which may keep the match in the running state awaiting results. In step 714, once the match results have been sent by the operator and the results have been validated by the system, then the match may be considered to be in the concluded state, awaiting resolution.

FIG. 8 illustrates an example method for resolving a match. In step 802, a match has been completed and the system has determined that the results of the match may be resolved. The resolution process is when the system awards prizes to the participants, pays facilitating services, and pays the profit to the operator. In step 804, the system determines if the match has been approved to be resolved. In one example embodiment of the system the results of the match may be required to be approved by an operator or system administrator before it can be fully resolved. In another example embodiment a match may be determined to auto-resolve, meaning that no additional approvals are required and as soon as a match has been completed with results then the resolution process can immediately begin. In step 806, once the match has been resolved, then the system can begin the process to evaluate the results and resolve the match. In step 808, and according to the method described in FIG. 8A, resolution is where winners of the match are paid out due to their rank and requested prize type. In step 810, and according to the method described in FIG. 8E, once all prizes have been awarded, any facilitating services requiring payment as part of the operating of a match are to be paid. In step 812, once all prizes are paid and all facilitating services paid, then the system may aggregate the profit of a match for disbursement. On any given match there may be any number of operators. In steps 814.1, 814.2 to 814.N, the operators may be paid out according to, for example, a profit share agreed upon by the operator and system administrator. In one example embodiment the developer of the game and Versus, the system administrator, have a 50% profit split and each party will be paid half of the profit. In particular embodiments of the system, the outcome of the match resolution process may be that whatever escrow or other account associated with the operator consideration or sponsor consideration for that match may be moved to 0. In particular embodiments, the system may not regard a match as fully resolved until the match-level escrow account for operator consideration has a zero balance with respect to the prize or prizes that have been selected as the operator consideration for that match. In some example embodiments of the system a match can fail to resolve due to insufficient prize fulfillment, in which case this portion of the fulfillment and resolution process may be restarted and completed independently until all prizes have been distributed.

Figure 8A:
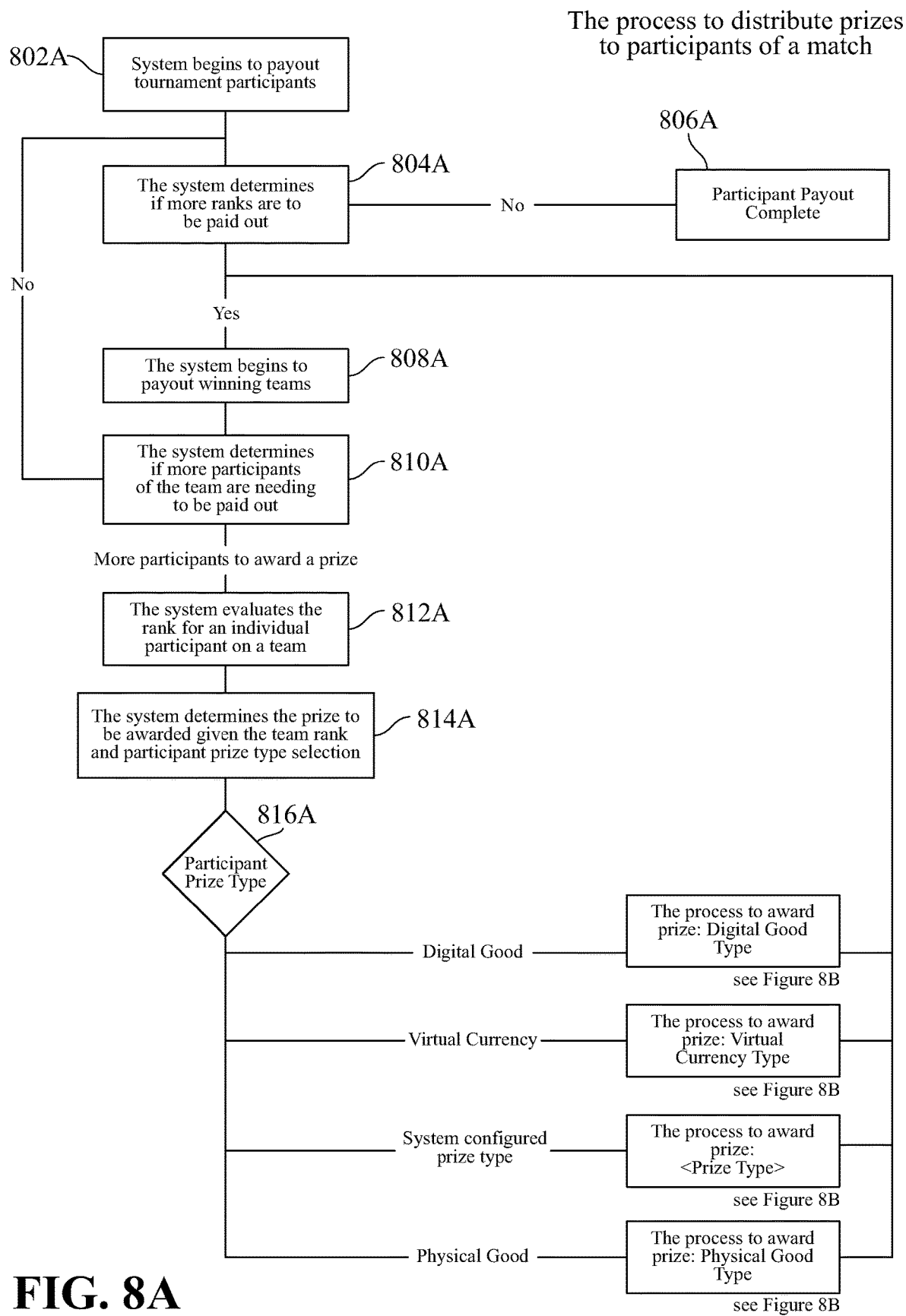
FIG. 8A illustrates an example method of prize distribution.

FIG. 8A illustrates an example method for distributing prizes to the participants of a given match. In step 802A, the system may begin to distribute prizes to the winning participants of the match during the resolution process. In step 804A, the system evaluates the ranks and determines if more ranks are to be paid out. If this is the first check of the resolution process this may always return true even in a winner take all match where there is a single rank. In step 808A, the system begins to pay each team out in the winning rank. In step 812A, like with teams, the system will determine if there are more individual participants at that rank to be paid. In the event that it is a in individual (non-team) match this check will return true the first time as there is one team and one participant on the team. In step 812A, the system may check the rank for the individual participant in the match and on their team. In step 814A, the system may evaluate the selected prize type chosen by the participant to determine which prize type to award. In step 816A, the system may take a given eligible participant's rank and that participant's selected prize type to determine the exact prize to be awarded. Such a prize may be available and may be selected by the participant before or after the match concludes. There may be multiple prize types the system can award. In these cases, the system will first check which prize type and will then award the prize to the participant as defined by the process in FIG. 8B. Once the prize has been awarded the system will evaluate the rest of the individual members on each team until all participants of the team have been awarded their prize. The system may continue to evaluate the rest of the ranks of the match and the team within the winning position for that rank to award prizes for the rest of the participants of the match until all eligible participants are awarded a prize. In step 806A, when all ranks and all teams have been processed the prize awarding process is complete. In one example embodiment of the system, non-winning participants or those not in a winning rank can be awarded coupons or other participation prizes for participating in the match.

Figure 8B:
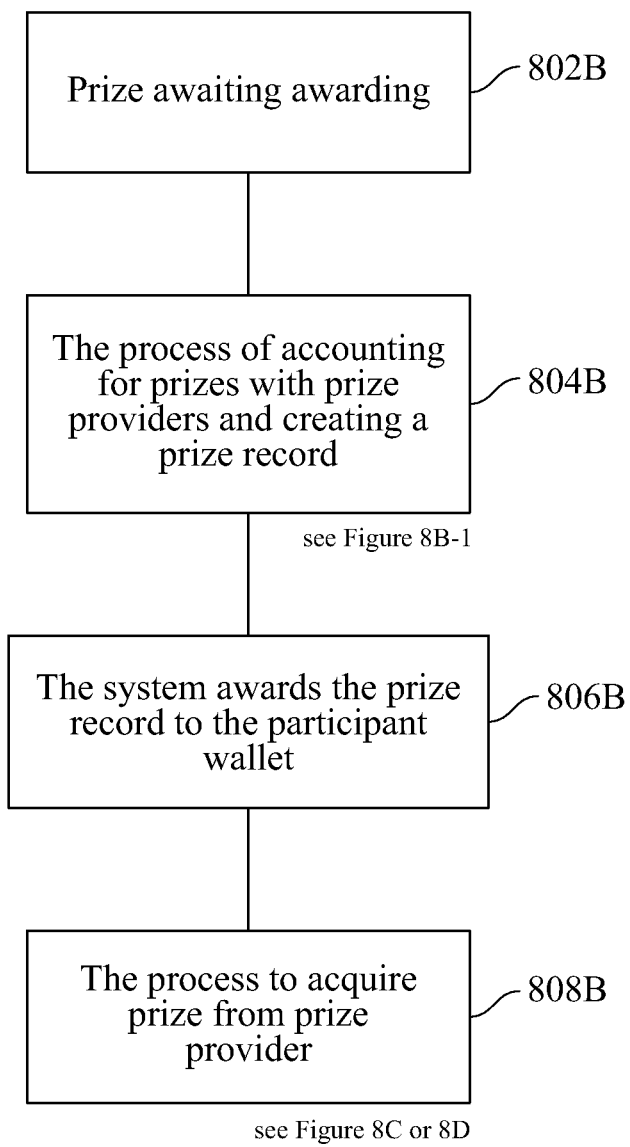
FIG. 8B illustrates an example method of awarding a prize.
Figures 1, 8B:
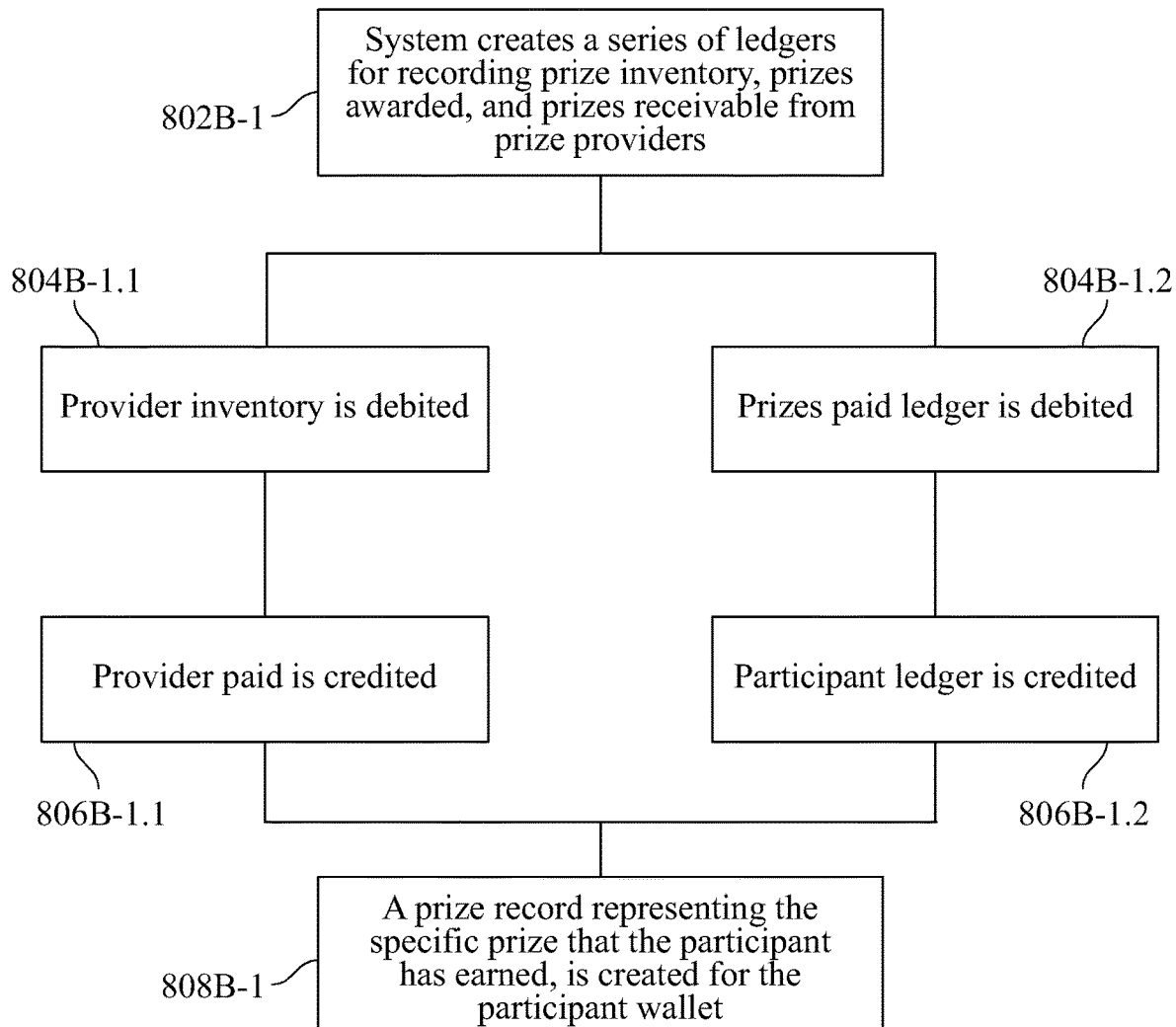

FIG. 8B illustrates an example method for awarding a prize to a participant whose characteristics match the win conditions. In FIG. 8B, a participant may have already had their characteristics matched with a set of conditions such that the system has deemed them eligible for a prize. The system may then establish that a particular prize be awarded to a particular participant. At that point, a series of well-known accounting processes are undertaken to provide the participant with a prize record, or token, or some other signifier that may be exchanged in a later step for the actual prize depending on if that prizes is a digital good, a physical good, or a digital or real currency. In step 802B, a prize is awaiting awarding. In some embodiments of the system this may be done by process of a set of ledgers between participant, prize provider, and operator. In other embodiments it may happen in batches at the end of a session or a series of sessions. In some embodiments, as illustrated in step 804B, the ledger system described in FIG. 8B-1 may be used to decrease the prize inventory from the prize provider, creating a prize record for the participant that can then be placed by the system into the participant ledger or participant wallet. The system may choose to pay the prize provider for each prize that is distributed or it may pay for all inventory at any other point.

In step 806B, when the system is resolving a match and the resolution process is ready to award a prize the system may purchase the prize from the prize provider and award the prize to the participant's wallet. All prizes in the system may have a cost associated with them. The cost may be zero. The cost is determined and agreed upon by the operator and prize provider and set before a prize can be used in the system. In one example, if the prize to be awarded is a physical or digital good the system will purchase the prize for the prize cost from the prize provider and create a prize record for the participant. The prize record is not the actual prize itself, but can be likened to a casino chip which may be redeemed later. The prize record is awarded to the participant's wallet to be later fulfilled. Real money prizes have no cost and can be awarded and fulfilled directly together. In particular embodiments, the prize may need to be acquired from the provider in order to give it to the participant. In step 808B, the prize is acquired from a prize provider. For example, if the prize to be awarded to the participant is a physical good like a can of energy drink or a computer peripheral the physical object is not immediately awarded and delivered to the participant. Instead the participant would be given the prize receipt and in the acquisition process as described by FIG. 8C or FIG. 8D a coupon or QR code may be given so that the participant may go to a retail location to fulfill.

In FIG. 8B-1, one embodiment of the accounting process is described in greater detail. In this embodiment, the system works from a system of ledgers where a process of debits and credits decreases the amount of prizes in the available prize inventory in exchange for some portion of the total consideration. A unique prize record may then be created for the participant and placed into the participant wallet to facilitate the remainder of the prize fulfillment process described in FIG. 8C, FIG. 8D, and FIG. 9.

FIG. 8b-1 describes two parts of what may be a three-part process of prize fulfillment accounting. To account for the inventory from the prize provider, the provider inventory is debited while the provider paid is credited. To account for the prize record being awarded, the participant ledger or participant wallet be credited and the prizes paid ledger is debited. Beyond this step will be prize settlement, described in FIG. 8C, FIG. 8D, and FIG. 9, where the system may account for fulfillment and settlement by debiting the participant ledger, crediting the operator inventory ledger; and crediting operator inventory while debiting prize provider inventory. The system may also use any one of a number of other well-known accounting methodologies to arrive at the same outcome in this portion of the process.

Figure 8C:
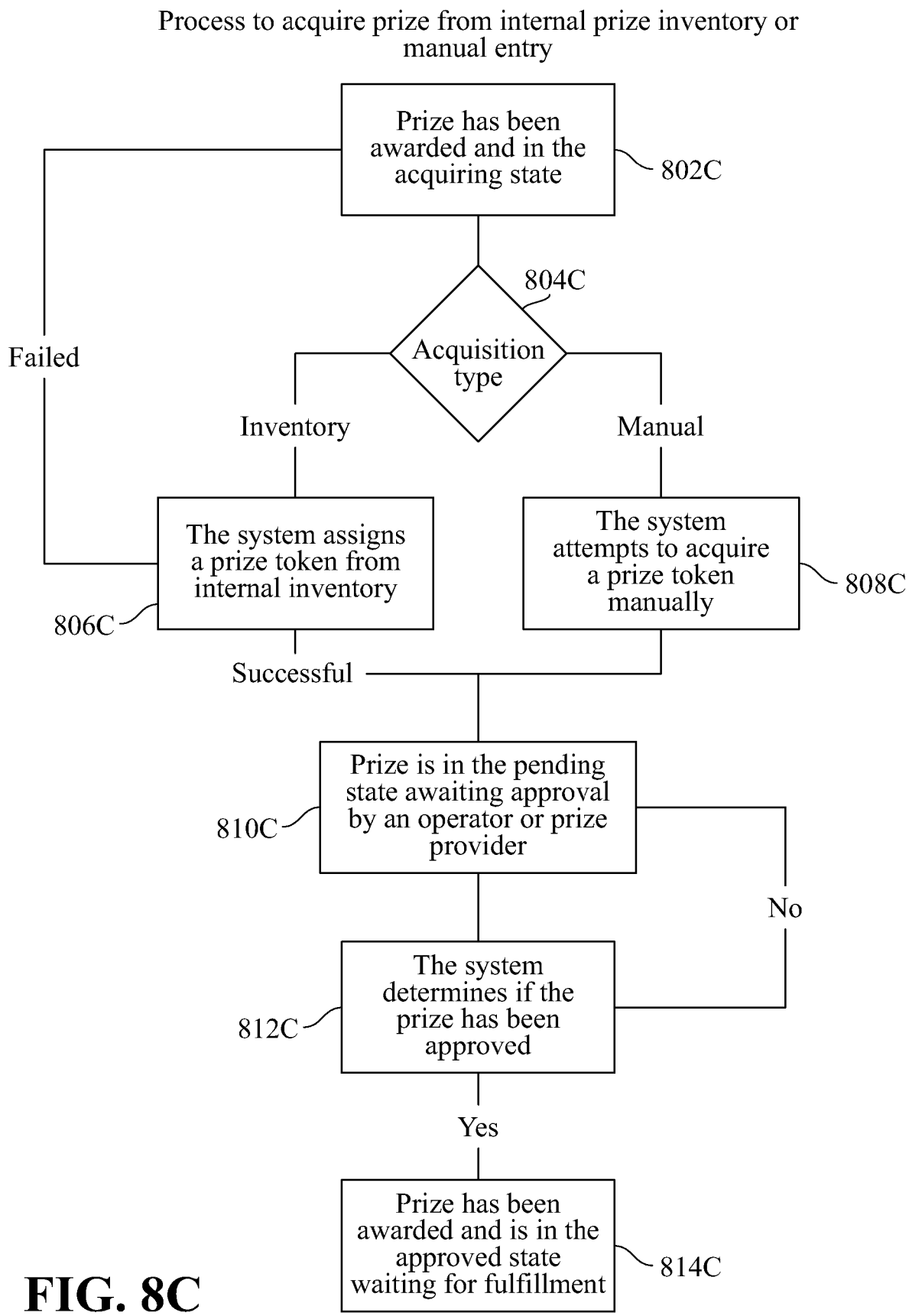
FIG. 8C illustrates an example method of prize acquisition.

FIG. 8C illustrates an example method for acquiring a prize from internal prize inventory or manual entry. Prize awarding and fulfillment are two separate and related processes that allow the operator of a match to control when participants receive a prize. In some examples, prizes may also need to be fulfilled external to the system and cannot be immediately fulfilled. In step 802C, once a prize has been awarded the prize is in the acquiring state waiting to be acquired from the prize provider. In some examples the system allows for the prize provider to enter a number of unique prize tokens that can be later used to fulfill and give the prize to the participant. In step 804C, if prize is going to be fulfilled via a prize token from internal inventory the system can first attempt to acquire the prize token automatically from the batch of pre-existing fulfillment tokens. If a token does not exist then the attempt fails and the prize will still be in the acquiring state 802C. In step 806C, if there are no fulfillment tokens in the inventory and an operator can manually enter a prize token for the prize. In step 808C, when a prize token has been successfully allocated for a prize the prize is now in the pending state and awaiting approval. In step 808C, the system will evaluate the prize and determine if it has been approved. In step 810C, if approved, the prize will be fully awarded and approved and awaiting fulfillment. If the system determines the prize to not be approved it will be continue to be awaiting approval in step 808C. In particular embodiments, this allows the operator and system administrators to define a property on a prize to allow for it to be auto-approved. Other prizes would not have the auto-approved property and would require manual approval by an operator or administrator.

Figure 8D:
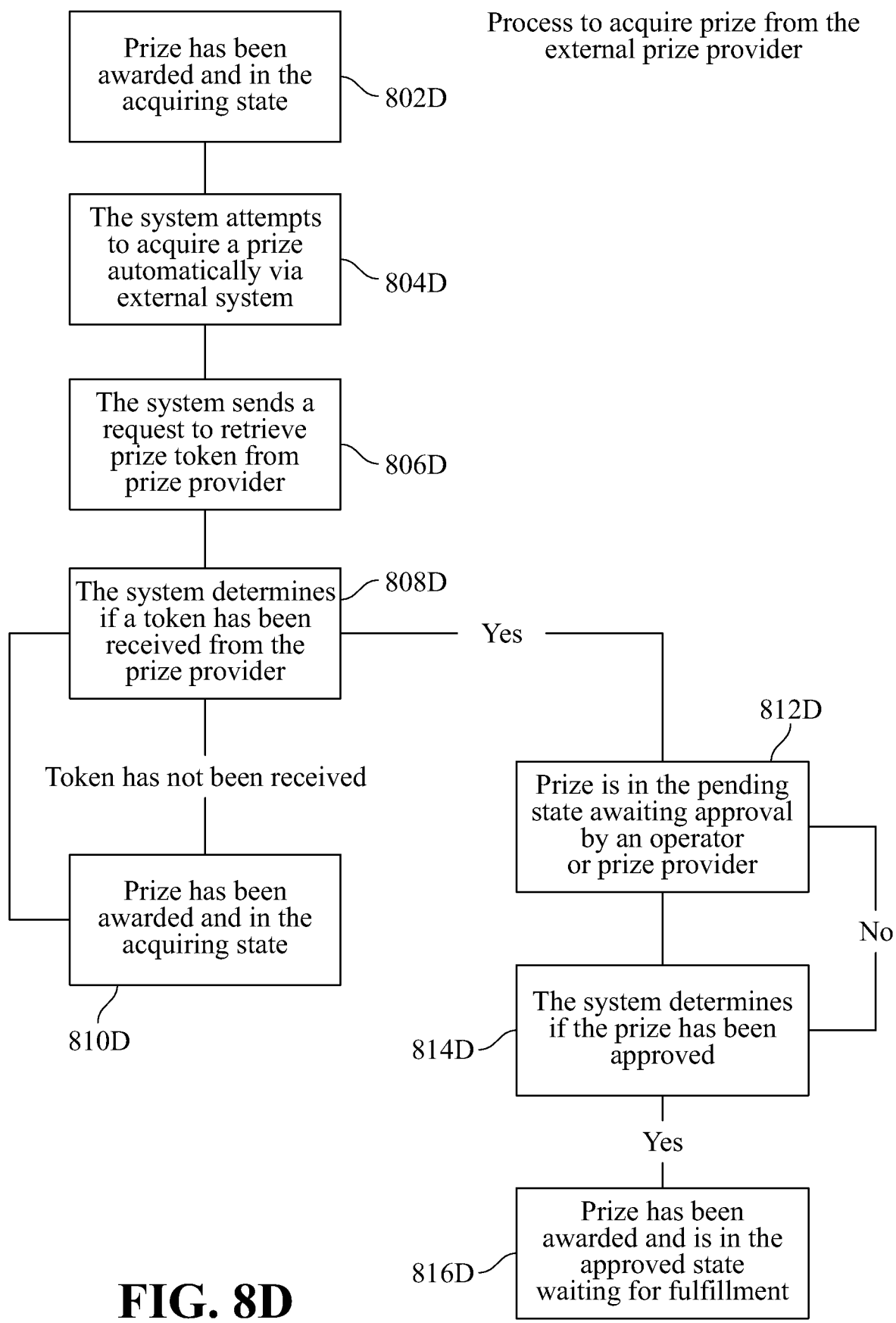
FIG. 8D illustrates another example of prize acquisition.

FIG. 8D illustrates an example process for acquiring a prize from the external prize provider. Certain types of prizes or prize providers may choose to have prizes be allocated by an external system. In step 802D, the prize, similarly as described in FIG. 8C, begins in the acquired state. In step 804D, the system may begin the process to acquire a prize by sending an event to the external system with the information about the prize, the participant, and other optional additional information. Such additional information may include the match and other results for further verification. In step 806D, the system sends a request to the retrieve a prize token from prize provider. The request to the external system would result in the external system returning information including the unique prize token. In step 808D, if the system determines that a token has been received from the prize provider, then the prize may now be in the pending state awaiting approval in step 812D. In step 810D, if no token has been received the token remains in the acquiring state. In step 814D, and as described in FIG. 8C, the system may determine if the prize has been approved. In step 816D, if the prize has been awarded, the system may continue to mark the prize as awarded and the prize would be awaiting fulfillment. In particular embodiments, after a request to the external prize provider has been sent an operator or administrator may manually enter a prize token as described by FIG. 8C.

Figure 8E:
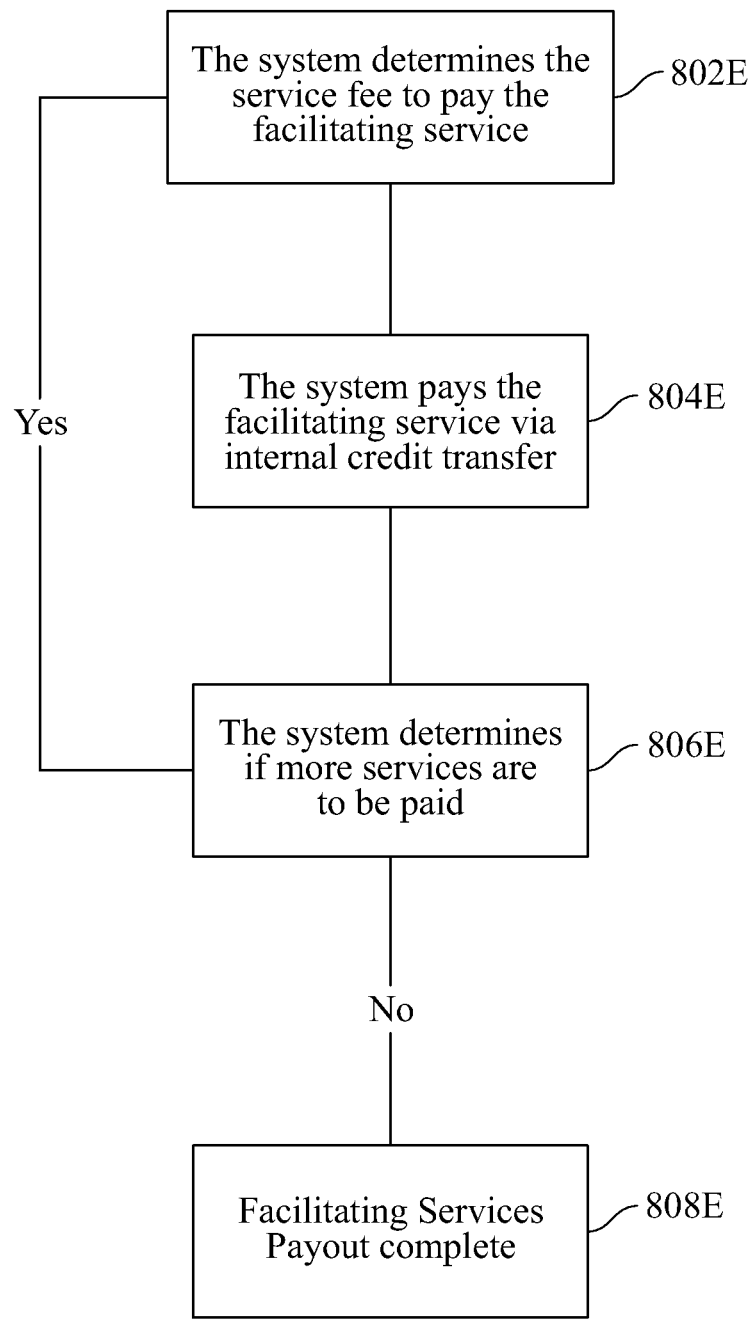
FIG. 8E illustrates an example method for paying facilitating services.

FIG. 8E illustrates an example method for paying facilitating services. In step 802E, in the event that the system determines that there are facilitating services to be paid as part of the resolution of the match the system will evaluate each service. For every facilitating service the amount to be paid may be described as a fixed per-participant fee, a % of the total match consideration, or some other value agreed upon by the operator or system administrator. In some cases the facilitator could be an operator. In step 804E, when the system has determined the amount to be paid an internal credit transfer and transaction occurs and the facilitating service's ledger will be updated to account for the payment. In step 806E, once the first service has been paid the system determines if other facilitating services are owed payment and processes them as described above. In step 808E, if there are no other facilitating services that are owed, the facilitating services payout is complete.

FIG. 9 illustrates an example method for fulfilling a prize. Once a prize has been awarded, acquired, and approved the prize can be fulfilled by the participant, and the system remains in a state of awaiting prize fulfillment in step 902. A prize can be fulfilled via a number of different mechanisms and the fulfillment type should be defined when the prize is entered into the system. When a participant elects to fulfill a prize the system may first determine the method for fulfillment on the prize in step 904. In step 906, if the prize is virtual currency the fulfillment method may be done via internal credit transfer. In step 908, the system may create a transaction where the participant will be paid and the ledger will reflect the new updated amount. In step 910, a prize can be manually or automatically fulfilled directly via the prize provider. In step 912, the system may initiate the request to the prize provider either automatically or on behalf of the participant. In particular embodiments, the system may submit to the provider the details about the prize and the participant information. The prize provider may fulfill the prize. In one example, if the prize is a digital good the system will send a request to fulfill a prize to the operator servers and the operator would fulfill the prize on their system and provide the participant the digital good prize directly. In step 914, prizes may also be fulfilled manually via participant request. In step 916, the system will receive a request from a participant or an operator to fulfill a prize and instructions for fulfillment will be sent. Included in those instructions may be a redemption token, fulfillment instructions, or other pertinent information required for the participant to receive their selected prize.

Figure 10:
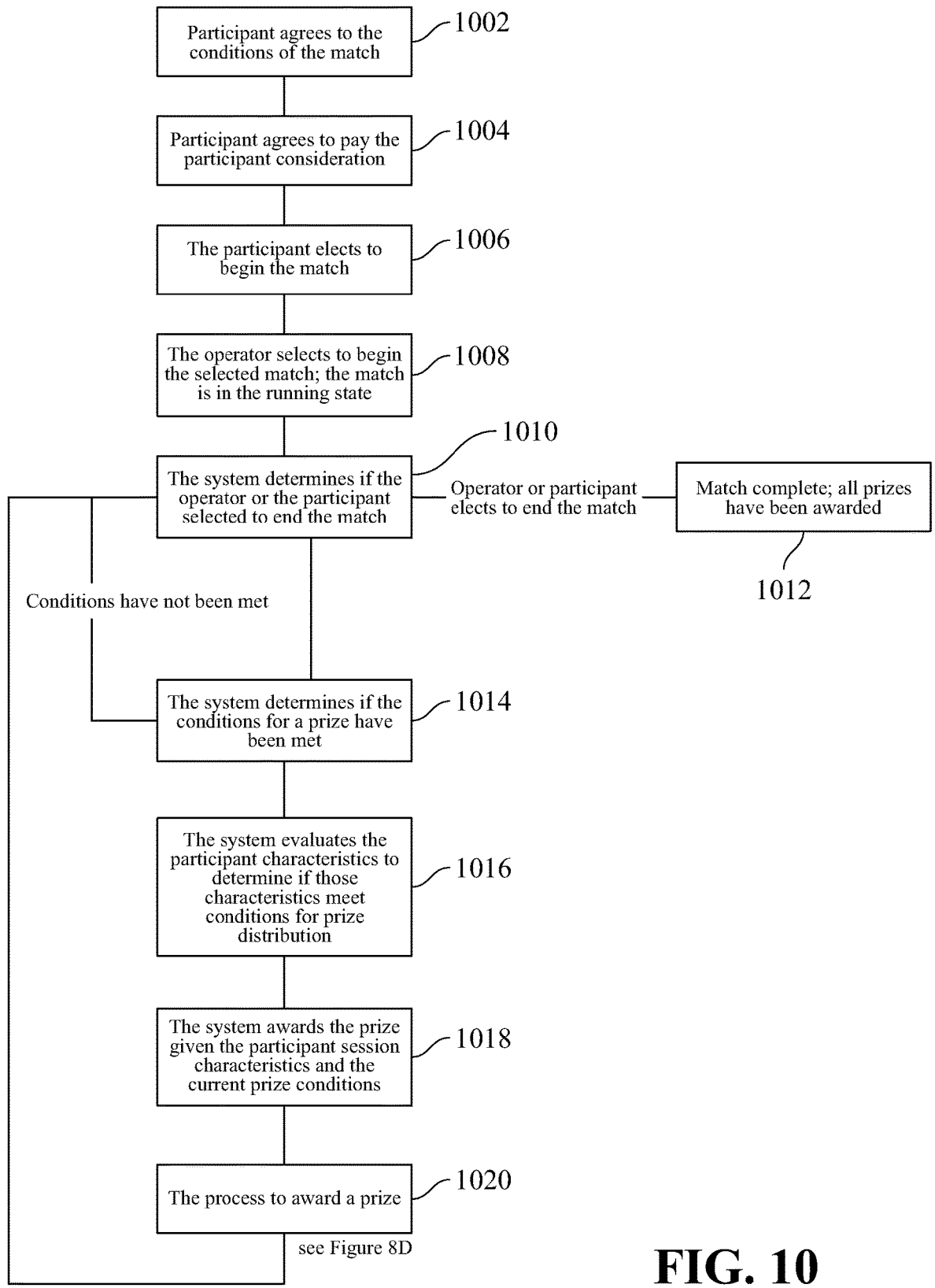
FIG. 10 illustrates an example method of managing a single participant match.
Figure 11B:
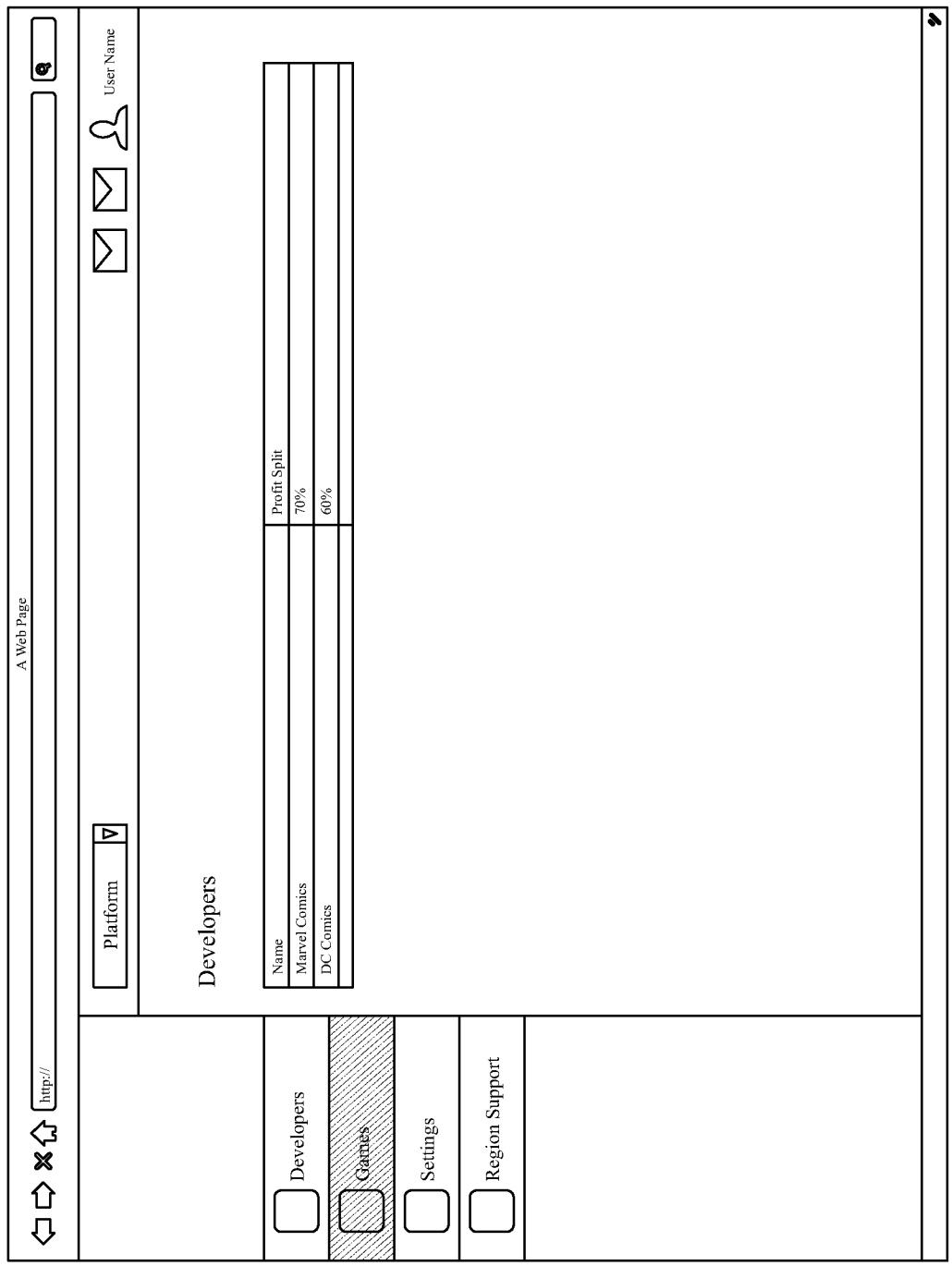
Figure 11C:
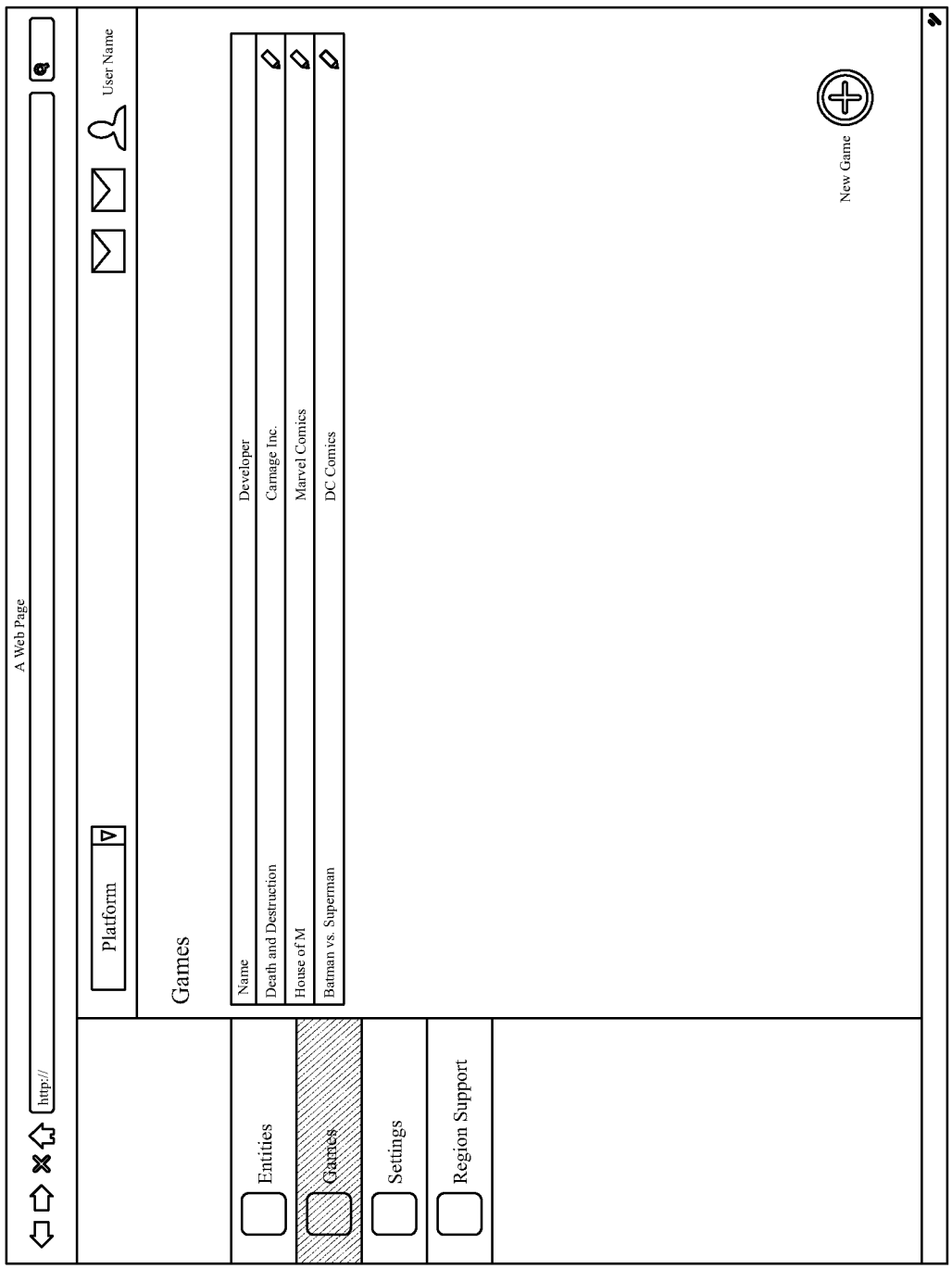

FIG. 10 illustrates an example method for continuously monitoring sessions and awarding conditional prizes. In some embodiments of the system, an operator may create an open ended session, or a session that has more than one possible win condition, or a session specifically geared toward surprise and delight prizing. In such an event, the system may take on certain specific characteristics such as those described in part in FIG. 10. These matches and sessions may be continuously or periodically monitored matches and sessions where a participant's characteristics are collected periodically, recorded, and measured against a known set of conditions for prize fulfillment. In such a session or match, a participant may or may not pay a specific participant consideration every session, or they may pay a regular recurring fee in exchange for the ability to participate in this type of prize-based continuously monitored session. These sessions may also be free or at some small cost to the participant, paid for by, for example, prize provider sponsors or advertisers.

An operator choosing to use the system to manage continuously monitored sessions or matches with conditional prizing may choose to use the system to create conditions such that a single participant, either in concert with, or independent of, other competing participants or cooperative teammates, may receive prizes based on their characteristics and/or in-game behavior. If, for example, in a sandbox game like Grand Theft Auto, an operator wanted to reward certain types of risky behavior because it was consistent with a certain brand, then the system may be used to create conditions such that if a player-participant chose to base-jump off the top of a given skyscraper in the game, then that player participant would be rewarded with a QR code for a free Redbull energy drink redeemable at their local 7-11. In this way, the match or session may not necessarily have a fixed resolution point, but as soon as the participant engages in a specific behavior, then that participant may fulfil certain conditions for prize distribution and fulfillment automatically.

In another example, the system may monitor both in-game and out-of game characteristics, matching them with given conditions. In this example, a player-participant has been playing in a given session for over 4 hours and it is 2 o'clock in the morning in the location where the participant is playing. In particular embodiments, using the system in a continuously monitored session, the time, location, and session length may trigger the system to award a coupon to the participant for 50% off their next Taco Bell order, or $10 worth of delivery pizza available from a provider that is in close proximity to the participant's location.

In another example, the system may be used to encourage certain behaviors by providing surprise and delight prizing for participants who engage in certain behaviors. If, for example, the system is monitoring location periodically and the system determines that a mobile game player participant is playing from a dentist's office, then the player may be awarded a lower interest rate on their credit card because a financial services prize provider using the system has determined that people who go to the dentist on a regular basis tend to have better credit profiles than those who do not.

In particular embodiments of continuously monitored matches, a participant may earn one or more prizes based on multiple conditions being met in a single session. In other embodiments, the system may require other participant characteristics such as age and location to meet certain thresholds for the conditions to be met for prize fulfillment. Still in other embodiments, an operator or system administrator may use the system, including dashboards like those described in FIGS. 3A, 3B and 11A-11D, to create a type of advertising network linking prize providers and/or operators, with participants within an operator's game or within another type of experience where characteristics can be monitored and compared against known conditions.

Continuously monitored matches may leverage the unique and novel conditional prizing system and the condition-characteristic matching approach to create an automated prizing and promotions engine distributing prizes to participants based on their characteristics and behaviors. Such matches may also allow operators to collect data on participant characteristics and behaviors that may be used to improve the system, improve the game, or aid the operator/system administrator in their business.

Continuously monitored matches may be compatible with open or closed ended play, and may be appropriate for multiple participation types. Someone skilled in the art will see the novelty in the way that condition-characteristic matching may result in many various prize types being distributed, automatically, to participants based on their in-game behaviors as well as their persistent and temporary characteristics. Those skilled in the art will see that continuously monitored matches may allow operators and prize providers to target, with a high degree of specificity, certain participants, and certain behaviors in-game that they wish to encourage. In this way, the system may provide unique value to prize providers and operators who wish to communicate with, advertise to, and/or reward certain specific participants at specific times, automatically.

In the event that an operator or system administrator wants to create this type of continuously monitored session for one or more participants, other elements of the system described in the disclosure would continue to function as described with the difference being the possibility that continuous monitoring may not have a specific participant election point with a participant consideration, and it may not have a specific match resolution point as one or more prizes may be awarded throughout the session or across multiple sessions.

In step 1002 of FIG. 10, in a continuously monitored match, a participant may agree to match conditions. In step 1004, a participant may provide a participant consideration at some point, including at their initial session election, or upon entering a specific match type. In particular embodiments, given the nature of this type of session, a participant may not meet any of the win conditions and may therefore fail to earn any of the prizes. In such an embodiment, it may be that the session may end without prizes being awarded. It may also be that, in such a case, the participant may be refunded the participant consideration with no prize being awarded.

In another example embodiment, the system can allow for open-ended play where a participant does not have a single win condition and the match can have a longer lifetime, including across multiple sessions, where one or multiple prizes could be awarded from their participation. In this example, the participant may still agree to the conditions of the match and if needed agree and pay the participant consideration. Some matches may not have a participant consideration or the consideration may be paid by a sponsor. In step 1006, the participant elects to begin the match. And in step 1008, and the operator may begin the selected match and the match would then be in the running state. In this embodiment of a match the system the participant's location may not be required to be validated and the participant's session characteristics may not play a part in the system's match eligibility calculation. A match of this type may be run across multiple participant sessions. While the participant is active in the match the system will determine if the conditions for a prize have been met. In particular embodiments, the conditions could be an event or the completion of an achievement that has been previously defined by the operator or system administrator. If the conditions have not been met the system may continue to run, operating periodic checks on the participant's characteristics and behaviors until the conditions are met or until the participant or operator elects to end the match, as shown in step 1010. In step 1012, in the event that the participant or the operator elects to end the match then the match may be deemed by the system to be complete and all prizes may be awarded. In step 1014, the system determines if a participant has met the conditions for a prize. In step 1016 the system evaluates the participant's current participant characteristics to select and determine the prize to award. In step 1018, the system may directly associate the prize with the event or achievement or the prize could be determined because of their current characteristics. In step 1020, and as described in FIG. 8B, once the prize has been determined the system continues to award the prize.

FIGS. 11A-11D illustrate example graphical user interfaces (GUIs) or user experience (UX) for particular embodiments of match offerings and the features therein. Although particular examples of GUIs and UX are illustrated herein, an operator or participant need not interact with these particular GUIs or UX, and may have no knowledge of particular embodiments, in order to participate in games, matches, sessions, or tournaments that utilize one or more of the particular embodiments described herein. In particular embodiments, GUIs or UXs illustrated in FIGS. 11A-11D may be GUIs or UXs associated with a stand-alone application embodying match offerings and the system features described herein that is downloadable and installable on a stand-alone computer system.

Figure 13:
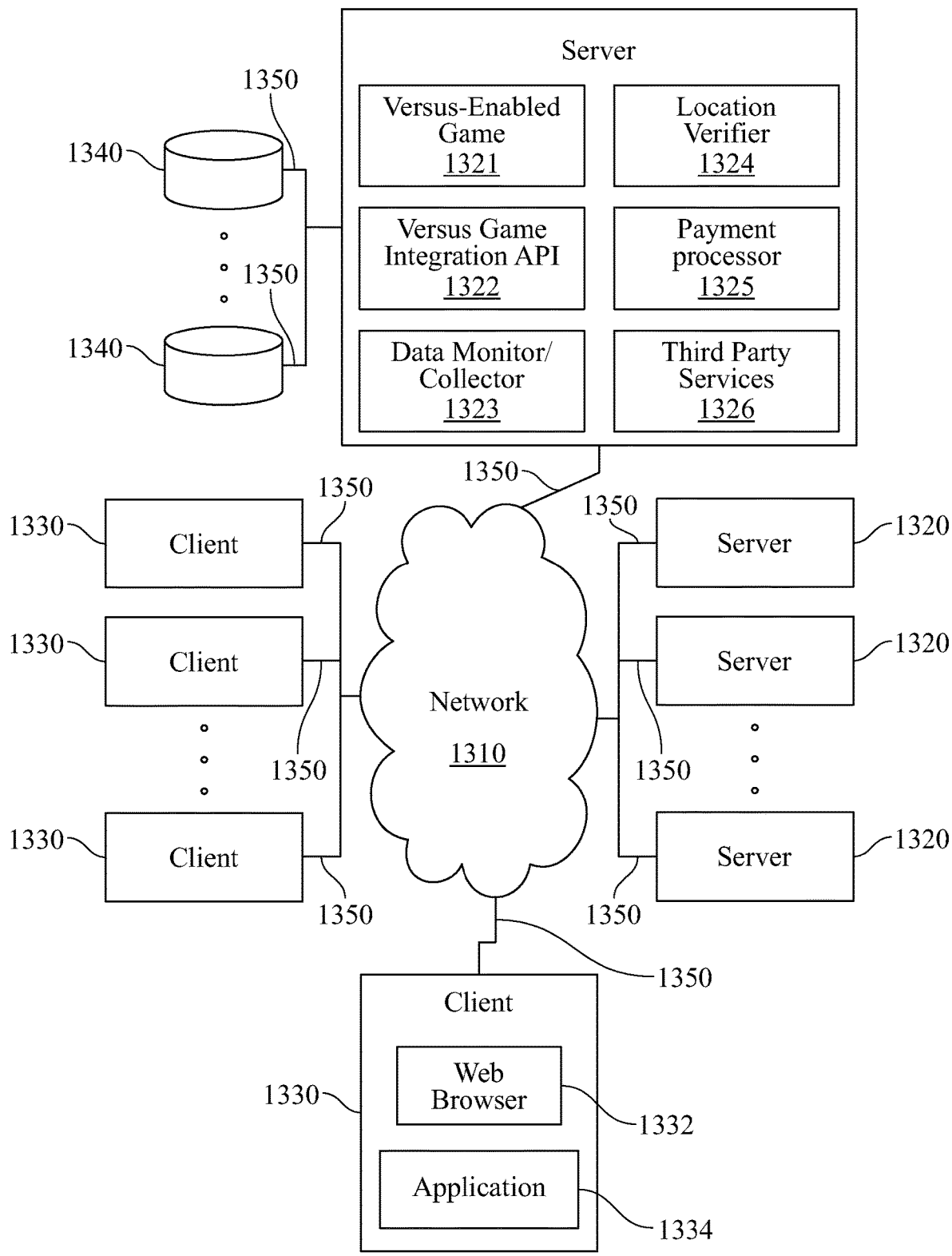
FIG. 13 illustrates an example network environment.

Particular embodiments may be implemented in an in-person environment, for example in an arcade implementation where participants play, observe, or engage in matches or tournaments on the same machine or on networked machines in close proximity. Particular embodiments may be implemented in a network environment. FIG. 13 illustrates an example network environment 1300 suitable for providing software game, match, or tournament operation including decreasing the role of chance in a particular match or tournament, conditional prize matching, conditional prize distribution, dynamic regulatory compliance, participant verification, participant characteristic collection, analytics on participants, or functionalities like those that may be performed by third party facilitators. Network environment 1300 includes a network 1310 coupling one or more servers 1320 and one or more clients 1330 to each other. In particular embodiments, network 1310 is an intranet, an extranet, a virtual private network (VPN), a local area network (LAN), a wireless LAN (WLAN), a wide area network (WAN), a metropolitan area network (MAN), a portion of the Internet, or another network 1310 or a combination of two or more such networks 1310. The present disclosure contemplates any suitable network 1310.

One or more links 1350 couple a server 1320 or a client 1330 to network 1310. In particular embodiments, one or more links 1350 each includes one or more wireline, wireless, or optical links 1350. In particular embodiments, one or more links 1350 each includes an intranet, an extranet, a VPN, a LAN, a WLAN, a WAN, a MAN, a portion of the Internet, or another link 1350 or a combination of two or more such links 1350. The present disclosure contemplates any suitable links 1350 coupling servers 1320 and clients 1330 to network 1310.

In particular embodiments, each server 1320 may be a unitary server or may be a distributed server spanning multiple computers or multiple datacenters. Servers 1320 may be of various types, such as, for example and without limitation, web server, news server, mail server, message server, advertising server, file server, application server, exchange server, database server, or proxy server. In particular embodiments, each server 1320 may include hardware, software, or embedded logic components or a combination of two or more such components for carrying out the appropriate functionalities implemented or supported by server 1320. For example, a web server is generally capable of hosting websites containing web pages or particular elements of web pages. More specifically, a web server may host HTML files or other file types, or may dynamically create or constitute files upon a request, and communicate them to clients 1330 in response to HTTP or other requests from clients 1330. A database server is generally capable of providing an interface for managing data stored in one or more data stores.

In particular embodiments, third party service 1326 may be used for tournament-matching or matchmaking, identity or age verification, for tax documentation, for any big-data reporting, for recording or reporting a participant's earnings or losses, or for analytics based on participant behavior. In particular embodiments, a phone number is used as a secondary form of location verification through a third-party service called Loc-Aid™ or LocationSmart® that verifies cell phone location in addition to IP address verification.

In particular embodiments, one or more data storages 1340 may be communicatively linked to one or more sewers 1320 via one or more links 1350. In particular embodiments, data storages 1340 may be used to store various types of information. In particular embodiments, the information stored in data storages 1340 may be organized according to specific data structures. In particular embodiment, each data storage 1340 may be a relational database. Particular embodiments may provide interfaces that enable servers 1320 or clients 1330 to manage, e.g., retrieve, modify, add, or delete, the information stored in data storage 1340.

In particular embodiments, each client 1330 may be an electronic device including hardware, software, or embedded logic components or a combination of two or more such components and capable of carrying out the appropriate functionalities implemented or supported by client 1330. For example and without limitation, a client 1330 may be a desktop computer system, a notebook computer system, a netbook computer system, a handheld electronic device, a tablet computer, a mobile telephone, a slot machine, an internet-connected console, such as Xbox, Sony Playstation®, Nintendo®, Ouya, SteamBox, or other, any devices running iOS, Mac OS, Windows, Android, a wearable computer, such as Google Glass or similar device, or a virtual reality or augmented reality device, such as Oculus.

The present disclosure contemplates any suitable clients 1330. A client 1330 may enable a network user at client 1330 to access network 1330. A client 1330 may enable its user to communicate with other users at other clients 1330.

A client 1330 may have a web browser 1332, such as MICROSOFT INTERNET EXPLORER, GOOGLE CHROME, MOZILLA FIREFOX, SAFARI, or OPERA and may have one or more add-ons, plug-ins, or other extensions, such as TOOLBAR. A user at client 1330 may enter a Uniform Resource Locator (URL) or other address directing the web browser 1332 to a server 1320, and the web browser 1332 may generate a Hyper Text Transfer Protocol (HTTP) request and communicate the HTTP request to server 1320. Server 1320 may accept the HTTP request and communicate to client 1330 one or more Hyper Text Markup Language (HTML) files responsive to the HTTP request. Client 1330 may render a web page based on the HTML files from server 1320 for presentation to the user. The present disclosure contemplates any suitable web page files. As an example and not by way of limitation, web pages may render from HTML files, Extensible Hyper Text Markup Language (XHTML) files, or Extensible Markup Language (XML) files, Ruby-on-Rails, NodeJS, Scala, PHP, python, or java, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

A client 1330 may have an application 1334 that runs a game, such as a versus-enabled game. Application 1334 may be written in native iOS, Android, Windows, HTML5, Apple OS, C, C++, Flash, Java, Python, Rails, Scala, Unity, Windows OS or any other language specific to a particular client 1330. Application 1334 may be locally stored, cloud-based, streamed, downloaded, physical, or any combination thereof. Running application 1334 may run the game locally or cause client 1330 to communicate with versus game integration API 1322 that allows client 1330 to communicate with versus-enabled game 1321 on server 1320. Any action by a user to add or withdraw credits, join matches or tournaments, invite other participants, and participate in sessions, matches, or tournaments may prompt server 1320 to interact with third party services 1326. Third party services 1326 may communicate with third parties for purposes of verifying a user's identity, location, and age. In particular embodiments, when a participant chooses to participate in a session, match, or tournament, server 1320 may communicate with client 1330 to launch the game on client 1330. Following completion of a game, session, match, or tournament, client 1330 may communicate the player's score or the participant's results and gameplay history to data monitor or collector 1323 on server 1320. Participant data may be stored in data storages 1340. The data is stored so that participants, developers, operators, facilitators, third party affiliates, or system administrators, such as Versus LLC will have access to that participant's game history for analytics purposes, data mining, and fraud-prevention services.

A client 1330 may have a web browser 1332, as described above, that renders a web page based on the files from server 1320 for presentation to the user. A participant or user may enter a game platform via a web portal presented to the user on client 1330. In particular embodiments, particular games require particular compatibility with client 1330. A participant or user may enter a game platform through a UX. Client 1330 may communicate directly with versus-enabled game 1321 on server 1320. Server 1320 may render one or more web pages based on the files from server 1320 for presentation to the user. Server 1320 may allow user to access one or more versus-enabled games 1321 on server 1320.

Figure 12:
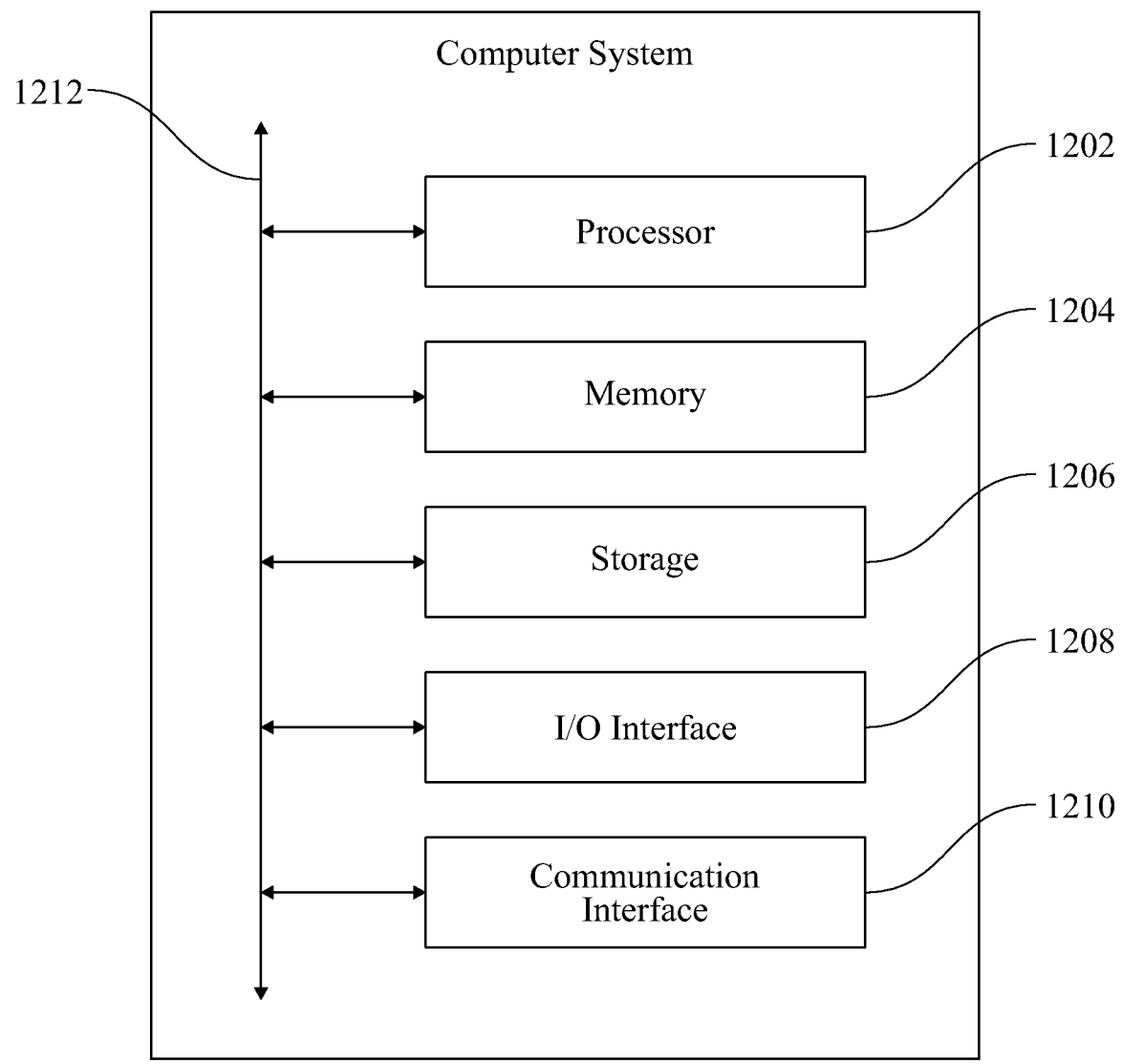
FIG. 12 illustrates an example computer system.

FIG. 12 illustrates an example computer system. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200.

The invention contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, an arcade console, a mainframe, a mesh of computer systems, a mobile telephone, a personal digital assistant (PDA), a server, or a combination of two or more of these. Where appropriate, computer system 1200 may include one or more computer systems 1200; be unitary or distributed; span multiple locations; span multiple machines; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. The present invention contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. Processor 1202 may include one or more arithmetic logic units (ALUs); be a multi-core processor; or include one or more processors 1202.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 1204 may include one or more memories 1204, where appropriate.

In particular embodiments, storage 1206 includes mass storage for data or instructions. As an example and not by way of limitation, storage 1206 may include an HDD, a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206.

In particular embodiments, I/O interface 1208 includes hardware, software, or both providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, game controller, microphone, monitor, mouse, printer, scanner, speaker, still camera, stylus, tablet, touch screen, trackball, video camera, another suitable I/O device or a combination of two or more of these. An I/O device may include one or more sensors. Where appropriate, I/O interface 1208 may include one or more device or software drivers enabling processor 1202 to drive one or more of these I/O devices. I/O interface 1208 may include one or more I/O interfaces 1208, where appropriate.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 1212 may include one or more buses 1212, where appropriate.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101. A computer-readable non-transitory storage medium may be volatile, non-volatile, or a combination of volatile and non-volatile, where appropriate.

This invention contemplates one or more computer-readable storage media implementing any suitable storage. In particular embodiments, a computer-readable storage medium implements one or more portions of processor 1202 (such as, for example, one or more internal registers or caches), one or more portions of memory 1204, one or more portions of storage 1206, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language. In particular embodiments, software is expressed in ruby-on-rails, Node.js, Python, Scala, or Unity.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

APPENDIX A

```
// Authenticating with Versus Platform to get the list of games
{
  "jsonrpc": "2.0", "method": "games.list", "id": 123456,
  "params": {
    "pageSize": 25,
    "authToken": "token",
    "paramSignature": "4d5adb79df7d2d16357d4c59e28180f2be84ccfe"
  }
}
// Register many participants at once
{
  "method": "participant.register", "id": 123456, "jsonrpc": "2.0",
  "params": {
    "participant": [
      { "email": "matthew@pierce.com", "name": "Matthew" },
      { "email": "scott@sebelius.com", "name": "Scott" }
    ],
    "authToken": "token",
    "paramSignature": "5be346db245055fb04ecf05249ee324b1d21c89e"
  }
}
// Confirm participants
{
  "method": "matches.confirmParticipants", "id": 1, "jsonrpc": "2.0",
  "params": {
    "matchInstanceId": "bd9bea5f-a9a5-4a5f-bd0b-98b26a6bd2e0",
    "playerParticipants": [
      { "externalId": "peachey" },
      { "externalId": "oconnell" }
    ]
  }
}
// Starting a match
{
  "method": "matches.start", "id": 1, "jsonrpc": "2.0",
  "params": {
    "externalMatchId": "1",
    "matchInstanceId": "32df4d43-1b7f-416d-b65a-4106eeb72c20",
    "authToken": "token",
    "paramSignature": "4d5adb79df7d2d16357d4c59e28180f2be84ccfe"
  }
}
// Report the results of a match
{
  "method": "matches.report", "id": 1, "jsonrpc": "2.0",
  "params": {
    "matchInstanceId": "0724e840-eb28-4090-ace9-ef5ead0cfe3a",
    "externalId": "running-match",
    "results": [
      { "playerParticipantId": "1832753e-b06d-4b4e-aa1b-9ceabeb38f59" },
      { "playerParticipantId": "1ee9d8c6-6fb7-42b3-8453-53ed4517e54b" }
    ]
  }
}
// Prizes approve
{
  "method": "prizes.approve", "id": 123456, "jsonrpc": "2.0",
  "params": {
    "prizes": [
      { "prizeId": "a7c0395c-21f3-11e6-b67b-9e71128cae77" }
    ]
  }
}
```

APPENDIX A-continued

```
// Prizes fulfill
{
  "method": "prizes.fulfill", "id": 123456, "jsonrpc": "2.0",
  "params": {
    "prizes": [
      { "prizeId": "a7c0395c-21f3-11e6-b67b-9e71128cae77" }
    ]
  }
}
```

The invention claimed is:

1. A method of awarding a computerized gaming participant with a real or virtual prize over a computerized network, the method comprising:

providing, by a computing system, a session application to a plurality of participants for installation on a plurality of remote participant computers, the plurality of participants including a first participant of a first remote participant computer and a second participant of a second remote participant computer, the first remote participant computer being located in a first geographical location and the second remote participant computer being located in a second geographical location different from the first geographical location, each geographical location associated with regional restrictions determined based on local regulatory standards;

providing, through the computing system via the session application on the first remote participant computer, one or more details of a computerized gaming match for presentation to the first participant on the first remote participant computer, the one or more details provided in connection with a game that is provided separately from the computerized gaming match, the one or more details provided to the first participant of a plurality of participants over a network to the first remote participant computer for selection of the computerized gaming match in connection with the game, wherein the game is played over the network and the computer system and session application are separate from a game developer system providing the game to the plurality of participants;

receiving, by the computer system a match condition based on actions performed by a participant of the computerized gaming match;

providing, through the computing system via the session application on the second remote participant computer, one or more details of the computerized gaming match for presentation to the second participant on the second remote participant computer, wherein a prize is provided by the computing system to one or more participants of the game and, wherein the computerized gaming match is associated with at least one prize type;

receiving, by the computing system, a request generated using the session application on the first remote participant computer and the second remote participant computer that indicates that the first participant and the second participant are interested in joining the match, the request including a participant type and participant characteristics for each of the first participant and the second participant, the participant characteristics including at least one persistent characteristic and at least one temporary characteristic, wherein the first geographical location is a persistent characteristic of the first participant and the second geographical location is a persistent characteristic of the second participant;

determining, by the computing system, participant eligibility to participate in the computerized gaming match by:
receiving, through the computing system, the at least one prize type associated with the match, the prize type for a participant being dependent on a geographic location the participant, and
comparing the prize type, participation type, and the participant characteristics with a set of eligibility requirements for the match, wherein eligibility to participate in the computerized gaming match is separate from being able to play the game;

modifying the match condition to include one or more regional restrictions for compliance with local regulatory standards of the geographical region of a participant of the computerized gaming match;

responsive to the match being resolved, obtaining, by the computing system, results of the game from the game developer system via an application programing interface (API) provided by the game developer system, the results including a rankings list of participants;

determining, by the computing system, whether participants in the rankings list of participants are eligible to receive a prize based on a win condition of the computerized gaming match;

responsive to the first participant and the second participant being on the rankings list, awarding, through the computing system, the first participant a first prize associated with the match and the prize type for the first geographic location and the second participant a second prize associated with the match and the prize type for the second geographic location; and replicating the modified match condition for a plurality of future computerized gaming matches to conduct the future computerized gaming matches with regulatory compliance of participants, the regulatory compliance conforming to the geographical region of each participant, wherein the plurality of future gaming matches comprises one or more of a single player match, a player vs. player match, a team vs. team match, a player vs. team match, or a player vs. everyone match, the gaming match for a game representing one of a PC game, a console game, a mobile game, an AR/VR game, or a transmedia entertainment experience.

2. The method of claim 1, further comprising terminating, by the computing system, the match.

3. The method of claim 1, further comprising sending, by the computing system, the prize associated with the match and prize type to at least one of the first participant or the second participant and terminating the match.

4. The method of claim 3, wherein sending the prize comprises sending a virtual prize to at least one of the first participant or the second participant in the session application over the network.

5. The method of claim 3, wherein sending the prize comprises initiating delivery of a physical prize from a third party prize provider to at least one of the first participant or the second participant at a location.

6. The method of claim 1, wherein the participant type comprises a player or a spectator.

7. The method of claim 1, wherein the match is one of a tournament, single game, and perpetual game.

8. The method of claim 1, wherein the one or more details of a match includes a match type comprising one of pay to play, free to play, or sponsored.

9. The method of claim 1, wherein the win condition comprises a result at an end of the match or another result prior to the end of the match.

10. A system for rewarding a participant with a real or virtual prize, the system comprising:
a server comprising one or more modules operable for:
providing a session application to a plurality of participants for installation on a plurality of remote participant computers, the plurality of participants including a first participant of a first remote participant computer and a second participant of a second remote participant computer, the first remote participant computer being located in a first geographical location and the second remote participant computer being located in a second geographical location different from the first geographical location, each geographical location associated with regional restrictions determined based on local regulatory standards;
presenting one or more details of a computerized gaming match in the session application provided in association with a game provided separately from the computerized gaming match, the one or more details being provided to the first participant of a plurality of participants over a network to the first remote participant computer for selection of the computerized gaming match associated with the game, wherein the game is played over the network and the server and session application are separate from a game developer system providing the game to the plurality of participants;
receiving, by the computer system a match condition based on actions performed by a participant of the computerized gaming match;
presenting the one or more details of the match in the session application to the second participant over the network to the second remote participant computer for selection of the match, wherein a prize is provided by the server to one or more players of the game and, wherein the computerized gaming match is associated with at least one prize type;
receiving a request that indicates that the first participant and the second participant are interested to join the match, the request including a participant type associated with the participant and participant characteristics, wherein the request is generated using the session application on the first remote participant computer and the second remote participant computer and, wherein the first geographical location is a characteristic of the first participant and the second geographical location is a characteristic of the second participant;
determining participant eligibility to participate in the match by:
receiving the at least one prize type associated with the match, the prize type for a participant being dependent on a geographic location the participant, and
comparing the prize type, participation type, and the participant characteristics with a set of eligibility requirements for the match, wherein eligibility to participate in the computerized gaming match is separate from being able to play the game;
modifying the match condition to include one or more regional restrictions for compliance with local regulatory standards of the geographical region of a participant of the computerized gaming match;
responsive to the match being resolved, obtaining results of the game from the game developer system via an application programming interface (API) provided by the game developer system, the results including a rankings list of participants;
determining whether participants in the rankings list of participants are eligible to receive a prize based on a win condition of the match;
responsive to the first participant and the second participant being on the rankings list, awarding the first participant a first prize associated with the match and the prize type for the first geographic location and the second participant a second prize associated with the match and the prize type for the second geographic location; and
replicating the modified match condition for a plurality of future computerized gaming matches to conduct the future computerized gaming matches with regulatory compliance of participants, the regulatory compliance conforming to the geographical region of each participant, wherein the plurality of future gaming matches comprises one or more of a single player match, a player vs. player match, a team vs. team match, a player vs. team match, or a player vs. everyone match, the gaming match for a game representing one of a PC game, a console game, a mobile game, an AR/VR game, or a transmedia entertainment experience.

11. The system of claim 10, the server further operable for terminating the match.

12. The system of claim 10, the server further operable to initiate sending the prize associated with the match and prize type to the first participant and the second participant and terminate the match.

13. The system of claim 12, wherein sending the prize comprises sending a virtual prize to the first participant and the second participant in the session application on the first remote participant computer and the second remote participant computer over the network.

14. The system of claim 12, wherein sending the prize comprises initiating sending a physical prize from a third party prize provider to the first participant at the first geographic location.

15. The system of claim 10, wherein the participant type comprises a player or a spectator.

16. The system of claim 10, wherein the match is one of a tournament, single game, and perpetual game.

17. The system of claim 10, wherein the one or more details of a match includes a match type comprising one of pay to play, free to play, or sponsored.

18. The system of claim 10, wherein the win condition comprises a result at an end of the match or another result prior to the end of the match.

19. A non-transitory computer readable storage medium storing instructions that when executed by the computer processor cause the computer processor to perform the steps comprising:
providing a session application to a plurality of participants for installation on a plurality of remote participant computers, the plurality of participants including a first participant of a first remote participant computer and a second participant of a second remote participant computer, the first remote participant computer being located in a first geographical location and the second remote participant computer being located in a second geographical location different from the first geographical location, each geographical location associated with regional restrictions determined based on local regulatory standards;

presenting one or more details of a computerized gaming match in the session application provided in association with a game provided separately from the computerized gaming match, the one or more details being provided to the first participant of a plurality of participants over a network to the first remote participant computer for selection of the computerized gaming match associated with the game, wherein the game is played over the network and the server and session application are separate from a game developer system providing the game to the plurality of participants;

receiving, by the computer system a match condition based on actions performed by a participant of the computerized gaming match;

presenting the one or more details of the match in the session application to the second participant over the network to the second remote participant computer for selection of the match, wherein a prize is provided by the server to one or more players of the game and, wherein the computerized gaming match is associated with at least one prize type;

receiving a request that indicates that the first participant and the second participant are interested to join the match, the request including a participant type associated with the participant and participant characteristics, wherein the request is generated using the session application on the first remote participant computer and the second remote participant computer and, wherein the first geographical location is a characteristic of the first participant and the second geographical location is a characteristic of the second participant;

determining participant eligibility to participate in the match by:
  receiving the at least one prize type associated with the match, the prize type for a participant being dependent on a geographic location the participant, and
  comparing the prize type, participation type, and the participant characteristics with a set of eligibility requirements for the match, wherein eligibility to participate in the computerized gaming match is separate from being able to play the game;

modifying the match condition to include one or more regional restrictions for compliance with local regulatory standards of the geographical region of a participant of the computerized gaming match;

responsive to the match being resolved, obtaining results of the game from the game developer system via an application programming interface (API) provided by the game developer system, the results including a rankings list of participants;

determining whether participants in the rankings list of participants are eligible to receive a prize based on a win condition of the match;

responsive to the first participant and the second participant being on the rankings list, awarding the first participant a first prize associated with the match and the prize type for the first geographic location and the second participant a second prize associated with the match and the prize type for the second geographic location; and replicating the modified match condition for a plurality of future computerized gaming matches to conduct the future computerized gaming matches with regulatory compliance of participants, the regulatory compliance conforming to the geographical region of each participant, wherein the plurality of future gaming matches comprises one or more of a single player match, a player vs. player match, a team vs. team match, a player vs. team match, or a player vs. everyone match, the gaming match for a game representing one of a PC game, a console game, a mobile game, an AR/VR game, or a transmedia entertainment experience.

20. The non-transitory computer readable storage medium of claim 19, wherein the one or more details of a match includes a match type comprising one of pay to play, free to play, or sponsored.

21. The non-transitory computer readable storage medium of claim 19, wherein the win condition comprises a result at an end of the match or another result prior to the end of the match.

* * * * *

UNITED STATES PATENT AND TRADEMARK OFFICE
CERTIFICATE OF CORRECTION

PATENT NO. : 10,888,789 B2  
APPLICATION NO. : 15/334725  
DATED : January 12, 2021  
INVENTOR(S) : Pierce et al.

Page 1 of 1

It is certified that error appears in the above-identified patent and that said Letters Patent is hereby corrected as shown below:

On the Title Page

Item (54), in Column 1, in "Title", Lines 1-3, delete "SYSTEMS AND METHODS FOR CREATING AND MAINTAINING REAL MONEY TOURNAMENTS FOR VIDEO GAMES" and insert -- MANAGING REWARDS IN INTERACTIVE MEDIA ACROSS GEOGRAPHICAL LOCATIONS --, therefor.

In the Specification

In Column 1, Lines 1-3, delete "SYSTEMS AND METHODS FOR CREATING AND MAINTAINING REAL MONEY TOURNAMENTS FOR VIDEO GAMES" and insert -- MANAGING REWARDS IN INTERACTIVE MEDIA ACROSS GEOGRAPHICAL LOCATIONS --, therefor.

In the Claims

In Column 44, in Claim 1, Line 8, after "location" insert -- of --.

In Column 44, in Claim 1, Line 20, delete "programing" and insert -- programming --, therefor.

In Column 45, in Claim 10, Line 57, after "location" insert -- of --.

In Column 47, in Claim 19, Line 39, after "location" insert -- of --.

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*